United States Patent
MolavianJazi et al.

(10) Patent No.: US 12,484,065 B2
(45) Date of Patent: Nov. 25, 2025

(54) PDCCH MONITORING FOR MULTI-CELL SCHEDULING

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 17/813,310

(22) Filed: Jul. 18, 2022

(65) Prior Publication Data

US 2023/0057605 A1    Feb. 23, 2023

Related U.S. Application Data

(60) Provisional application No. 63/231,516, filed on Aug. 10, 2021, provisional application No. 63/227,874, filed on Jul. 30, 2021.

(51) Int. Cl.
    *H04W 72/23*      (2023.01)
    *H04L 5/00*      (2006.01)
    *H04W 48/12*      (2009.01)

(52) U.S. Cl.
    CPC ........... *H04W 72/23* (2023.01); *H04L 5/0035* (2013.01); *H04W 48/12* (2013.01)

(58) Field of Classification Search
    CPC ...... H04W 48/12; H04W 72/23; H04L 5/0035
    USPC ...................................................... 370/329
    See application file for complete search history.

(56) References Cited

U.S. PATENT DOCUMENTS

| | | |
|---|---|---|
| 10,869,321 B2 | 12/2020 | Lee et al. |
| 2014/0185537 A1 | 7/2014 | Papasakellariou |
| 2020/0154295 A1* | 5/2020 | Lin ........................ H04W 24/08 |
| 2021/0014837 A1* | 1/2021 | Papasakellariou .... H04L 5/0053 |
| 2021/0029726 A1 | 1/2021 | Papasakellariou |
| 2021/0067267 A1 | 3/2021 | Chen et al. |
| 2021/0092748 A1 | 3/2021 | Lee et al. |
| 2021/0168774 A1 | 6/2021 | Li et al. |

FOREIGN PATENT DOCUMENTS

WO    WO-2020255531 A1 *   12/2020   ......... H04L 5/0053

OTHER PUBLICATIONS

International Search Report and Written Opinion issued Nov. 15, 2022 regarding International Application No. PCT/KR2022/011252, 7 pages.

(Continued)

*Primary Examiner* — Peter G Solinsky

(57) ABSTRACT

Methods and apparatuses for physical downlink control channel (PDCCH) monitoring for multi-cell scheduling. A method for a user equipment (UE) includes receiving first information indicating a set of cells that includes more than one cell, second information indicating a first search space set that is associated with a DCI format for scheduling on multiple cells, and third information indicating an indicator value corresponding to the set of cells. The method further includes determining an association between the first search space set and the set of cells, and, based on the first search space set and the indicator value, control channel elements (CCEs) for receptions of PDCCH candidates; and receiving the PDCCH candidates over the CCEs.

23 Claims, 12 Drawing Sheets

(56) References Cited

OTHER PUBLICATIONS

"5G; NR; Physical channels and modulation (3GPP TS 38.211 version 16.5.0, Release 16)", ETSI TS 138 211 V16.5.0, Apr. 2021, 138 pgs.
"5G; NR; Multiplexing and channel coding (3GPP TS 38.212 version 16.5.0 Release 16)", ETSI TS 138 212 V16.5.0, Apr. 2021, 155 pages.
"5G; NR; Physical layer procedures for control (3GPP TS 38.213 version 16.6.0 Release 16)", ETSI TS 138 213 V16.6.0, Aug. 2021, 190 pages.
"5G; NR; Physical layer procedures for data (3GPP TS 38.214 version 16.5.0 Release 16)", ETSI TS 138 214 V16.5.0, Apr. 2021, 173 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
"5G; NR; NR and NG-RAN Overall description; Stage-2 (3GPP TS 38.300 version 16.5.0 Release 16)", ETSI TS 138 300 V16.5.0, Apr. 2021, 153 pages.
Extended European Search Report issued Mar. 19, 2025 regarding Application No. 22849944.8, 20 pages.
Qualcomm Incorporated, "Views on multi-cell PDSCH scheduling via a single DCI", 3GPP TSG-RAN WGI #102-e, R1-2006834, Aug. 2020, 4 pages.

* cited by examiner

PDCCH MONITORING FOR MULTI-CELL SCHEDULING

CROSS-REFERENCE TO RELATED APPLICATION AND CLAIM OF PRIORITY

This application claims priority under 35 U.S.C. § 119 (e) to U.S. Provisional Patent Application No. 63/227,874 filed on Jul. 30, 2021, and U.S. Provisional Patent Application No. 63/231,516 filed on Aug. 10, 2021. The above-identified provisional patent applications are hereby incorporated by reference in their entirety.

TECHNICAL FIELD

The present disclosure relates generally to wireless communication systems and, more specifically, the present disclosure relates to physical downlink control channel (PDCCH) monitoring for multi-cell scheduling.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to PDCCH monitoring for multi-cell scheduling.

In one embodiment, a method for reception of PDCCHs is provided. The method includes receiving first information indicating a set of cells that includes more than one cell, second information indicating a first search space set that is associated with a DCI format for scheduling on multiple cells, and third information indicating an indicator value corresponding to the set of cells. The method further includes determining an association between the first search space set and the set of cells, and, based on the first search space set and the indicator value, control channel elements (CCEs) for receptions of PDCCH candidates; and receiving the PDCCH candidates over the CCEs.

In another embodiment, a user equipment (UE) is provided. The UE includes a transceiver configured to receive first information indicating a set of cells that includes more than one cell, second information indicating a first search space set that is associated with a DCI format for scheduling on multiple cells, and third information indicating an indicator value corresponding to the set of cells. The UE further includes a processor operably coupled to the transceiver. The processor is configured to determine an association between the first search space set and the set of cells, and, based on the first search space set and the indicator value, CCEs for receptions of PDCCH candidates. The transceiver is further configured to receive the PDCCH candidates over the CCEs.

In yet another embodiment, a base station is provided. The base station includes a transceiver configured to transmit first information indicating a set of cells that includes more than one cell, second information indicating a first search space set that is associated with a DCI format for scheduling on multiple cells, and third information indicating an indicator value corresponding to the set of cells. The base station further includes a processor operably coupled to the transceiver. The processor is configured to determine an association between the first search space set and the set of cells, and, based on the first search space set and the indicator value, CCEs for PDCCH candidates. The transceiver is further configured to transmit a PDCCH using a PDCCH candidate.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
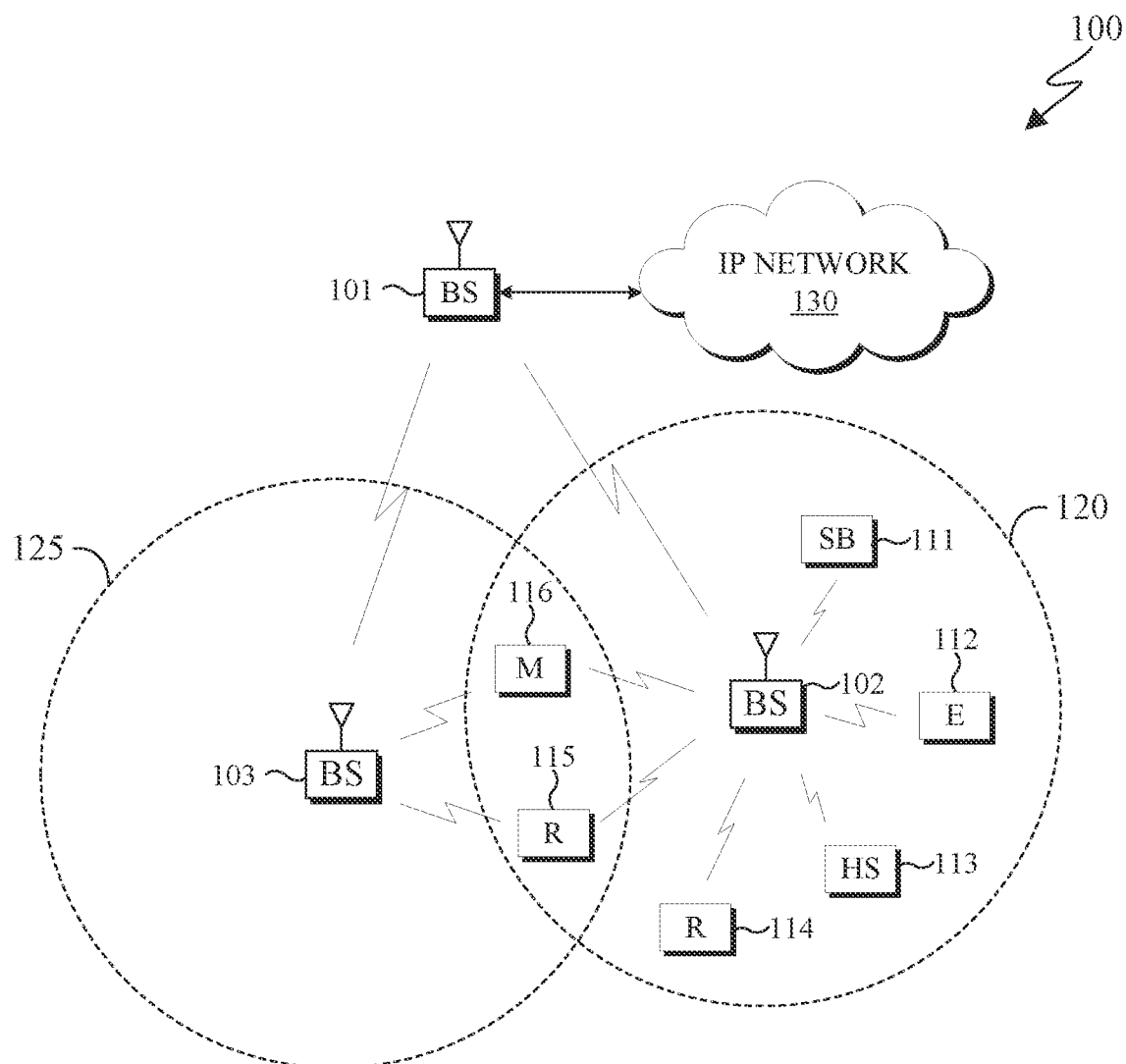
FIG. 1 illustrates an example wireless network according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 Rel-16 v16.5.0, "NR; Physical channels and modulation" ("REF1"); 3GPP TS 38.212 Rel-16 v16.5.0, "NR; Multiplexing and channel coding" ("REF2"); 3GPP TS 38.213 Rel-16 v16.6.0, "NR; Physical layer procedures for control" ("REF3"); 3GPP TS 38.214 Rel-16 v16.5.0, "NR; Physical layer procedures for data" ("REF4"); 3GPP TS 38.321 Rel-16 v16.4.0, "NR; Medium Access Control (MAC) protocol specification" ("REF5"); 3GPP TS 38.331 Rel-16 v16.4.1, "NR; Radio Resource Control (RRC) protocol specification" ("REF6"); and 3GPP TS 38.300 Rel-16 v16.5.0, "NR; NR and NG-RAN Overall Description; Stage 2" ("REF7").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long-term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
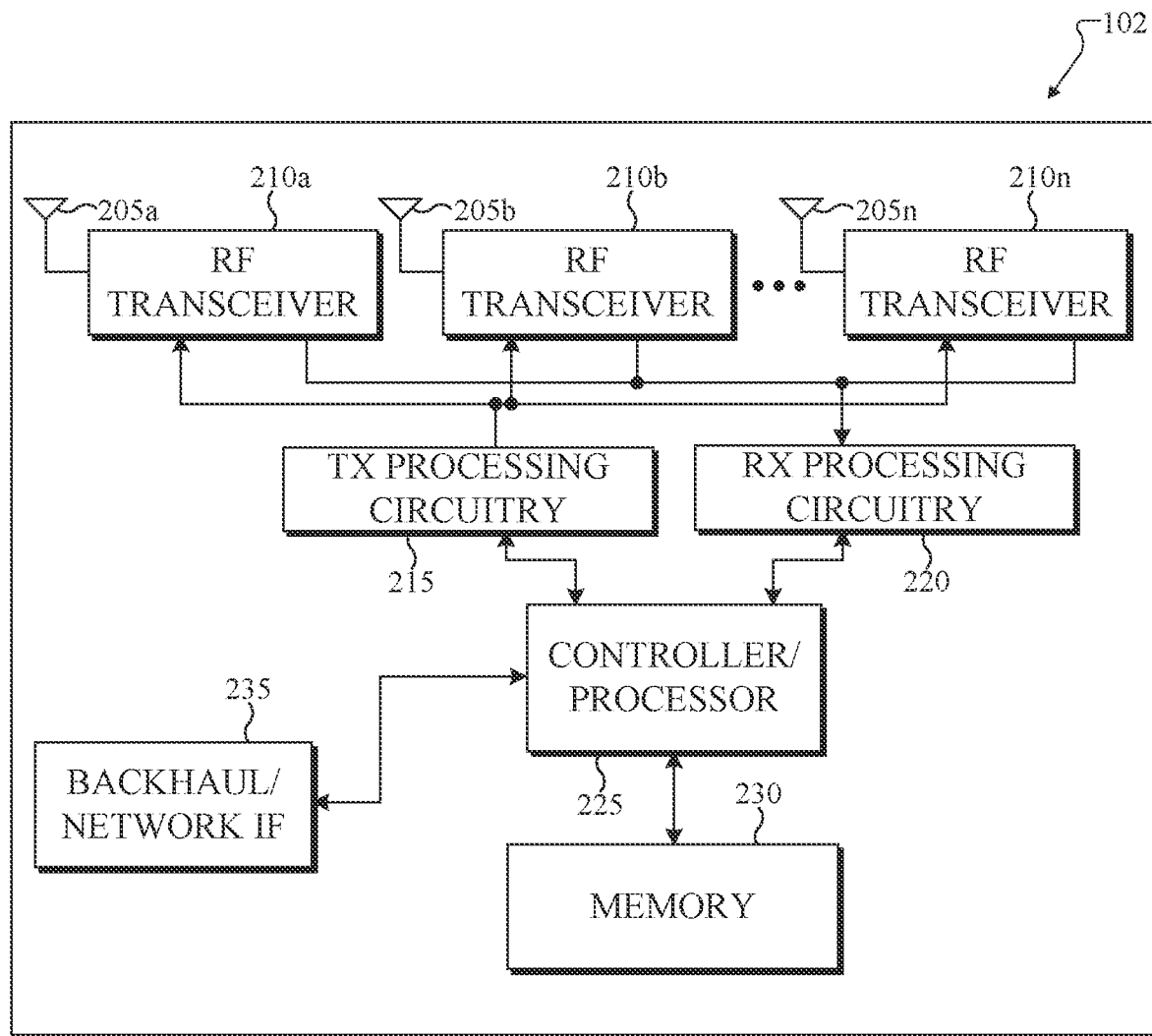
FIG. 2 illustrates an example base station (BS) according to embodiments of the present disclosure.
Figure 3:
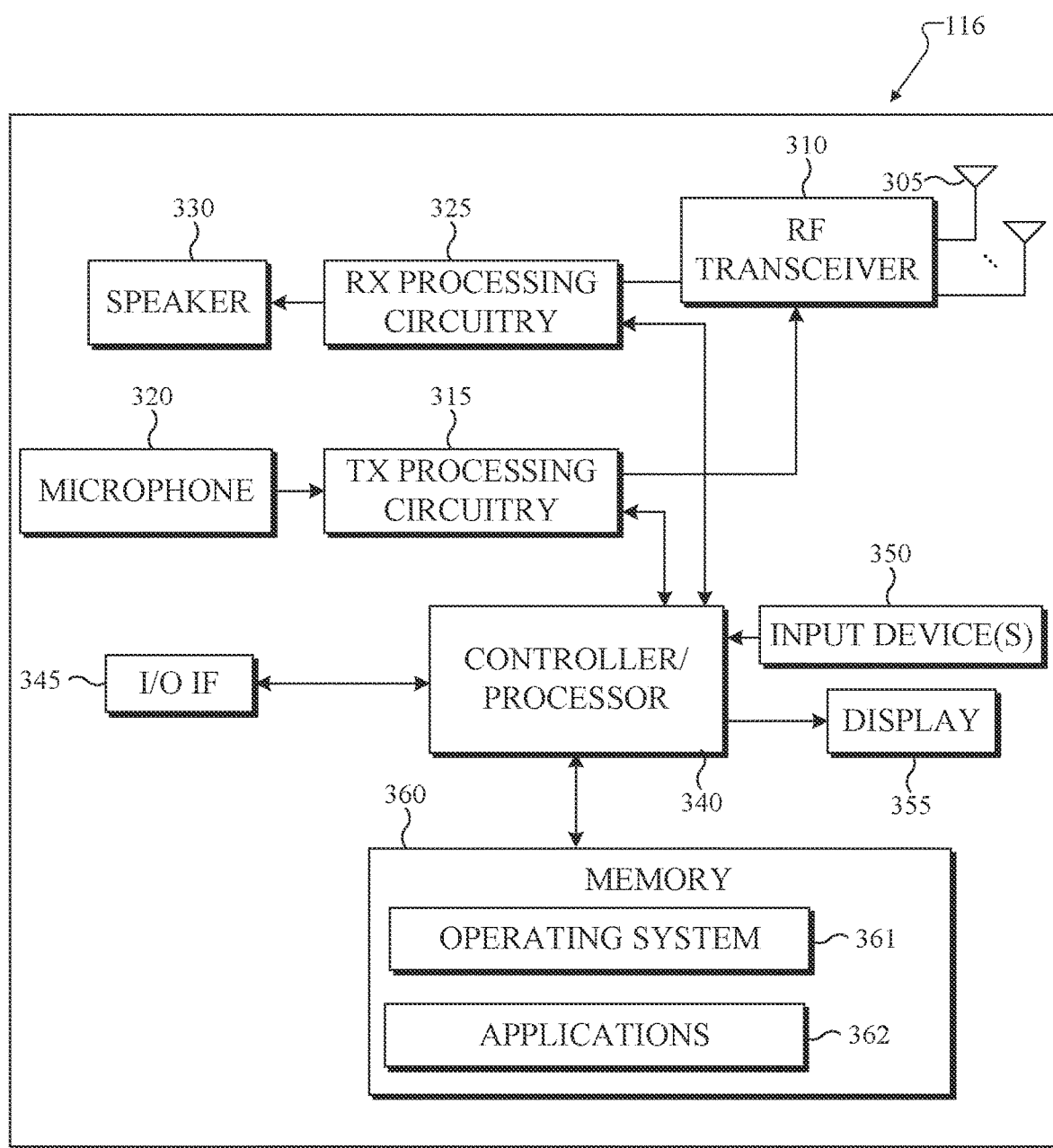
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for physical downlink control channel (PDCCH) monitoring with multiple downlink control information (DCI) format sizes as well as PDCCH monitoring for multi-cell scheduling. In certain embodiments, and one or more of the BSs 101-103 includes circuitry, programing, or a combination thereof for PDCCH monitoring with multiple DCI format sizes as well as PDCCH monitoring for multi-cell scheduling.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support PDCCH monitoring with multiple DCI format sizes as well as PDCCH monitoring for multi-cell scheduling. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
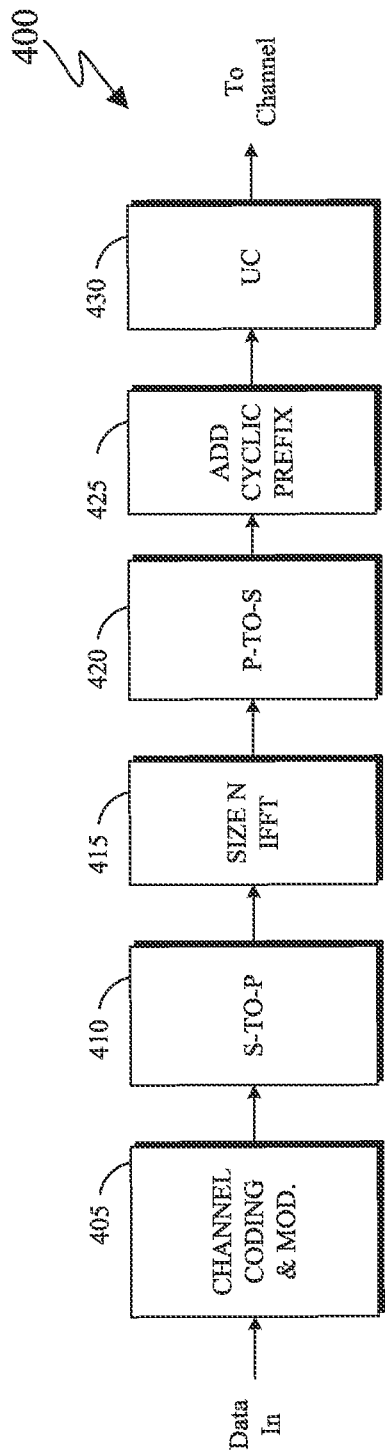
FIGS. 4 and 5 illustrate example wireless transmit and receive paths according to embodiments of the present disclosure.
Figure 5:
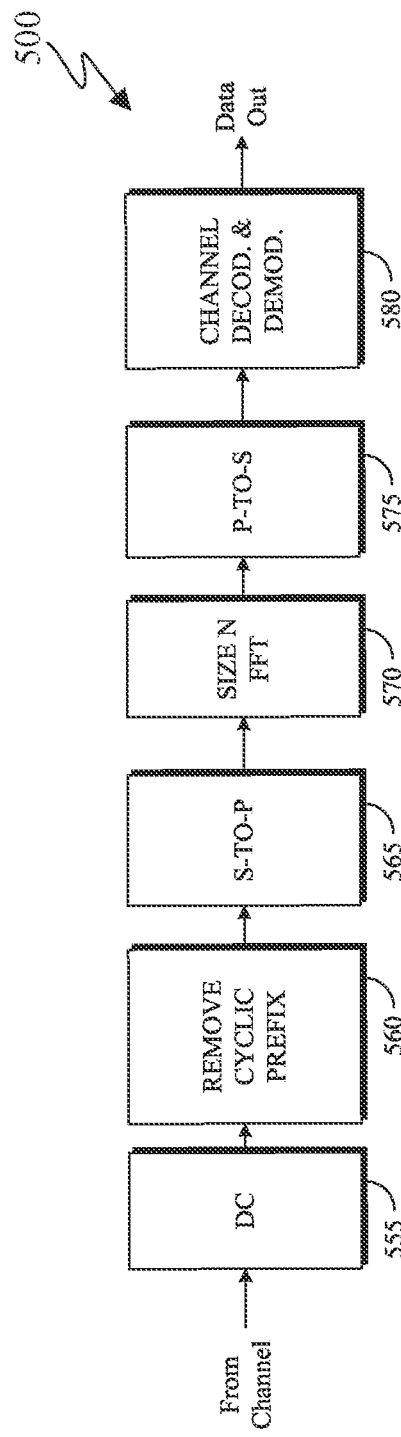

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support PDCCH monitoring with multiple DCI format sizes as well as PDCCH monitoring for multi-cell scheduling as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

It is noted that the present disclosure relates to a (i) pre-5th-Generation (5G), (ii) 5G, or (iii) beyond 5G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

Embodiments of the present disclosure consider that PDCCH monitoring allocation in a search space set considering different DCI format sizes associated with the search space set.

In legacy 5G NR systems, the UE counts a number of PDCCH candidates in a search space set regardless of a number of DCI format sizes associated with the search space set. Therefore, when the UE monitors PDCCH according to the search space set, the UE counts each PDCCH candidate only once, even when the search space set is associated with more than one DCI format size.

In practice, however, UE implementation performs separate decoding operations per DCI format size. Therefore, a UE capability for PDCCH monitoring is limited, not only by the number of configured PDCCH candidates in a search space, but also by a number of DCI format sizes that the UE decodes for each PDCCH candidate.

Such limitation is taken into account only partially in the legacy 5G NR system via a rule, referred to as the "3+1" rule for DCI format sizes. The "3+1" rule limits a number of DCI format sizes that a UE can monitor across all PDCCH candidates in all search space set in a downlink (DL) bandwidth part (BWP) of a scheduling cell, namely up to 3 DCI format size for unicast data. A UE expects to monitor PDCCH candidates for up to 4 sizes of DCI formats that include up to 3 sizes of DCI formats with cyclic redundancy check (CRC) scrambled by cell radio network temporary identifier (C-RNTI) per serving cell. The UE counts a number of sizes for DCI formats per serving cell based on a number of configured PDCCH candidates in respective search space sets for the corresponding active DL BWP.

In a first release of 5G NR systems (Rel-15), each search space set is associated with only one or two DCI format sizes, after the UE completes the procedures for DCI format size alignment as described in REF2. Therefore, a UE capability for PDCCH monitoring is practically determined only by a number of configured PDCCH candidates in the search space set, and is less impacted by a number of DCI format sizes.

However, recent releases of 5G NR, such as Rel-16 and Rel-17, support multiple DCI format sizes associated with a search space set. For example, Rel-16 support association of a UE specific search space (USS) set with compact DCI formats 0_2 and 1_2 for ultra-reliable and low latency communication (URLLC), DCI formats 2_5 for integrated access and backhaul (IAB) operation, and DCI formats 3_0 and 3_1 for sidelink (SL) operation, in addition to fallback DCI formats 0_0 and 1_0 and normal DCI formats 0_1 and 1_1. Similar, for a common search space (CSS) set, more DCI formats are supported such as DCI formats 2_4, 2_5, and 2_6. More DCI formats are expected in Rel-17, for example, for multicast-broadcast services (MBS) and so on.

It is noted that a UE supporting Rel-16 or Rel-17 features can face scenarios in which a UE decodes a first PDCCH candidate associated with two or three DCI format sizes, and a second PDCCH candidate also associated with two or three 3 DCI format sizes, wherein the first and second PDCCH candidates are in a same search space set and in a same slot. Such operation can have material impact on UE capability for PDCCH monitoring.

Therefore, embodiments of the present disclosure take into consideration that there is a need for a UE capability for PDCCH monitoring to consider both a number of configured PDCCH candidates in a search space and a number of different DCI format sizes associated with the search space, to determine a maximum number of decoding operations by the UE.

Accordingly, embodiments of the present disclosure provide methods and apparatus for PDCCH monitoring counting and allocation when multiple DCI format sizes are associated with a search space set.

The disclosure describes modifications to UE procedures for PDCCH candidate allocation and search space set overbooking and dropping, wherein the UE scales a number of configured PDCCH candidates in a search space set by a number of DCI format sizes associated with the search space set, that the UE determines after completing a DCI format size alignment procedure.

One motivation for a modified PDCCH monitoring allocation is to maintain UE complexity across different 5G NR releases, as more DCI formats with different sizes are introduced. Such operation can apply to frequency bands below 6 GHZ or above 6 GHZ, referred to as FR1 or FR2, respectively. In general, the embodiments apply to any deployments, verticals, or scenarios including inter-band CA, with eMBB, URLLC and industrial internet of things (IIoT) and extended reality (XR), mMTC and IoT, with sidelink/V2X communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

An embodiment, described in greater detail below, describes a UE procedure on allocation of PDCCH candidates considering number of sizes for DCI formats of USS sets. For example, when a UE (such as the UE 116) is configured a search space set to monitor PDCCH for detection of more than one DCI formats having different sizes, the UE counts a number of PDCCH candidates associated with the search space set separately per DCI format size. A reason is that a UE performs a separate decoding operation for each received PDCCH candidate per DCI format size. Therefore, for the purpose of determining a UE capability for a number of decoding operations for DCI formats associated with a search space set, the UE scales a number of configured PDCCH candidates for the search space set with a number of sizes for the DCI formats associated with the search space set. Accordingly, the UE determines a search space set overbooking event per slot or per span when the UE determines that a number of PDCCH candidates after such scaling (with the number of DCI format sizes) exceeds a predetermined limit on a number of PDCCH candidates that the UE can monitor per slot or per span. When an overbooking event occurs, the UE can drop search space sets in a descending order of a search space set index until the overbooking event is avoided. The UE may expect to drop only USS sets and may not expect an overbooking event to occur for CSS sets.

Additionally, embodiments of the present disclosure consider PDCCH monitoring aspects for cross-carrier scheduling operation in a carrier aggregation (CA) framework that supports joint scheduling of multiple cells.

In legacy 5G NR systems, a downlink or uplink data transmission can be scheduled only on a single serving cell. A DCI format provides scheduling information parameters for a physical downlink shared channel (PDSCH) or a physical uplink shared channel (PUSCH) on a single serving cell. If the serving cell is a scheduled cell, the UE receives a DCI format for the PDSCH/PUSCH in a PDCCH that the UE receives on a corresponding scheduling cell. In case of cross-carrier scheduling, based on a carrier indication field (CIF) in the DCI format, the UE can determine a serving cell on which the UE can receive the PDSCH or transmit the PUSCH.

Embodiments of the present disclosure take into consideration that certain legacy NR systems do not support joint scheduling of multiple PDSCHs or multiple PUSCH on multiple cells by using single/common control signaling, such as by using a single DCI format. For such operation, the UE receives multiple DCI formats, wherein each DCI format can schedule one of the multiple PDSCHs or PUSCHs. Such operation achieves the intended outcome but introduce signaling overhead that is proportional to the number of scheduled PDSCHs or PUSCHs. In various scenarios, it is possible that several scheduling parameters or corresponding UE operations are shared/common among the multiple PDSCHs or PUSCHs on the "co-scheduled" cells.

For example, the UE may use a same physical uplink control channel (PUCCH) resource to transmit a PUCCH providing hybrid automatic repeat request (HARQ) acknowledgement (ACK) feedback corresponding to the multiple PDSCHs. Therefore, an indication for the same PUCCH resource (and corresponding operations for PUCCH transmission) in DCI formats scheduling PDSCH receptions on multiple cells at a same time may be unnecessarily repeated multiple times. In addition, in some scenarios, such as intra-band CA, it is likely that physical channel conditions are correlated, so various scheduling parameters such as for link adaptation, MIMO/beamforming operation, and possibly even resource allocation can be common and repeated among the co-scheduled cells. Such unnecessary overhead in control signaling can be significant, especially when the number of co-scheduled cells are large, such as 4-8 cells. Also, CRC bits need to be repeated in each of the DCI formats scheduling PDSCHs or PUSCHs on multiple cells, which incurs significant signaling overhead, especially for a large number of scheduled cells/DCI formats.

Similarly, PDCCH monitoring aspects in the legacy 5G NR system are based on single-cell scheduling mechanisms, with either self-carrier or cross-carrier scheduling procedures. In order to detect a single-cell scheduling DCI format, a UE needs to monitor PDCCH according to search space sets associated with one or more control resource sets (CORESETs) to receive and decode DCI formats for a number of PDCCH candidates. There are predetermined limits on the number of PDCCH candidates and a number of non-overlapping control channel elements (CCEs) that the UE can monitor in a slot, wherein the latter refers to channel estimation for the resources associated with the PDCCH candidates in the slot. In addition, the specifications support search space set overbooking procedures, wherein the UE can drop certain UE-specific search space sets on a primary cell (with lowest priority, namely, with largest index) when the predetermined limits on the number of PDCCH candidates or the number of non-overlapping CCEs is/are exceeded.

For a UE (such as the UE 116) that supports multi-cell scheduling, a DCI format received in a PDCCH provides (partially or completely) scheduling information for multiple serving cells, and may additionally point to another PDSCH or PDCCH that includes the remaining scheduling information.

Therefore, embodiments of the present disclosure take into consideration that there is a need for multi-cell scheduling, wherein multiple cells can be jointly scheduled using reduced signaling overhead, such as by using only a single DCI format with a same or somewhat larger size than a DCI format used for single-cell scheduling.

Embodiments of the present disclosure also takes into consideration that there is a need to determine a search space design for multi-cell scheduling, such as how/where a UE can search for PDCCH candidates for multi-cell scheduling, and how the UE can distinguish multi-cell scheduling DCI formats from single-cell scheduling DCI formats. In addition, the UE limits on PDCCH monitoring need to be revisited defined when multi-cell scheduling is also supported on a scheduling cell or a scheduled cell. For example, the UE needs to determine how to count a PDCCH candidate for multi-cell scheduling for different cells included in a set of co-scheduled cells.

Embodiments of the present disclosure further takes into consideration that there is a need to specify other PDCCH monitoring aspects, such as search space set overbooking and dynamic spectrum sharing (DSS) operation (namely, scheduling on a cell such as a primary cell (PCell) from two scheduling cells such as from the PCell and a special secondary cell (sSCell) in presence of multi-cell scheduling operation.

Accordingly, embodiments of the present disclosure provide methods and apparatus for PDCCH monitoring in case of multi-cell scheduling operation with reduced signaling overhead, such as when a set of serving cells are jointly scheduled, referred to as "co-scheduled" cells.

In a first case, a search space set for multi-cell scheduling is associated only with DCI format(s) for multi-cell scheduling on a set of co-scheduled cells. Such search space sets can correspond to set-level n_CI values, which are separate from existing n_CI values corresponding to search space sets for single-cell scheduling. By monitoring the search space set, the UE can detect a DCI format for scheduling on all scheduled cells from the set of co-scheduled cells or only a subset of scheduled cells from the set of co-scheduled cells. Accordingly, the detected DCI format can have a CIF value that is same as or different from an n_CI value corresponding to the search space set for multi-cell scheduling. The search space set can be commonly configured, thereby linked, on the scheduling cell and on all scheduled cells from the set of co-scheduled cells. The UE can monitor the search space set for multi-cell scheduling when linked search spaces sets on the scheduling cell and at least one scheduled cell from the set co-scheduled cells is configured on corresponding active DL BWPs of the scheduling cell and the at least one scheduled cell. When the UE monitors a PDCCH candidate with L non-overlapping CCEs in a slot according to the search space set, the UE counts the PDCCH candidate as a fractional count 1/K towards a number of monitored PDCCH candidates in the slot, and as a fractional count L/K towards a number of monitored non-overlapping CCEs in the slot, for each cell from the set of K co-scheduled cells. For example, a PDCCH candidate for a set of 4 co-scheduled cells is counted as ¼ of a PDCCH candidate for each cell from the set of 4 co-scheduled cells. When resolving a search space set overbooking event, the UE can assign a higher priority to the search space set for multi-cell scheduling than to search space sets for single-cell scheduling.

In a second case, a search space set for multi-cell scheduling is associated with DCI format(s) both for multi-cell scheduling on a set of co-scheduled cells and for single-cell scheduling on a first scheduled cell from the set of co-scheduled cells. Such search space sets correspond to an existing cell-level n_CI value corresponding to the first scheduled cell. By monitoring the search space set, the UE can detect a DCI format for single-cell scheduling on the first scheduled cell with a CIF value that is same as the n_CI value corresponding to the first scheduled cell, or can detect a DCI format for multi-cell scheduling for all scheduled cells or for a subset of scheduled cells from the set of co-scheduled cells, with a set-level CIF value that is different from the n_CI value corresponding to the first scheduled cell. The search space set is commonly configured, thereby linked, on the scheduling cell and only the first scheduled cell, and the UE monitors the linked search space sets when both are configured on active DL BWPs of the scheduling cell and the first scheduled cell. When the UE monitors a PDCCH candidate with L non-overlapping CCEs in a slot according to the search space set, the UE counts the PDCCH candidate as a full/single count towards a number of monitored PDCCH candidates in the slot, and as a full count L towards a number of monitored non-overlapping CCEs in the slot, for only the first scheduled cell-no counting towards the limits for other cells in the set of co-scheduled cells.

One motivation for multi-cell scheduling using a single DCI format is enhanced cross-carrier scheduling operation for larger number of cells, such as 4-8 cells, operating in an intra-band CA framework in frequency bands below 6 GHz or above 6 GHZ, referred to as FR1 or FR2, respectively. In general, the embodiments apply to any deployments, verticals, or scenarios including inter-band CA, with eMBB, URLLC and IIOT and XR, mMTC and IoT, with sidelink/V2X communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Embodiments of the disclosure for supporting PDCCH monitoring enhancements in case of multi-cell scheduling with reduced signaling overhead are summarized below and fully elaborated further below.

An embodiment, described in greater detail below, describes multi-cell scheduling operation. For example, a UE (such as the UE 116) can be provided a number of sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described herein. Additionally, the UE can be indicated via a DCI format in a PDCCH or via a MAC CE in a PDSCH a subset of a set of co-scheduled cells, wherein cells of the subset can change across different PDCCH monitoring occasions, for example, as indicated by a corresponding DCI format.

Another embodiment, described in greater detail below, describes various mechanisms for multi-cell scheduling. For example, a UE (such as the UE 116) that is configured a set of co-scheduled cells, a DCI format for multi-cell scheduling can provide full or partial information for values of cell-common and cell-specific fields for scheduling PDSCH receptions or PUSCH transmissions on respective one or more cells from the set of co-scheduled cells. When the DCI format provides partial information, the UE can determine remaining information from RRC signaling, or by using other complementary methods.

Another embodiment, described in greater detail below, describes distinguishing multi-cell scheduling from single-cell scheduling. For example, when a UE (such as the UE 116) is configured a set of co-scheduled cells including a first cell, the UE can receive a PDCCH with a DCI format that schedules a PDSCH reception or PUSCH transmission only on the first cell (single-cell scheduling DCI format). The UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format, or by a dedicated CORESET and associated search space sets.

Another embodiment, described in greater detail below, describes search space set design for multi-cell scheduling. For example, when a UE (such as the UE 116) is configured multi-cell scheduling for a set of co-scheduled cells by a scheduling cell, the UE can determine an association among search space sets for multi-cell scheduling with the set of co-scheduled cells based on a modified definition for a carrier indicator field value, n_CI.

Another embodiment, described in greater detail below, describes search space linking for multi-cell scheduling. For example, for multi-cell scheduling for a set of co-scheduled cells, where a UE (such as the UE 116) is configured a first search space set on a corresponding scheduling cell, there can be several approaches with respect to search space configuration and linking to the set of co-scheduled cells, such as configuration of linked search space sets on all co-scheduled cells, or only on one reference cell from the set of the co-scheduled cells, or on none of the co-scheduled cells.

Another embodiment, described in greater detail below, describes Blind decoding (BD)/CCE allocation for multi-cell scheduling. For example, for a UE (such as the UE 116) that is configured multi-cell scheduling for a set of co-scheduled cells, and compared to single-cell scheduling, the UE monitors a same total number of PDCCH candidates and non-overlapping CCEs on a corresponding scheduling cell, but the UE counts a number of PDCCH candidates and non-overlapping CCEs per scheduled cell from the set of co-scheduled cells differently based on a search space set used for multi-cell scheduling. When monitoring PDCCH candidates according to a UE-specific search space set for multi-cell scheduling, the UE counts PDCCH candidates as a fraction of a number of PDCCH candidates that the UE can monitor. For example, for a set of co-scheduled cells that includes 4 cells, the UE counts a PDCCH candidate for 4-cell scheduling as ¼ of a PDCCH candidate for each cell from the set of 4 configured cells. It is noted that such allocation also applies when no DCI is detected in the PDCCH candidate or even when the UE detects a DCI format that co-schedules a subset of the configured cells, such as only 2 cells from the 4 cells. Alternatively, the counting can be included for only one scheduled cell from the set of co-scheduled cells.

Another embodiment, described in greater detail below, describes search space overbooking and dropping for multi-cell scheduling. For example, when (i) the PCell is among cells of a set of co-scheduled cells and scheduling on cells from the set of co-scheduled cells is from the PCell (the PCell is a scheduling cell for the set of co-schedule cells), (ii) a UE (such as the UE 116) is configured a search space set for monitoring PDCCH for detection of a multi-cell scheduling DCI format, and (iii) the UE determines an overbooking event for search space sets, then the UE can assign a higher priority to the search space set and drop other (single-cell scheduling) search space sets before dropping such a (multi-cell scheduling) search space set. Such operation can be beneficial, for example, when a search space set for multi-cell scheduling is configured in a later point in time after some single-cell scheduling search space sets corresponding to some cells from the set of co-scheduled cells are already configured, and therefore gNB is forced to assign a larger search space set index to the multi-cell scheduling search space set than those single-cell scheduling search space sets instead of re-configuring all search space sets.

Another embodiment, described in greater detail below, describes DSS operation for multi-cell scheduling. For example, for a UE (such as the UE 116) that is configured multi-cell scheduling for a set of co-scheduled cells, when the UE is configured to monitor PDCCH for the set of co-scheduling cells on a first scheduling cell and a second scheduling cell, the UE allocates PDCCH candidates and non-overlapping CCEs for multi-cell scheduling based on the approaches described herein, such that, for each cell from the set of co-scheduled cells, the UE maintains a similar allocation of PDCCH candidates and non-overlapping CCEs across the first and second scheduling cells as when there is a single scheduling cell for the set of co-scheduled cells. The first scheduling cell can be the PCell and the second scheduling cell can be a special scheduling secondary cell (SCell), referred to as sSCell. In one example, the set of co-scheduled cells includes the PCell. In another example, the set of co-scheduled cells additionally includes the sSCell. Therefore, both multi-cell scheduling and DSS operation impact a PDCCH monitoring behavior for a UE, wherein the impact of multi-cell scheduling is addressed separately from the impact of DSS operation.

Throughout the present disclosure, the term "configuration" or "higher layer configuration" and variations thereof (such as "configured" and so on) are used to refer to one or more of: a system information signaling such as by a master information block (MIB) or a system information block (SIB) (such as SIB1), a common or cell-specific higher layer/RRC signaling, or a dedicated or UE-specific or BWP-specific higher layer/RRC signaling.

Throughout the present disclosure, the term signal quality is used to refer to e.g., reference signal received power (RSRP), reference signal received quality (RSRQ), received signal strength indicator (RSSI), signal to noise ratio (SNR), or signal to interference and noise ratio (SINR), with or without filtering such as L1 or L3 filtering, of a channel or a signal such as a reference signal (RS) including a Synchronization signal (SS) physical broadcast channel (PBCH) block (also denoted as SS/PBCH or SSB), channel state information (CSI) RS, or sounding reference signal (SRS).

An antenna port is defined such that the channel over which a symbol on the antenna port is conveyed can be inferred from the channel over which another symbol on the same antenna port is conveyed.

For demodulation (DM) RS (also denoted as DM-RS) associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports can be said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE (such as the UE 116) may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same code division multiplexing (CDM) group are quasi co-located with respect to Doppler shift, Doppler spread, average delay, delay spread, and spatial Rx. The UE may also assume that DM-RS ports associated with a PDSCH are quasi co-located (QCL) with QCL Type A. Type D (when applicable) and average gain. The UE may further assume that no DM-RS collides with the SS/PBCH block.

A UE (such as the UE 116) can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take on one of the following values.

For example, a quasi co-location type of 'QCL-TypeA' can correspond to {Doppler shift, Doppler spread, average delay, delay spread}. For another example, a quasi co-location type of 'QCL-TypeB' can correspond to {Doppler shift, Doppler spread}. For another example, a quasi co-location type of 'QCL-TypeC' can correspond to {Doppler shift, average delay}. For yet another example, a quasi co-location type of 'QCL-TypeD' can correspond to 'QCL-TypeD': {Spatial Rx parameter}.

In certain embodiments, a UE (such as the UE 116) receives a MAC-CE activation command to map up to N, e.g., N=8 transmission configuration indication (TCI) states to the codepoints of the DCI field 'Transmission Configuration Indication'. When the hybrid automatic repeat request (HARQ)-acknowledgement (ACK) information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $n+3N_{slot}^{subframe,\mu}$. Here, $N_{slot}^{subframe,\mu}$ is a number of slots per subframe for subcarrier spacing (SCS) configuration $\mu$.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', then the UE may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

It is noted that if a UE is configured with enableDefault-TCIStatePerCoresetPoolIndex and the UE is configured by higher layer parameter PDCCH-Config that contains two different values of coresetPoolIndex in different ControlResourceSets, then the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORESET are in different component carriers).

It is also noted that if a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

In the cases above, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

If the PDCCH carrying the scheduling DCI is received on one component carrier, and the PDSCH scheduled by that DCI is on another component carrier: then the time Duration ForQCL is determined based on the subcarrier spacing of the scheduled PDSCH. If $\mu_{PDCCH} < \mu_{PDSCH}$ an additional timing delay $$d \frac{2^{\mu PDSCH}}{2^{\mu PDCCH}}$$

is added to the timeDurationForQCL, where d is defined in 5.2.1.5.1a-1, otherwise d is zero. For both the cases, when the UE is configured with enableDefaultBeamForCCS, and when the offset between the reception of the DL DCI and the corresponding PDSCH is less than the threshold time Duration ForQCL, and when the DL DCI does not have the TCI field present, the UE obtains its QCL assumption for the scheduled PDSCH from the activated TCI state with the lowest ID applicable to PDSCH in the active BWP of the scheduled cell.

For PUSCH scheduled by DCI format 0_0 on a cell and if the higher layer parameter enableDefaultBeamPL-For-PUSCH0-0 is set 'enabled', the UE is not configured with PUCCH resources on the active uplink (UL) BWP and the UE is in RRC connected mode, the UE shall transmit PUSCH according to the spatial relation, if applicable, with a reference to the RS configured with qcl-Type set to 'typeD' corresponding to the QCL assumption of the CORESET with the lowest ID on the active DL BWP of the cell.

For PUSCH scheduled by DCI format 0_0 on a cell and if the higher layer parameter enableDefaultBeamPL-For-PUSCH0 is set 'enabled', the UE is configured with PUCCH resources on the active UL BWP where all the PUCCH resource(s) are not configured with any spatial relation and the UE is in RRC connected mode, the UE shall transmit PUSCH according to the spatial relation, if applicable, with a reference to the RS configured with qcl-Type set to 'typeD' corresponding to the QCL assumption of the CORESET with the lowest ID on the active DL BWP of the cell in case CORESET(s) are configured on the cell.

In CA, two or more Component Carriers (CCs) are aggregated. A UE (such as the UE 116) may simultaneously receive or transmit on one or multiple CCs depending on its capabilities. For example, a UE with single timing advance capability for CA can simultaneously receive and/or transmit on multiple CCs corresponding to multiple serving cells sharing the same timing advance (multiple serving cells grouped in one Timing advance group (TAG)). For another example, a UE with multiple timing advance capability for CA can simultaneously receive and/or transmit on multiple CCs corresponding to multiple serving cells with different timing advances (multiple serving cells grouped in multiple TAGs). Next generation radio access network (NG-RAN) ensures that each TAG contains at least one serving cell. For yet another example, a non-CA capable UE can receive on a single CC and transmit on a single CC corresponding to one serving cell only (one serving cell in one TAG).

CA is supported for both contiguous and non-contiguous CCs. When CA is deployed frame timing and system frame number (SFN) are aligned across cells that can be aggregated, or an offset in multiples of slots between the PCell/primary secondary cell (PSCell) and an SCell is configured to the UE. The maximum number of configured CCs for a UE is 16 for DL and 16 for UL.

When CA is configured, the UE only has one RRC connection with the network. At RRC connection establishment/re-establishment/handover, one serving cell provides the non-access stratum (NAS) mobility information, and at RRC connection re-establishment/handover, one serving cell provides the security input. This cell is referred to as the PCell. Depending on UE capabilities, SCells can be configured to form together with the PCell a set of serving cells. The configured set of serving cells for a UE therefore includes one PCell and one or more SCells.

The reconfiguration, addition, and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signalling is used for sending all required system information of the SCell i.e., while in connected mode, UEs need not acquire broadcast system information directly from the SCells.

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform channel quality indicator (CQI) measurements. Conversely, when an SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signalling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells SCells added to the set are initially activated or deactivated and SCells which remain in the set (either unchanged or reconfigured) do not change their activation status (activated or deactivated).

At handover or connection resume from RRC_INACTIVE, SCells are activated or deactivated.

To enable reasonable UE battery consumption when Bandwidth adaptation (BA) is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, physical random access channel (PRACH) and Uplink shared channel (UL-SCH).

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, Automatic gain control (AGC) and beam management, if configured. A DCI is used to control entering/leaving the dormant BWP for one or more SCell(s) or one or more SCell group(s).

The dormant BWP is one of the UE's dedicated BWPs configured by network via dedicated RRC signalling. The SpCell and PUCCH SCell cannot be configured with a dormant BWP.

Cross-carrier scheduling with the CIF allows the PDCCH of a serving cell to schedule resources on another serving cell but with the following restrictions: (i) cross-carrier scheduling does not apply to PCell i.e., PCell is scheduled via its PDCCH; (ii) when an SCell is configured with a PDCCH, that cell's PDSCH and PUSCH are scheduled by the PDCCH on this SCell; (iii) when an SCell is not configured with a PDCCH, that SCell's PDSCH and PUSCH are scheduled by a PDCCH on another serving cell; and (iv) the scheduling PDCCH and the scheduled PDSCH/PUSCH can use the same or different numerologies.

Some of the restrictions above may be relaxed. For example, DSS allows LTE and NR to share the same carrier. As the number of NR devices in a network increase, it is important that sufficient scheduling capacity for NR UEs on the shared carriers is ensured. In the case of DSS operation, PDCCH enhancements for cross-carrier scheduling including can be considered such that PDCCH of an SCell, referred to as a special/scheduling SCell (sSCell), can schedule PDSCH or PUSCH on the P(S) Cell.

The PDCCH can be used to schedule DL transmissions on PDSCH and UL transmissions on PUSCH. Here the DCI on PDCCH includes downlink assignments containing at least modulation and coding format, resource allocation, and hybrid-ARQ information related to DL-SCH. The DCI on PDCCH also includes uplink scheduling grants containing at least modulation and coding format, resource allocation, and hybrid-ARQ information related to UL-SCH.

In addition to scheduling. PDCCH can be used for (i) activation and deactivation of configured PUSCH transmission with configured grant; (ii) activation and deactivation of PDSCH semi-persistent transmission; (iii) notifying one or more UEs of the slot format; (iv) notifying one or more UEs of the physical resource block(s) (PRB(s)) and OFDM symbol(s) where the UE may assume no transmission is intended for the UE; (v) transmission of transmit power control (TPC) commands for PUCCH and PUSCH; (vi) transmission of one or more TPC commands for SRS transmissions by one or more UEs; (vii) switching a UE's active bandwidth part; (viii) initiating a random access procedure; (ix) indicating the UE(s) to monitor the PDCCH during the next occurrence of the discontinuous reception (DRX) on-duration; and (x) in IAB context, indicating the availability for soft symbols of an IAB-DU.

A UE (such as the UE 116) monitors a set of PDCCH candidates in the configured monitoring occasions in one or more configured CORESETs according to the corresponding search space configurations.

A CORESET includes a set of PRBs with a time duration of 1 to 3 OFDM symbols. The resource units Resource Element Groups (REGs) and Control Channel Elements (CCEs) are defined within a CORESET with each CCE including a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH. Each resource element group carrying PDCCH carries its own DM-RS. QPSK modulation is used for PDCCH.

A UE (such as the UE 116) monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

If a UE (such as the UE 116) is provided monitoringCapabilityConfig for a serving cell, the UE obtains an indication to monitor PDCCH on the serving cell for a maximum number of PDCCH candidates and non-overlapping CCEs (i) per slot if monitoring CapabilityConfig=r15monitoringcapability, or (ii) span per if monitoring CapabilityConfig=r16monitoringcapability.

If the UE is not provided monitoring CapabilityConfig, the UE monitors PDCCH on the serving cell for a maximum number of PDCCH candidates and non-overlapping CCEs per slot.

A UE (such as the UE 116) can indicate a capability to monitor PDCCH according to one or more of the combinations (X, Y)=(2, 2), (4, 3), and (7, 3) per SCS configuration of $\mu=0$ and $\mu=1$. A span is a number of consecutive symbols in a slot where the UE is configured to monitor PDCCH. Each PDCCH monitoring occasion is within one span. If a UE monitors PDCCH on a cell according to combination (X, Y), the UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y.

If a UE can support (i) a first set of $N_{cells,0}^{DL}$ serving cells where the UE is either not provided coresetPoolIndex or is provided coresetPoolIndex with a single value for all CORESETs on all DL BWPs of each scheduling cell from the first set of serving cells, and (ii) a second set of $N_{cells,1}^{DL}$ serving cells where the UE is not provided coresetPoolIndex or is provided coresetPoolIndex with a value 0 for a first CORESET, and with a value 1 for a second CORESET on any DL BWP of each scheduling cell from the second set of serving cells, then the UE determines, for the purpose of reporting pdcch-BlindDetectionCA, a number of serving cells as $N_{cells,0}^{DL}+R \cdot N_{cells,1}^{DL}$ where R is a value reported by the UE.

If a UE (such as the UE 116) indicates in UE-NR-Capability a carrier aggregation capability larger than 4 serving cells and the UE is not provided monitoring CapabilityConfig for any downlink cell or if the UE is provided monitoring CapabilityConfig=r15monitoringcapability for all downlink cells where the UE monitors PDCCH, the UE includes in UE-NR-Capability an indication for a maximum number of PDCCH candidates and for a maximum number of non-overlapped CCEs the UE can monitor per slot when the UE is configured for carrier aggregation operation over more than 4 cells. When a UE is not configured for NR-DC operation, the UE determines a capability to monitor a maximum number of PDCCH candidates and a maximum number of non-overlapped CCEs per slot that corresponds to $N_{cells}^{cap}$ downlink cells, where $N_{cells}^{cap}$ is $N_{cells,0}^{DL}+R \cdot N_{cells,1}^{DL}$ if the UE does not provide pdcch-BlindDetectionCA where $N_{cells,0}^{DL}+N_{cells,1}^{DL}$ is the number of configured downlink serving cells; otherwise, $N_{cells}^{cap}$ is the value of pdcch-BlindDetectionCA.

When a UE (such as the UE 116) is configured for NR-DC operation, the UE determines a capability to monitor a maximum number of PDCCH candidates and a maximum number of non-overlapped CCEs per slot that corresponds to $N_{cells}^{cap}=N_{cells}^{MCG}$ downlink cells for the master cell group (MCG) where $N_{cells}^{MCG}$ is provided by pdcch-BlindDetection for the MCG and determines a capability to monitor a maximum number of PDCCH candidates and a maximum number of non-overlapped CCEs per slot that corresponds to $N_{cells}^{cap}=N_{cells}^{SCG}$ downlink cells for the cells secondary cell group (SCG) where $N_{cells}^{SCG}$ is provided by pdcch-BlindDetection for the SCG. When the UE is configured for carrier aggregation operation over more than 4 cells, or for a cell group when the UE is configured for NR-DC operation, the UE does not expect to monitor per slot a number of PDCCH candidates or a number of non-overlapped CCEs that is larger than the maximum number as derived from the corresponding value of $N_{cells}^{cap}$.

If a UE (such as the UE 116) indicates in UE-NR-Capability-r16 a carrier aggregation capability larger than two downlink cells, the UE includes in UE-NR-Capability-r16 an indication for a maximum number of PDCCH candidates and a maximum number of non-overlapped CCEs that the UE can monitor per span when the UE is configured for carrier aggregation operation over more than two downlink cells with monitoringCapabilityConfig=r16monitoringcapability. When a UE (such as the UE 116) is not configured for NR-DC operation and the UE is provided monitoring CapabilityConfig=r16monitoringcapability for all downlink cell where the UE monitors PDCCH, the UE determines a capability to monitor a maximum number of PDCCH candidates and a maximum number of non-overlapped CCEs per span that corresponds to $N_{cells}^{cap-r16}$ downlink cells, where $N_{cells}^{cap-r16}$ is the number of configured downlink cells if the UE does not provide pdcch-MonitoringCA; otherwise, $N_{cells}^{cap-r16}$ cells is the value of pdcch-MonitoringCA.

When the UE is configured for carrier aggregation operation over more than 2 cells, or for a cell group when the UE is configured for NR-DC operation, the UE does not expect to monitor per span a number of PDCCH candidates or a number of non-overlapped CCEs that is larger than the maximum number as derived from the corresponding value of $N_{cells}^{cap-r16}$.

If a UE (such as the UE 116) indicates in UE-NR-Capability a carrier aggregation capability larger than one downlink cell with monitoringCapabilityConfig=r15monitoringcapability or larger than one downlink cell with monitoring CapabilityConfig=r16monitoringcapability, the UE includes in UE-NR-Capability-r16 an indication for a maximum number of PDCCH candidates and a maximum number of non-overlapped CCEs the UE can monitor for downlink cells with monitoringCapabilityConfig=r15monitoringcapability or for downlink cells with monitoringCapabilityConfig=r16monitoringcapability when the UE is configured for carrier aggregation operation over more than two downlink cells with at least one downlink cell with monitoringCapabilityConfig=r15monitoringcapability and at least one downlink cell with monitoringCapabilityConfig=r16monitoringcapability. When a UE is not configured for NR-DC operation, the UE determines a capability to monitor a maximum number of PDCCH candidates and a maximum number of non-overlapped CCEs per slot or per span that corresponds to $N_{cells,r15}^{cap-r16}$ downlink cells or to $N_{cellsr,16}^{cap-r16}$ downlink cells, respectively. Here, $N_{cells,r15}^{cap-r16}$ is the number of configured downlink cells if the UE does not provide pdcch-BlindDetectionCA1; otherwise, if the UE reports only one combination of (pdcch-BlindDetectionCA1, pdcch-BlindDetectionCA2), $N_{cells,r15}^{cap-r16}$ cells, r15 is the value of pdcch-BlindDetectionCA1; else, $N_{cells,r15}^{cap-r16}$ V cells, r15 is the value of pdcch-BlindDetectionCA1 from a combination of (pdcch-BlindDetectionCA1, pdcch-BlindDetectionCA2) that is provided by pdcch-BlindDetectionCA-CombIndicator. Additionally, $N_{cells,r16}^{cap-r16}$ is the number of configured downlink cells if the UE does not provide pdcch-BlindDetectionCA2; otherwise, if the UE reports only one combination of (pdcch-BlindDetectionCA1, pdcch-BlindDetectionCA2), $N_{cells,r16}^{cap-r16}$ is the value of pdcch-BlindDetectionCA2, else, $N_{cells,r16}^{cap-r16}$ is the value of pdcch-BlindDetectionCA2 from a combination of (pdcch-BlindDetectionCA1, pdcch-BlindDetectionCA2) that is provided by pdcch-BlindDetectionCA-CombIndicator.

A set of PDCCH candidates for a UE to monitor is defined in terms of PDCCH search space sets. A search space set can be a CSS set or a USS set. A UE monitors PDCCH candidates in one or more of the following search spaces sets. For example, a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a system information (SI)-radio network temporary identifier (RNTI) on the primary cell of the MCG. For another example, a Type0A-PDCCH CSS set configured by searchSpaceOtherSystemInformation in PDCCH-ConfigCommon for a DCI format with CRC scrambled by a system information-RNTI (SI-RNTI) on the primary cell of the MCG. For another example, a Type1-PDCCH CSS set configured by ra-SearchSpace in PDCCH-ConfigCommon for a DCI format with CRC scrambled by a random access-RNTI (RA-RNTI), a MsgB-RNTI, or a temporary cell-RNTI (TC-RNTI) on the primary cell. For another example, a Type2-PDCCH CSS set configured by pagingSearchSpace in PDCCH-ConfigCommon for a DCI format with CRC scrambled by a paging-RNTI (P-RNTI) on the primary cell of the MCG. For another example, a Type3-PDCCH CSS set configured by SearchSpace in PDCCH-Config with searchSpaceType=common for DCI formats with CRC scrambled by INT-RNTI, slot format indication-RNTI (SFI-RNTI), TPC-PUSCH-RNTI, TPC-PUCCH-RNTI, TPC-SRS-RNTI, or cancelation indication-RNTI (CI-RNTI) and, only for the primary cell, cell-RNTI (C-RNTI), modulation and coding scheme-C-RNTI (MCS-C-RNTI), CS-RNTI(s), or power savings (PS-RNTI). For yet another example, a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), sidelink-RNTI (SL-RNTI), SL-CS-RNTI, or SL Semi-Persistent Scheduling V-RNTI.

If a UE (such as the UE 116) is provided(i) one or more search space sets by corresponding one or more of searchSpaceZero, searchSpaceSIB1, searchSpaceOtherSystemInformation, pagingSearchSpace, ra-SearchSpace, or a CSS set by PDCCH-Config, and (ii) a SI-RNTI, a P-RNTI, a RA-RNTI, a MsgB-RNTI, a SFI-RNTI, an INT-RNTI, a TPC-PUSCH-RNTI, a TPC-PUCCH-RNTI, or a TPC-SRS-RNTI, then for a RNTI from any of these RNTIs, the UE does not expect to process information from more than one DCI format with CRC scrambled with the RNTI per slot.

For each DL BWP configured to a UE in a serving cell, the UE can be provided by higher layer signalling with P≤3 CORESETs if coresetPoolIndex is not provided, or if a value of coresetPoolIndex is same for all CORESETs if coresetPoolIndex is provided. Similarly, for each DL BWP configured to a UE in a serving cell, the UE can be provided by higher layer signalling with P≤5 CORESETs if coresetPoolIndex is not provided for a first CORESET, or is provided and has a value 0 for a first CORESET, and is provided and has a value 1 for a second CORESET.

For each CORESET, the UE is provided the following by ControlResourceSet. The UE can be provided, by ControlResourceSet, a CORESET index p, by controlResourceSetId or by controlResourceSetId-v1610, Here. 0<p<12 if coresetPoolIndex is not provided, or if a value of coresetPoolIndex is same for all CORESETs if coresetPoolIndex is provided. Additionally, 0<p<16 if coresetPoolIndex is not provided for a first CORESET, or is provided and has a value 0 for a first CORESET, and is provided and has a value 1 for a second CORESET. The UE can be provided, by ControlResourceSet, a DM-RS scrambling sequence initialization value by pdcch-DMRS-ScramblingID. The UE can be provided, by ControlResourceSet, a precoder granularity for a number of REGs in the frequency domain where the UE can assume use of a same DM-RS precoder by precoderGranularity. The UE can be provided, by ControlResourceSet, a number of consecutive symbols provided by duration. The UE can be provided, by ControlResourceSet, a set of resource blocks provided by frequencyDomainResources. The UE can be provided, by ControlResourceSet, CCE-to-REG mapping parameters provided by cce-REG-Mapping-Type. The UE can be provided, by ControlResourceSet, an antenna port quasi co-location, from a set of antenna port quasi co-locations provided by TCI-State, indicating quasi co-location information of the DM-RS antenna port for PDCCH reception in a respective CORESET. Here, if the UE is provided by simultaneousTCI-UpdateList1 or simultaneousTCI-UpdateList2 up to two lists of cells for simultaneous TCI state activation, the UE applies the antenna port quasi co-location provided by TCI-States with same activated tci-StateID value to CORESETs with index p in all configured DL BWPs of all configured cells in a list determined from a serving cell index provided by a MAC CE command. The UE can be provided, by ControlResourceSet, an indication for a presence or absence of a TCI field for a DCI format, other than DCI format 1_0, that schedules PDSCH receptions or indicates semi-persistent scheduling (SPS) PDSCH release or indicates SCell dormancy or indicates a request for a Type-3 HARQ-ACK codebook report without scheduling PDSCH and is transmitted by a PDCCH in CORESET p, by tci-PresentInDCI or tci-PresentDCI-1-2.

When precoderGranularity=allContiguousRBs, a UE does not expect (i) to be configured a set of resource blocks of a CORESET that includes more than four sub-sets of resource blocks that are not contiguous in frequency and (ii) any RE of a CORESET to overlap with any RE determined from lte-CRS-ToMatchAround, or from LTE-CRS-PatternList, or with any RE of a SS/PBCH block.

For each CORESET in a DL BWP of a serving cell, a respective frequencyDomainResources provides a bitmap if a CORESET is not associated with any search space set configured with freqMonitorLocations, the bits of the bitmap have a one-to-one mapping with non-overlapping groups of 6 consecutive PRBs, in ascending order of the PRB index in the DL BWP bandwidth of $N_{RB}^{BWP}$ PRBs with starting common RB position $N_{BWP}^{start}$, where the first common RB of the first group of 6 PRBs has common RB index $6 \cdot \lceil N_{BWP}^{start}/6 \rceil$ if rb-Offset is not provided, or the first common RB of the first group of 6 PRBs has common RB index $N_{BWP}^{start}+N_{RB}^{offset}$ where $N_{RB}^{offset}$ is provided by rb-Offset. Similarly, for each CORESET in a DL BWP of a serving cell, a respective frequencyDomainResources provides a bitmap if a CORESET is associated with at least one search space set configured with freqMonitorLocations, the first $N_{RBG,set0}^{size}$ bits of the bitmap have a one-to-one mapping with non-overlapping groups of 6 consecutive PRBs, in ascending order of the PRB index in each RB set k in the DL BWP bandwidth of $N_{RB}^{BWP}$ PRBs with starting common RB position $RB_{s0+k,DL}^{start,\mu}$, see REF4, where the first common RB of the first group of 6 PRBs has common RB index $RB_{s0+k,DL}^{start,\mu}+N_{RB}^{offset}$ and k is indicated by freqMonitorLocations if provided for a search space set; otherwise, k=0. $N_{RBG,set0}^{size} = \lfloor (N_{RB,set0}^{size}-N_{RB}^{offset})/6 \rfloor$, $N_{RB,set0}^{size}$ is a number of available PRBs in the RB set 0 for the DL BWP, and $N_{RB}^{offset}$ is provided by rb-Offset or $N_{RB}^{offset}=0$ if rb-Offset is not provided. If a UE is provided RB sets in the DL BWP, the UE expects that the RBs of the CORESET are within the union of the PRBs in the RB sets of the DL BWP.

For a CORESET other than a CORESET with index 0, if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in REF5, the UE assumes that the DM-RS antenna port associated with PDCCH receptions is quasi co-located with the SS/PBCH block the UE identified during the initial access procedure. Additionally, for a CORESET other than a CORESET with index 0, if a UE has been provided a configuration of more than one TCI states by tci-StatesPDCCH-ToAddList and tci-StatesPDCCH-ToReleaseList for the CORESET as part of Reconfiguration with sync procedure as described in REF6 but has not received a MAC CE activation command for one of the TCI states as described in REF5, the UE assumes that the DM-RS antenna port associated with PDCCH receptions is quasi co-located with the SS/PBCH block or the CSI-RS resource the UE identified during the random access procedure initiated by the Reconfiguration with sync procedure as described in REF6.

For a CORESET with index 0, the UE assumes that a DM-RS antenna port for PDCCH receptions in the CORESET is quasi co-located with one or more DL RS configured by a TCI state, where the TCI state is indicated by a MAC CE activation command for the CORESET, if any, or a SS/PBCH block the UE identified during a most recent random access procedure not initiated by a PDCCH order that triggers a contention-free random access procedure, if no MAC CE activation command indicating a TCI state for the CORESET is received after the most recent random access procedure.

For a CORESET other than a CORESET with index 0, if a UE (such as the UE 116) is provided a single TCI state for a CORESET, or if the UE receives a MAC CE activation command for one of the provided TCI states for a CORESET, the UE assumes that the DM-RS antenna port associated with PDCCH receptions in the CORESET is quasi co-located with the one or more DL RS configured by the TCI state. For a CORESET with index 0, the UE expects that a CSI-RS configured with qcl-Type set to 'typeD' in a TCI state indicated by a MAC CE activation command for the CORESET is provided by a SS/PBCH block, if the UE receives a MAC CE activation command for one of the TCI states, the UE applies the activation command in the first slot that is after slot $k+3N_{slot}^{subframe,\mu}$ where k is the slot where the UE would transmit a PUCCH with HARQ-ACK information for the PDSCH providing the activation command and $\mu$ is the SCS configuration for the PUCCH. The active BWP is defined as the active BWP in the slot when the activation command is applied.

The information element (IE) SearchSpace, described in Syntax (1) below, defines how/where to search for PDCCH candidates. Each search space is associated with one ControlResourceSet. For a scheduled cell in the case of cross carrier scheduling, except for nrofCandidates, all the optional fields are absent (regardless of their presence conditions).

```
Syntax                                                         (1)
-- ASN1START
-- TAG-SEARCHSPACE-START
SearchSpace ::=                      SEQUENCE {
    searchSpaceType                      SearchSpaceId,
    controlResourceSetId                 ControlResourceSetId
OPTIONAL,    -- Cond SetupOnly
    monitoringSlotPeriodicityAndOffset   CHOICE {
        sl1                              NULL,
        sl2                              INTEGER (0..1),
        sl4                              INTEGER (0..3),
        sl5                              INTEGER (0..4),
        sl8                              INTEGER (0..7),
        sl10                             INTEGER (0..9),
        sl16                             INTEGER (0..15),
        sl20                             INTEGER (0..19),
        sl40                             INTEGER (0..39),
        sl80                             INTEGER (0..79),
        sl160                            INTEGER (0..159),
        sl320                            INTEGER (0..319),
        sl640                            INTEGER (0..639),
        sl1280                           INTEGER (0..1279),
        sl2560                           INTEGER (0..2559)
    }
OPTIONAL,    -- Cond Setup
    Duration                         INTEGER (2..2559)
OPTIONAL,    -- Need R
    monitoringSymbolsWithinSlot      BIT STRING (SIZE (14))
OPTIONAL,    -- Cond Setup
    nrofCandidates                   SEQUENCE {
        aggregationLevel1                ENUMERATED {n0, n1, n2, n3, n4, n5, n6, n8},
        aggregationLevel2                ENUMERATED {n0, n1, n2, n3, n4, n5, n6, n8},
        aggregationLevel4                ENUMERATED {n0, n1, n2, n3, n4, n5, n6, n8},
        aggregationLevel8                ENUMERATED {n0, n1, n2, n3, n4, n5, n6, n8},
        aggregationLevel16               ENUMERATED {n0, n1, n2, n3, n4, n5, n6, n8}
    }
OPTIONAL,    -- Cond Setup
    searchSpaceType                  CHOICE {
        common                           SEQUENCE {
            dci-Format0-0-AndFormat1-0       SEQUENCE {
                ...
            }
OPTIONAL,    -- Need R
            dci-Format2-0                    SEQUENCE {
                nrofCandidates-SFI               SEQUENCE {
                    aggregationLevel1                ENUMERATED {n1, n2}
OPTIONAL,    -- Need R
                    aggregationLevel2                ENUMERATED {n1, n2}
OPTIONAL,    -- Need R
                    aggregationLevel4                ENUMERATED {n1, n2}
OPTIONAL,    -- Need R
                    aggregationLevel8                ENUMERATED {n1, n2}
OPTIONAL,    -- Need R
                    aggregationLevel16               ENUMERATED {n1, n2}
OPTIONAL    -- Need R
                },
                ...
            }
```

```
    OPTIONAL,  -- Need R
        dci-Format2-1            SEQUENCE {
            ...
        }
    OPTIONAL,  -- Need R
        dci-Format2-2            SEQUENCE {
            ...
        }
    OPTIONAL,  -- Need R
        dci-Format2-3            SEQUENCE {
            dummy1                   ENUMERATED {sl1, sl2, sl4, sl5, sl8, sl10, sl16, sl20}
    OPTIONAL,  -- Cond Setup
            dummy2                   ENUMERATED {n1, n2},
            ...
        }
    OPTIONAL   -- Need R
    },
        ue-Specific              SEQUENCE {
            dci-Formats              ENUMERATED {formats0-0-And-1-0, formats0-1-
And-1-1},
            ...,
            [[
            dci-Formats-MT-r16       ENUMERATED {formated2-5}
    OPTIONAL,  -- Need R
            dci-FormatsSL-r16        ENUMERATED {formats0-0-And-1-0, formats0-1-And-
1-1, formats3-0, formats3-1,
                                     formats3-0-And-3-1}
    OPTIONAL,  -- Need R
            dci-FormatsExt-r16       ENUMERATED {formats0-2-And-1-2, formats0-1-And-
1-1And-0-2-And-1-2}
    OPTIONAL   -- Need R
            ]]
        }
    }
    OPTIONAL   -- Cond Setup2
}
SearchSpaceExt-r16 ::=       SEQUENCE {
    controlResourceSetId-r16     ControlResourceSetId-r16
    OPTIONAL,  -- Cond SetupOnly2
    searchSpaceType-r16          SEQUENCE {
        common-r16                   SEQUENCE {
            dci-Format2-4-r16            SEQUENCE {
                nrofCandidates-CI-r16        SEQUENCE {
                    aggregationLevel1-r16        ENUMERATED {n1, n2}
    OPTIONAL,  -- Need R
                    aggregationLevel2-r16        ENUMERATED {n1, n2}
    OPTIONAL,  -- Need R
                    aggregationLevel4-r16        ENUMERATED {n1, n2}
    OPTIONAL,  -- Need R
                    aggregationLevel8-r16        ENUMERATED {n1, n2}
    OPTIONAL,  -- Need R
                    aggregationLevel16-r16       ENUMERATED {n1, n2}
    OPTIONAL,  -- Need R
                },
                ...
            }
    OPTIONAL,  -- Need R
            dci-Format2-5-r16            SEQUENCE {
                nrofCandidates-IAB-r16       SEQUENCE {
                    aggregationLevel1-r16        ENUMERATED {n1, n2}
    OPTIONAL,  -- Need R
                    aggregationLevel2-r16        ENUMERATED {n1, n2}
    OPTIONAL,  -- Need R
                    aggregationLevel4-r16        ENUMERATED {n1, n2}
    OPTIONAL,  -- Need R
                    aggregationLevel8-r16        ENUMERATED {n1, n2}
    OPTIONAL,  -- Need R
                    aggregationLevel16-r16       ENUMERATED {n1, n2}
    OPTIONAL,  -- Need R
                },
                ...
    OPTIONAL,  -- Need R
            dci-Format2-6-r16            SEQUENCE {
                ...,
            }
    OPTIONAL,  -- Need R
            ...
        }
    }
```

```
OPTIONAL,   -- Cond Setup3
  searchSpaceGroupList-r16      SEQUENCE (SIZE (1..2)) OF INTEGER (0..1)
OPTIONAL,   -- Need R
  freqMonitorLocations-r16      BIT STRING (SIZE (5))
OPTIONAL,   -- Need R
}
-- TAG-SEARCHSPACE-STOP
-- ASN1STOP
```

For each DL BWP configured to a UE in a serving cell, the UE is provided by higher layers with S≤10. Search space sets where, for each search space set from the S search space sets, the UE is provided the following by SearchSpace. For example, the UE is provided a search space set index s, 0<s<40, by searchSpaceId. For another example, the UE is provided an association between the search space set s and a CORESET p by controlResourceSetId or by controlResourceSetId-v1610. For another example, the UE is provided a PDCCH monitoring periodicity of $k_s$ slots and a PDCCH monitoring offset of $o_s$ slots, by monitoringSlotPeriodicityAndOffset. For another example, the UE is provided a PDCCH monitoring pattern within a slot, indicating first symbol(s) of the CORESET within a slot for PDCCH monitoring, by monitoringSymbolsWithinSlot. For another example, the UE is provided a duration of $T_s < k_s$ slots indicating a number of slots that the search space set s exists by duration. For another example, the UE is provided a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively. For yet another example, the UE is provided an indication that search space set s is either a CSS set, or a USS set by searchSpaceType.

For another example, if search space set s is a CSS set, the UE is provided an indication by dci-Format0-0-AndFormat1-0 to monitor PDCCH candidates for DCI format 0_0 and DCI format 1_0. For another example, if search space set s is a CSS set, the UE is provided an indication by dci-Format2-0 to monitor one or two PDCCH candidates, or to monitor one PDCCH candidate per RB set if the UE is provided freqMonitorLocations for the search space set, for DCI format 2_0 and a corresponding CCE aggregation level. For another example, if search space set s is a CSS set, the UE is provided an indication by dci-Format2-1 to monitor PDCCH candidates for DCI format 2_1. For another example, if search space set s is a CSS set, the UE is provided an indication by dci-Format2-2 to monitor PDCCH candidates for DCI format 2_2. For another example, if search space set s is a CSS set, the UE is provided an indication by dci-Format2-3 to monitor PDCCH candidates for DCI format 2_3. For another example, if search space set s is a CSS set, the UE is provided an indication by dci-Format2-4 to monitor PDCCH candidates for DCI format 2_4. For yet another example, if search space set s is a CSS set, the UE is provided an indication by dci-Format2-6 to monitor PDCCH candidates for DCI format 2_6.

For another example, if search space set s is a USS set, the UE is provided an indication by dci-Formats to monitor PDCCH candidates either for DCI format 0_0 and DCI format 1_0, or for DCI format 0_1 and DCI format 1_1, or an indication by dci-FormatsExt to monitor PDCCH candidates for DCI format 0_2 and DCI format 1_2, or for DCI format 0_1, DCI format 1_1, DCI format 0_2, and DCI format 1_2, or for DCI format 3_0, or for DCI format 3_1, or for DCI format 3_0 and DCI format 3_1.

For yet another example, a bitmap by freqMonitorLocations, if provided, to indicate an index of one or more RB sets for the search space set s, where the most significant bit (MSB) k in the bitmap corresponds to RB set k−1 in the DL BWP. For RB set k indicated in the bitmap, the first PRB of the frequency domain monitoring location confined within the RB set is given by $RB_{s0+k,DL}^{start,\mu} + N_{RB}^{offset}$, where $RB_{s0+k,DL}^{start,\mu}$ is the index of first common RB of the RB set k as described in REF4, and $N_{RB}^{offset}$ is provided by rb-Offset or $N_{RB}^{offset}=0$ if rb-Offset is not provided. For each RB set with a corresponding value of 1 in the bitmap, the frequency domain resource allocation pattern for the monitoring location is determined based on the first $N_{RBG,set\ 0}^{size}$ bits in frequencyDomainResources provided by the associated CORESET configuration.

If the monitoringSymbolsWithinSlot indicates to a UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

In certain embodiments, a UE (such as the UE 116) does not expect to be provided a first symbol and a number of consecutive symbols for a CORESET that results to a PDCCH candidate mapping to symbols of different slots.

In certain embodiments, a UE (such as the UE 116) does not expect any two PDCCH monitoring occasions on an active DL BWP, for a same search space set or for different search space sets, in a same CORESET to be separated by a non-zero number of symbols that is smaller than the CORESET duration.

In certain embodiments, a UE (such as the UE 116) determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^{\mu}$ in a frame with number $n_f$ if $(n_f \cdot N_{slot}^{frame,\mu} + n_{s,f}^{\mu} - o_s) \mod k_s = 0$. The UE monitors PDCCH candidates for slot search space set s for $T_s$ consecutive slots, starting from slot $n_{s,f}^{\mu}$, and does not monitor PDCCH candidates for search space set s for the next $k_s - T_s$ consecutive slots.

A USS at CCE aggregation level $L \in \{1, 2, 4, 8, 16\}$ is defined by a set of PDCCH candidates for CCE aggregation level L.

If a UE is configured with CrossCarrierSchedulingConfig for a serving cell the carrier indicator field value corresponds to the value indicated by CrossCarrierSchedulingConfig.

For an active DL BWP of a serving cell on which a UE monitors PDCCH candidates in an USS, if the UE is not configured with a carrier indicator field, the UE monitors the PDCCH candidates without carrier indicator field. For an active DL BWP of a serving cell on which a UE monitors PDCCH candidates in an USS, if a UE is configured with a carrier indicator field, the UE monitors the PDCCH candidates with carrier indicator field.

A UE does not expect to monitor PDCCH candidates on an active DL BWP of a secondary cell if the UE is configured to monitor PDCCH candidates with carrier indicator field corresponding to that secondary cell in another serving cell. For the active DL BWP of a serving cell on which the UE monitors PDCCH candidates, the UE monitors PDCCH candidates at least for the same serving cell.

For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are described in Equation (1), below.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad (1)$$

Here in Equation (1), for any CSS, $Y_{p,n_{s,f}^{\mu}}=0$. Additionally for a USS, $Y_{p,n_{s,f}^{\mu}}=(A_p \cdot Y_{p,n_{s,f}^{\mu}-1}) \bmod D$, $Y_{p,-1}=n_{RNTI} \neq 0$, $A_p=39827$ for pmod3=0, $A_p=39829$ for pmod3=1, $A_p=39839$ for pmod3=2, and D=65537. Additionally, i=0, . . . , L−1. The expression $N_{CCE,p}$ is the number of CCEs, numbered from 0 to $N_{CCE,p}-1$, in CORESET p and, if any, per RB set. The expression $n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$. The expression $n_{CI} m_{s,n_{CI}}=0, \ldots, M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$. For any CSS, $M_{s,max}^{(L)}=M_{s,0}^{(L)}$. For a USS, $M_{s,max}^{(L)}$ is the maximum of $M_{s,n_{CI}}^{(L)}$ over all configured $n_{CI}$ values for a CCE aggregation level L of search space set s. Additionally, the RNTI value used for $n_{RNTI}$ is the C-RNTI.

In certain embodiments, a UE (such as the UE 116) expects to monitor PDCCH candidates for up to 4 sizes of DCI formats that include up to 3 sizes of DCI formats with CRC scrambled by C-RNTI per serving cell. (This rule is sometimes referred to as the "3+1" DCI format size budget.) The UE counts a number of sizes for DCI formats per serving cell based on a number of configured PDCCH candidates in respective search space sets for the corresponding active DL BWP.

A PDCCH candidate with index $m_{s_j,n_{CI}}$ for a search space set $s_j$ using a set of CCEs in a CORESET p on the active DL BWP for serving cell $n_{CI}$ is not counted for monitoring if there is a PDCCH candidate with index $m_{s_i,n_{CI}}$ for a search space set $s_i<s_j$, or if there is a PDCCH candidate with index $n_{s_j,n_{CI}}$ and $n_{s_j,n_{CI}}<m_{s_j,n_{CI}}$, in the CORESET p on the active DL BWP for serving cell $n_{CI}$ using a same set of CCEs, the PDCCH candidates have identical scrambling, and the corresponding DCI formats for the PDCCH candidates have a same size; otherwise, the PDCCH candidate with index $m_{s_j,n_{CI}}$ is counted for monitoring.

In certain embodiments, a UE (such as the UE 116) does not expect to be configured CSS sets that result to corresponding total, or per scheduled cell, numbers of monitored PDCCH candidates and non-overlapped CCEs per slot or per span that exceed the corresponding maximum numbers per slot or per span, respectively.

For same cell scheduling or for cross-carrier scheduling, a UE does not expect a number of PDCCH candidates, and a number of corresponding non-overlapped CCEs per slot or per span on a secondary cell to be larger than the corresponding numbers that the UE is capable of monitoring on the secondary cell per slot or per span, respectively. If a UE is provided monitoringCapabilityConfig=r16monitoringcapability for the primary cell, except the first span of each slot, the UE does not expect a number of PDCCH candidates and a number of corresponding non-overlapped CCEs per span on the primary cell to be larger than the corresponding numbers that the UE is capable of monitoring on the primary cell per span.

For cross-carrier scheduling, the number of PDCCH candidates for monitoring and the number of non-overlapped CCEs per span or per slot are separately counted for each scheduled cell.

Table 10.1-2 in REF3, reproduced below and denoted as Table (1) describes the maximum number of monitored PDCCH candidates, $M_{PDCCH}^{max,slot,\mu}$, per slot for a UE in a DL BWP with SCS configuration u for operation with a single serving cell. That is, Table (1) describes a maximum number $M_{PDCCH}^{max,slot,\mu}$ of monitored PDCCH candidates per slot for a DL BWP with SCS configuration $\mu \in \{0, 1, 2, 3\}$ for a single serving cell

TABLE 1

| $\mu$ | Maximum number of monitored PDCCH candidates per slot and per serving cell $M_{PDCCH}^{max,\ slot,\ \mu}$ |
|---|---|
| 0 | 44 |
| 1 | 36 |
| 2 | 22 |
| 3 | 20 |

Table 10.1-2A in REF3 reproduced below and denoted as Table (2) describes the maximum number of monitored PDCCH candidates, $M_{PDCCH}^{max,(X,Y),\mu}$, per span for a UE in a DL BWP with SCS configuration u for operation with a single serving cell. That is, Table (2) describes a maximum number $M_{PDCCH}^{max,(X,Y),\mu}$ of monitored PDCCH candidates in a span for combination (X, Y) for a DL BWP with SCS configuration $\mu \in \{0, 1\}$ for a single serving cell.

TABLE 2

| | Maximum number $M_{PDCCH}^{max,\ (X,\ Y),\ \mu}$ of monitored PDCCH candidates per span for combination (X, Y) and per serving cell | | |
|---|---|---|---|
| $\mu$ | (2, 2) | (4, 3) | (7, 3) |
| 0 | 14 | 28 | 44 |
| 1 | 12 | 24 | 36 |

Table 10.1-3 in REF3 reproduced below and denoted as Table (3) describes the maximum number of non-overlapped CCEs, $C_{PDCCH}^{max,slot,\mu}$, for a DL BWP with SCS configuration $\mu$ that a UE is expected to monitor corresponding PDCCH candidates per slot for operation with a single serving cell. CCEs for PDCCH candidates are non-overlapped if they correspond to (i) different CORESET indexes, or (ii) different first symbols for the reception of the respective PDCCH candidates. That is, Table (3) describes the maximum number $C_{PDCCH}^{max,slot,\mu}$ of non-overlapped CCEs per slot for a DL BWP with SCS configuration $\mu \in \{0, 1, 2, 3\}$ for a single serving cell.

TABLE 3

| μ | Maximum number of non-overlapped CCEs per slot and per serving cell $C_{PDCCH}^{max,\ slot,\ \mu}$ |
|---|---|
| 0 | 56 |
| 1 | 56 |
| 2 | 48 |
| 3 | 32 |

Table 10.1-3A in REF3 reproduced below and denoted as Table (4) describes the maximum number of non-overlapped CCEs, $C_{PDCCH}^{max,(X,Y),\mu}$, for a DL BWP with SCS configuration μ that a UE is expected to monitor corresponding PDCCH candidates per span for operation with a single serving cell. That is, Table (4) describes the maximum number $C_{PDCCH}^{max,(X,Y),\mu}$ of non-overlapped CCEs in a span for combination (X, Y) for a DL BWP with SCS configuration $\mu \in \{0, 1\}$ for a single serving cell.

TABLE 4

| | Maximum number $C_{PDCCH}^{max,\ (X,\ Y),\ \mu}$ of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

In Multiple Transmit/Receive Point (multi-TRP) operation, a serving cell can schedule UE from two TRPs, providing better PDSCH coverage, reliability and/or data rates.

There are two different operation modes for multi-TRP: single-DCI and multi-DCI. For both modes, control of uplink and downlink operation is done by both physical layer and MAC. In single-DCI mode, UE is scheduled by the same DCI for both TRPs and in multi-DCI mode, UE is scheduled by independent DCIs from each TRP.

Various embodiments of the present disclosure, describe allocation of PDCCH candidates considering number of sizes for DCI formats of USS sets. This is described in the following examples and embodiments, such as those of FIG. 6.

Figure 6:
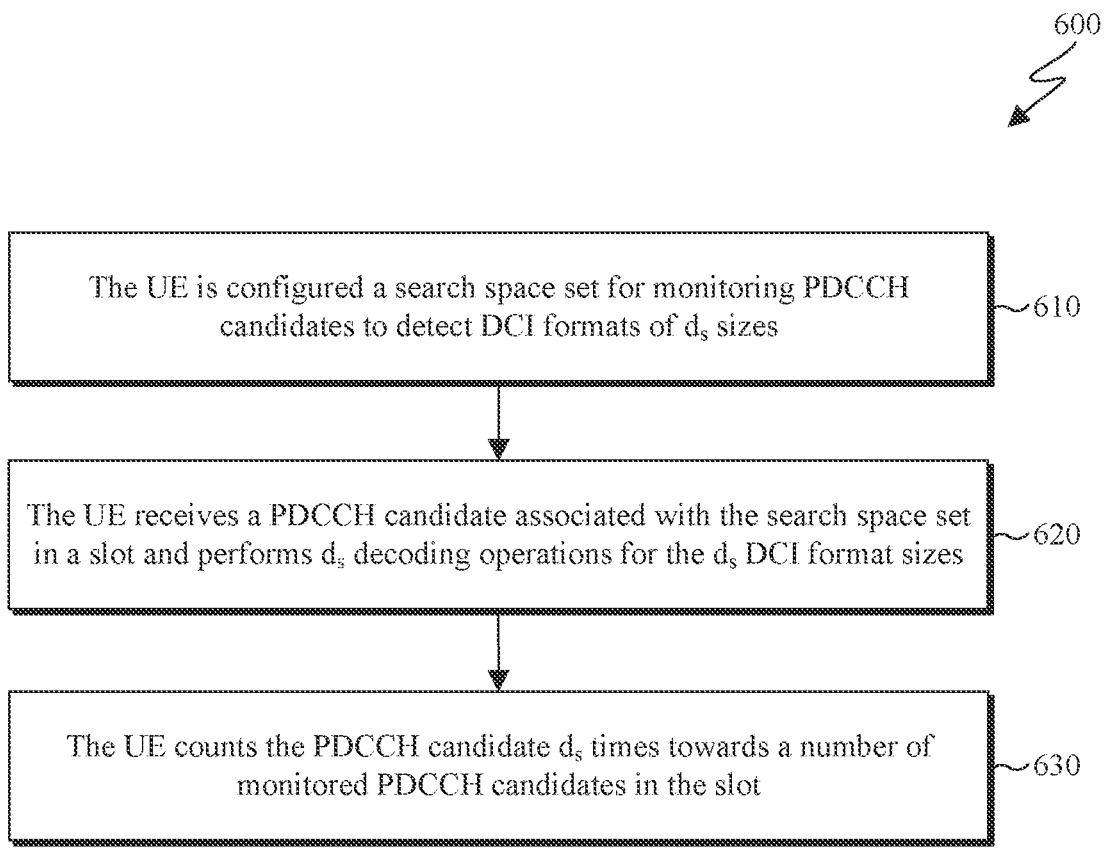
FIG. 6 illustrates an example method for counting a number of PDCCH candidates for a search space according to embodiments of the present disclosure.

FIG. 6 illustrates an example method 600 for counting a number of PDCCH candidates for a search space according to embodiments of the present disclosure. The steps of the method 600 of FIG. 6 can be performed by any of the UEs 111-116 of FIG. 1, such as the UE 116 of FIG. 3. The method 600 is for illustration only and other embodiments can be used without departing from the scope of the present disclosure.

In certain embodiments, when a UE (such as the UE 116) is configured a search space set that includes multiple DCI formats having more than one sizes, the UE counts a number of PDCCH candidates associated with the search space set separately per DCI format size. A reason is that a UE performs a separate decoding operation for each received PDCCH candidate per DCI format size. Therefore, for the purposes of determining a UE capability for a number of decoding operations for DCI format per slot or per span, the UE determines a scaled number of PDCCH candidates for a search space set as product of a number of configured PDCCH candidates for the search space set with a number of DCI format sizes associated with the search space set. Accordingly, the UE determines a search space set overbooking event per slot or per span when a sum of scaled numbers of PDCCH candidates for corresponding search space sets exceeds a predetermined limit on a number of PDCCH candidates that the UE can monitor per slot or per span.

For example, a UE (such as the UE 116) expects to monitor PDCCH candidates for up to 4 sizes of DCI formats that include up to 3 sizes of DCI formats with CRC scrambled by C-RNTI per serving cell. The UE counts a number of sizes for DCI formats per serving cell based on a number of configured PDCCH candidates in respective search space sets for the corresponding active DL BWP.

The UE determines a number of sizes of DCI formats used for determining a number of PDCCH candidates for decoding operations of DCI formats for a search space set after completing all operations for alignment of sizes of DCI formats as described in REF2, for example in order to maintain the aforementioned maximum numbers for sizes of DCI formats. For example, if a UE is configured a search space set to monitor PDCCH for detection of DCI format 0_1 and DCI format 1_1, and an original size of DCI format 0_1 is aligned to be same as a size of DCI format 1_1 in order to have up to 3 sizes of DCI formats with with CRC scrambled by C-RNTI per serving cell, there is only a single size for both DCI format 0_1 and DCI format 1_1 for the purpose of determining a number of PDCCH candidates for decoding operations for the search space set. Similar, if a UE is configured a search space set to monitor PDCCH for detection of DCI format 0_1, DCI format 0_2, DCI format 1_1 and DCI format 1_2, and an original size of DCI format 0_2 is aligned to be same as a size of DCI format 1_2 in order to have up to 3 sizes of DCI formats with with CRC scrambled by C-RNTI per serving cell, there are three sizes for DCI format 0_1. DCI format 0_2, DCI format 1_1 and DCI format 1_2 for the purpose of determining a number of PDCCH candidates for decoding operations for the search space set.

The method 600 as illustrated in FIG. 6 describes an example procedure for counting a number of PDCCH candidates for a search space set that includes DCI format with multiple sizes.

In step 610, a UE (such as the UE 116) is configured a search space set for monitoring PDCCH candidates to detect DCI formats of ds sizes, after any DCI size alignment. In step 620, the UE receives a PDCCH candidate associated with the search space set in a slot and performs respective ds decoding operations for the ds DCI format sizes. In step 630, the UE counts the PDCCH candidate ds times towards a number of monitored PDCCH candidates in the slot.

In certain embodiments, a PDCCH candidate with index $m_{s_j,n_{CI}}$ for a search space set $s_j$ using a set of CCEs in a CORESET p on the active DL BWP for serving cell $n_{CI}$ is not counted for monitoring if there is a PDCCH candidate with index $m_{s_i,n_{CI}}$ for a search space set $s_i < s_j$, or if there is a PDCCH candidate with index $n_{s_j,n_{CI}}$ and $n_{s_j,n_{CI}} < m_{s_j,n_{CI}}$ in the CORESET p on the active DL BWP for serving cell $n_{CI}$ using a same set of CCEs, the PDCCH candidates have identical scrambling, and the corresponding DCI formats for the PDCCH candidates have a same size. Otherwise, the PDCCH candidate with index $m_{s_j,n_{CI}}$ is counted for monitoring a number of times that is equal to a number of sizes of DCI formats, after any alignment of sizes of DCI formats, associated with the search space set as is subsequently described.

If a UE (such as the UE 116) (i) does not report pdcch-BlindDetectionCA or is not provided BDFactorR, γ=R and (ii) reports pdcch-BlindDetectionCA, then the UE can be indicated by BDFactorR either γ=1 or γ=R.

If a UE (such as the UE 116) is configured with $N_{cells,0}^{DL,\mu}+N_{cells,1}^{DL,\mu}$ downlink cells for which the UE is not provided monitoringCapabilityConfig-r16, or is provided monitoring CapabilityConfig-r16=r15monitoringcapability but not provided CORESETPoolIndex, with associated PDCCH candidates monitored in the active DL BWPs of the scheduling cells using SCS configuration $\mu$ where $\Sigma_{\mu=0}^{3}(N_{cells,0}^{DL,\mu}+\gamma \cdot N_{cells,1}^{DL,\mu}) \leq N_{cells}^{cap}$, the UE is not required to monitor, on the active DL BWPs of the scheduling cells, (i) more than $M_{PDCCH}^{total,slot,\mu}=M_{PDCCH}^{max,slot,\mu}$ candidates or more than $C_{PDCCH}^{total,slot,\mu}=C_{PDCCH}^{max,slot,\mu}$ non-overlapped CCEs per slot for each scheduled cell when the scheduling cell is from the $N_{cells,0}^{DL,\mu}$ downlink cells, (ii)—more than $M_{PDCCH}^{total,slot,\mu}=M_{PDCCH}^{max,slot,\mu}$ PDCCH candidates or more than $C_{PDCCH}^{max,slot,\mu}=\gamma \cdot C_{PDCCH}^{max,slot,\mu}$ non-overlapped CCEs per slot for each scheduled cell when the scheduling cell is from the $N_{cells,1}^{DL,\mu}$ downlink cells, or (iii) more than $M_{PDCCH}^{max,slot,\mu}$ PDCCH candidates or more than $C_{PDCCH}^{max,slot,\mu}$ non-overlapped CCEs per slot for CORESETs with same coresetPoolIndex value for each scheduled cell when the scheduling cell is from the $N_{cells,1}^{DL,\mu}$ downlink cells. In certain embodiments, the counting of PDCCH candidates includes scaling with number of DCI format sizes as described above, when applicable. Additionally, $N_{cells}^{cap}$ is replaced by $N_{cells,r15}^{cap-r16}$, if a UE is configured with downlink cells for which the UE is provided both monitoringCapabilityConfig-r16=r15monitoringcapability and monitoringCapabilityConfig-r16=r16monitoringcapability.

If a UE (i) is configured with $N_{cells,0}^{DL,\mu}+N_{cells,1}^{DL,\mu}$ downlink cells for which the UE is not provided monitoringCapabilityConfig, or is provided monitoringCapabilityConfig-r16=r15monitoringcapability but not provided coresetPoolIndex, (ii) with associated PDCCH candidates monitored in the active DL BWPs of the scheduling cell(s) using SCS configuration $\mu$, where $\Sigma_{\mu=0}^{3}(N_{cells,0}^{DL,\mu}+\gamma \cdot N_{cells,1}^{DL,\mu})>N_{cells}^{cap}$, and (iii) a DL BWP of an activated cell is the active DL BWP of the activated cell, and a DL BWP of a deactivated cell is the DL BWP with index provided by firstActiveDownlinkBWP-Id for the deactivated cell, then the UE is not required to monitor more than PDCCH candidates, as described in Equation (2), below, or more than non-overlapped CCEs per slot on the active DL BWP(s) of scheduling cell(s) from the $N_{cells,0}^{DL,\mu}+N_{cells,1}^{DL,\mu}$ downlink cells as described in Equation (3), below. In certain embodiments, the counting of PDCCH candidates includes scaling with number of DCI format sizes as described above, when applicable. $N_{cells}^{cap}$ is replaced by $N_{cells,r15}^{cap-r16}$ if a UE is configured with downlink cells for which the UE is provided both monitoring CapabilityConfig-r16=r15monitoringcapability and monitoringCapabilityConfig-r16=r16monitoringcapability.

$$M_{PDCCH}^{total,slot,\mu} = \left\lfloor N_{cells}^{cap} \cdot M_{PDCCH}^{max,slot,\mu} \cdot (N_{cells,0}^{DL,\mu} + \gamma \cdot N_{cells,1}^{DL,\mu})/\sum_{j=0}^{3}(N_{cells,0}^{DL,j} + \gamma \cdot N_{cells,1}^{DL,j}) \right\rfloor \quad (2)$$

$$C_{PDCCH}^{total,slot,\mu} = \left\lfloor N_{cells}^{cap} \cdot C_{PDCCH}^{max,slot,\mu} \cdot (N_{cells,0}^{DL,\mu} + \gamma \cdot N_{cells,1}^{DL,\mu})/\sum_{j=0}^{3}(N_{cells,0}^{DL,j} + \gamma \cdot N_{cells,1}^{DL,j}) \right\rfloor \quad (3)$$

For each scheduled cell from the $N_{cells,0}^{DL,\mu}$ downlink cells, the UE is not required to monitor on the active DL BWP with SCS configuration u of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot. In certain embodiments, the counting of PDCCH candidates includes scaling with number of DCI format sizes as described above, when applicable.

For each scheduled cell from the $N_{cells,1}^{DL,\mu}$ downlink cells, the UE is not required to monitor on the active DL BWP with SCS configuration u of the scheduling cell (i) more than $\min(\gamma \cdot M_{PDCCH}^{max,slot,\mu}, M_{PDCCH}^{total,slot,\mu})$ PDCCH candidates or more than $\min(\gamma \cdot C_{PDCCH}^{max,slot,\mu}, C_{PDCCH}^{total,slot,\mu})$ non-overlapped CCEs per slot or (ii) more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot for CORESETs with same coresetPoolIndex value. In certain embodiments, the counting of PDCCH candidates includes scaling with number of DCI format sizes as described above, when applicable.

If a UE is configured with $N_{cells,r16}^{DL,\mu}$ downlink cells for which the UE is provided monitoringCapabilityConfig=r16monitoringcapability and with associated PDCCH candidates monitored in the active DL BWPs of the scheduling cells using SCS configuration $\mu$, and with $N_{cells,r16}^{DL,(X,Y),\mu}$ of the $N_{cells,r16}^{DL,\mu}$ downlink cells using combination (X, Y) for PDCCH monitoring, where $\Sigma_{\mu=0}^{1}N_{cells,r16}^{DL,\mu} \leq N_{cells}^{cap-r16}$, the UE is not required to monitor, on the active DL BWP of the scheduling cell, more than $M_{PDCCH}^{total,(X,Y),\mu}=M_{PDCCH}^{max,(X,Y),\mu}$ PDCCH candidates or more than $C_{PDCCH}^{total,(X,Y),\mu}=C_{PDCCH}^{max,(X,Y),\mu}$ non-overlapped CCEs per span for each scheduled cell when the scheduling cell is from the $N_{cells,r16}^{DL,(X,Y),\mu}$ downlink cells. In certain embodiments, the counting of PDCCH candidates includes scaling with number of DCI format sizes as described above, when applicable. If a UE is configured with downlink cells for which the UE is provided both monitoringCapabilityConfig=r15monitoringcapability and monitoring CapabilityConfig=r16monitoringcapability, $N_{cells}^{cap-r16}$ is replaced by $N_{cells,r16}^{cap-r16}$.

If a UE is configured only with $N_{cells,r16}^{DL,\mu}$ downlink cells for which the UE is provided monitoringCapabilityConfig=r16monitoringcapability and with associated PDCCH candidates monitored in the active DL BWPs of the scheduling cells using SCS configuration $\mu$, and with $N_{cells,r16}^{DL,(X,Y),\mu}$ of the $N_{cells,r16}^{DL,\mu}$ downlink cells using combination (X, Y) for PDCCH monitoring, where $\Sigma_{\mu=0}^{1}N_{cells,r16}^{DL,\mu}>N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than PDCCH candidates as described in Equation (4) below, or more non-overlapped CCEs as described in Equation (5), below, per a set of spans. For example, the set of spans can be on the active DL BWP(s) of all scheduling cell(s) from the $N_{cells,r16}^{DL,(X,Y),\mu}$ downlink cells within every X symbols, if the union of PDCCH monitoring occasions on all scheduling cells from the $N_{cells,r16}^{DL,(X,Y),\mu}$ downlink cells results to PDCCH monitoring according to the combination (X, Y) and any pair of spans in the set is within Y symbols, where first X symbols start at a first symbol with a PDCCH monitoring occasion and next X symbols start at a first symbol with a PDCCH monitoring occasion that is not included in the first X symbols. For another example, the set of spans can be across the active DL BWP(s) of all scheduling cells from the $N_{cells,r16}^{DL,(X,Y),\mu}$ downlink cells, with at most one span per scheduling cell for each set of spans, otherwise. It is noted that $N_{cells,r16}^{DL,j}$ is a number of configured cells with associated PDCCH candidates monitored in the active DL BWPs of the scheduling cells using SCS configuration j. In certain embodiments, the counting of PDCCH If a UE is configured with downlink cells for which the UE is provided both monitoringCapabilityConfig=r15monitoringcapability and monitoringCapabilityConfig=r16monitoringcapability, $N_{cells}^{cap-r16}$ is replaced by $N_{cells,r16}^{cap-r16}$.

$$M_{PDCCH}^{total,(X,Y),\mu} = \left\lfloor N_{cells}^{cap-r16} \cdot M_{PDCCH}^{max,(X,Y),\mu} \cdot N_{cells,r16}^{DL,(X,Y),\mu} / \sum_{j=0}^{1} N_{cells,r16}^{DL,j} \right\rfloor \quad (4)$$

$$C_{PDCCH}^{total,(X,Y),\mu} = \left\lfloor N_{cells}^{cap-r16} \cdot C_{PDCCH}^{max,(X,Y),\mu} \cdot N_{cells,r16}^{DL,(X,Y),\mu} / \sum_{j=0}^{1} N_{cells,r16}^{DL,j} \right\rfloor \quad (5)$$

For each scheduled cell from the $N_{cells,r16}^{DL,(X,Y),\mu}$ downlink cells using combination (X, Y), the UE is not required to monitor on the active DL BWP with SCS configuration u of the scheduling cell, more than $\min(M_{PDCCH}^{max,(X,Y),\mu}, M_{PDCCH}^{total,(X,Y),\mu})$ PDCCH candidates or more than $\min(C_{PDCCH}^{max,(X,Y),\mu}, C_{PDCCH}^{total,(X,Y),\mu})$, PDCCH non-overlapped CCEs per span. In certain embodiments, the counting of PDCCH candidates includes scaling with number of DCI format sizes as described above, when applicable.

In certain embodiments, a UE (such as the UE 116) does not expect to be configured CSS sets that result to corresponding total, or per scheduled cell, numbers of monitored PDCCH candidates and non-overlapped CCEs per slot or per span that exceed the corresponding maximum numbers per slot or per span, respectively.

For same cell scheduling or for cross-carrier scheduling, a UE does not expect a number of PDCCH candidates, and a number of corresponding non-overlapped CCEs per slot or per span on a secondary cell to be larger than the corresponding numbers that the UE is capable of monitoring on the secondary cell per slot or per span, respectively. In certain embodiments, the counting of PDCCH candidates includes scaling with number of DCI format sizes as described above, when applicable. If a UE is provided monitoringCapabilityConfig=r16monitoringcapability for the primary cell, except the first span of each slot, the UE does not expect a number of PDCCH candidates and a number of corresponding non-overlapped CCEs per span on the primary cell to be larger than the corresponding numbers that the UE is capable of monitoring on the primary cell per span. In certain embodiments, the counting of PDCCH For cross-carrier scheduling, the number of PDCCH candidates for monitoring and the number of non-overlapped CCEs per span or per slot are separately counted for each scheduled cell.

For all search space sets within a slot n or within a span in slot n, denote by $S_{css}$ a set of CSS sets with cardinality of less and by $S_{uss}$ a set of USS sets with cardinality of $J_{uss}$. The location of USS sets $s_j$, $0 \leq j < J_{uss}$, in $S_{uss}$ is according to an ascending order of the search space set index.

Denote by $M_{S_{css(i)}}^{(L)}$, $0 \leq i < I_{css}$, the number of counted PDCCH candidates for monitoring for CSS set $S_{css(i)}$ and by $M_{S_{uss(j)}}^{(L)}$, $0 \leq j < J_{uss}$, the number of counted PDCCH candidates for monitoring for USS set $S_{uss(j)}$.

For the CSS sets, a UE (such as the UE 116) monitors $M_{PDCCH}^{css} = \sum_{i=0}^{I_{css}-1} d(i) \cdot \sum_L M_{S_{css(i)}}^{(L)}$ PDCCH candidates (decoding operations for DCI formats) requiring a total of $C_{PDCCH}^{css}$ non-overlapping CCEs in a slot or in a span. In certain embodiments, d(i) is a number of sizes for DCI formats for CSS set i after alignment of DCI format sizes.

The UE allocates PDCCH candidates for monitoring to USS sets for the primary cell having an active DL BWP with SCS configuration u in a slot if the UE is not provided monitoringCapabilityConfig for the primary cell or if the UE is provided monitoring CapabilityConfig=r15monitoringcapability for the primary cell, or in the first span of each slot if the UE is provided monitoringCapabilityConfig=r16monitoringcapability for the primary cell, according to the following pseudocode. If for the USS sets for scheduling on the primary cell the UE is not provided coresetPoolIndex for first CORESETs, or is provided coresetPoolIndex with value 0 for first CORESETs, and is provided coresetPoolIndex with value 1 for second CORESETs, and if $\min(\gamma \cdot M_{PDCCH}^{max,slot,\mu}, M_{PDCCH}^{total,slot,\mu}) > \min(M_{PDCCH}^{max,slot,\mu}, M_{PDCCH}^{total,slot,\mu})$ or $\min(\gamma \cdot C_{PDCCH}^{max,slot,\mu}, C_{PDCCH}^{total,slot,\mu}) > \min(C_{PDCCH}^{max,slot,\mu}, C_{PDCCH}^{total,slot,\mu})$, the following pseudocode applies only to USS sets associated with the first CORESETs. A UE does not expect to monitor PDCCH in a USS set without allocated PDCCH candidates for monitoring. In the following pseudocode, if the UE is provided monitoringCapabilityConfig=r16monitoringcapability for the primary cell, $M_{PDCCH}^{max,slot,\mu}$ and $C_{PDCCH}^{max,slot,\mu}$ are replaced by $M_{PDCCH}^{max,(X,Y),\mu}$ and $C_{PDCCH}^{max,(X,Y),\mu}$ respectively, and $M_{PDCCH}^{total,slot,\mu}$ and $C_{PDCCH}^{total,slot,\mu}$ are replaced by $M_{PDCCH}^{total,(X,Y),\mu}$ and $C_{PDCCH}^{total,(X,Y),\mu}$ respectively.

Denote by $V_{CCE}(S_{USS}(j))$ the set of non-overlapping CCEs for search space set $S_{USS}(j)$ and by $C(V_{CCE}(S_{USS}(j)))$ the cardinality of $V_{CCE}(S_{USS}(j))$ where the non-overlapping CCEs for search space set $S_{USS}(j)$ are determined considering the allocated PDCCH candidates for monitoring for the CSS sets and the allocated PDCCH candidates for monitoring for all search space sets $S_{uss}(k)$, $0 \leq k \leq j$. This is described in Syntax (2) and/or Syntax (3), below.

Syntax (2)

Set $M_{PDCCH}^{USS} = \min(M_{PDCCH}^{max,slot,\mu}, M_{PDCCH}^{total,slot,\mu}) - M_{PDCCH}^{CSS}$ Set $C_{PDCCH}^{USS} = \min(C_{PDCCH}^{max,slot,\mu}, C_{PDCCH}^{total,slot,\mu}) - C_{PDCCH}^{CSS}$ Set $d(j)$ to a number of sizes for DCI formats for USS set $j$ after alignment of DCI format sizes Set $j = 0$ while $\underline{d(j)} \cdot \sum_L M_{S_{uss(j)}}^{(L)} \leq M_{PDCCH}^{uss}$ AND $C(V_{CCE}(S_{USS}(j))) \leq C_{PDCCH}^{USS}$ allocate $\underline{d(j)} \cdot \sum_L M_{S_{uss(j)}}^{(L)}$ PDCCH candidates for monitoring to USS set $S_{USS}(j)$ $M_{PDCCH}^{uss} = M_{PDCCH}^{uss} - \underline{d(j)} \cdot \sum_L M_{S_{uss(j)}}^{(L)}$;

$C_{PDCCH}^{USS} = C_{PDCCH}^{USS} - C(V_{CCE}(S_{USS}(j)))$; $j = j + 1$;

end while.

Syntax (3)

Set $M_{PDCCH}^{USS} = \min(M_{PDCCH}^{max,slot,\mu}, M_{PDCCH}^{total,slot,\mu}) - M_{PDCCH}^{CSS}$ Set $C_{PDCCH}^{USS} = \min(C_{PDCCH}^{max,slot,\mu}, C_{PDCCH}^{total,slot,\mu}) - C_{PDCCH}^{CSS}$ Set $j = 0$ while $\sum_L M_{S_{uss(j)}}^{(L)} \leq M_{PDCCH}^{uss}$ AND $C(V_{CCE}(S_{USS}(j))) \leq C_{PDCCH}^{USS}$ allocate $\sum_L M_{S_{uss(j)}}^{(L)}$ PDCCH candidates for monitoring to USS set $S_{USS}(j)$ $M_{PDCCH}^{uss} = M_{PDCCH}^{uss} \sum_L M_{S_{uss(j)}}^{(L)}$;

$C_{PDCCH}^{USS} = C_{PDCCH}^{USS} - C(V_{CCE}(S_{USS}(j)))$;

$j = j + 1$;

end while.

It is noted that similar procedures, as those described above, apply when a UE monitors PDCCH in a search space set per span, instead of per slot.

In certain embodiments, a method for PDCCH monitoring with multiple DCI format sizes can include receiving information for a search space set from first search space sets on a serving cell. The search space set includes a first number of candidates PDCCH receptions and is associated with a first number of DCI formats. The method can also include performing a DCI format size alignment for the first number of DCI formats. The method can further include determining a first number of DCI format sizes based on the DCI format size alignment. In certain embodiments, the method can include receiving the first number of candidates PDCCH receptions in a slot according to the information of the search space set and decoding each candidate PDCCH reception from the first number of candidates PDCCH receptions for the first number of DCI format sizes. Additionally, the method also includes determining a number of DCI decoding operations in the slot associated with the search space set as a product of the first number of candidates PDCCH receptions and the first number of DCI format sizes.

The method can also include receiving information for second search space sets on the serving cell, the second search space sets including only CSS sets. The method can further include determining (i) a first number of DCI decoding operations in the slot associated with the first search space sets, and (ii) a second number of DCI decoding operations in the slot associated with the second search space sets. Additionally, the method can include determining a sum of the first number of DCI decoding operations and the second number of DCI decoding operations exceeds a predetermined number of DCI decoding operations/PDCCH receptions. The method can also include cancelling candidate PDCCH receptions corresponding only to search space sets from the first search space sets.

Although FIG. 6 illustrates the method 600 various changes may be made to FIG. 6. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

Various embodiments of the present disclosure are related to PDCCH monitoring for multi-cell scheduling.

In certain embodiments, if a UE (i) is configured for single cell operation or for operation with carrier aggregation in a same frequency band, and (ii) monitors PDCCH candidates in overlapping PDCCH monitoring occasions in multiple CORESETs that have been configured with same or different qcl-Type set to 'typeD' properties on active DL BWP(s) of one or more cells, then the UE monitors PDCCHs only in a CORESET, and in any other CORESET from the multiple CORESETs that have been configured with qcl-Type set to same 'typeD' properties as the CORESET, on the active DL BWP of a cell from the one or more cells, the CORESET corresponds to the CSS set with the lowest index in the cell with the lowest index containing CSS, if any; otherwise, to the USS set with the lowest index in the cell with lowest index. The lowest USS set index is determined over all USS sets with at least one PDCCH candidate in overlapping PDCCH monitoring occasions. For the purpose of determining the CORESET, a SS/PBCH block is considered to have different QCL 'typeD' properties than a CSI-RS. For the purpose of determining the CORESET, a first CSI-RS associated with a SS/PBCH block in a first cell and a second CSI-RS in a second cell that is also associated with the SS/PBCH block are assumed to have same QCL 'typeD' properties. The allocation of non-overlapping CCEs and of PDCCH candidates for PDCCH monitoring is according to all search space sets associated with the multiple CORESETs on the active DL BWP(s) of the one or more cells. The number of active TCI states is determined from the multiple CORESETs.

In certain embodiments, if a UE (i) is configured for single cell operation or for operation with carrier aggregation in a same frequency band, and (ii) monitors PDCCH candidates in overlapping PDCCH monitoring occasions in multiple CORESETs where none of the CORESETs has TCI-states configured with qcl-Type set to 'typeD', then the UE is required to monitor PDCCH candidates in overlapping PDCCH monitoring occasions for search space sets associated with different CORESETs.

For a scheduled cell and at any time, a UE (such as the UE 116) can expect to have received at most 16 PDCCHs for DCI formats with CRC scrambled by C-RNTI, CS-RNTI, or MCS-C-RNTI scheduling 16 PDSCH receptions for which the UE has not received any corresponding PDSCH symbol and at most 16 PDCCHs for DCI formats with CRC scrambled by C-RNTI, CS-RNTI, or MCS-C-RNTI scheduling 16 PUSCH transmissions for which the UE has not transmitted any corresponding PUSCH symbol.

In certain embodiments, if a UE is not provided monitoringCapabilityConfig=r16monitoringcapability for any serving cell, and(i) is not configured for NR-DC operation and indicates through pdcch-BlindDetectionCA a capability to monitor PDCCH candidates for $N_{cells}^{cap} \geq 4$ downlink cells and the UE is configured with $N_{cells}^{DL} > 4$ downlink cells or $N_{cells}^{UL}$ 4 uplink cells, or (ii) is configured with NR-DC operation and for a cell group with $N_{cells}^{DL}$ downlink cells or $N_{cells}^{UL}$ uplink cells, then the UE expects to have respectively received at most $16 \cdot N_{cells}^{cap}$ PDCCHs. This is for (i) DCI formats with CRC scrambled by a C-RNTI, or a CS-RNTI, or a MCS-C-RNTI scheduling $16 \cdot N_{cells}^{cap}$ PDSCH receptions for which the UE has not received any corresponding PDSCH symbol over all $N_{cells}^{DL}$ downlink cells, and (ii) DCI formats with CRC scrambled by a C-RNTI, or a CS-RNTI, or a MCS-C-RNTI scheduling $16 \cdot N_{cells}^{cap}$ PUSCH transmissions for which the UE has not transmitted any corresponding PUSCH symbol over all $N_{cells}^{UL}$ cells uplink cells.

In certain embodiments, if a UE is provided monitoringCapabilityConfig=r16monitoringcapability for all serving cells, and(i) is not configured for NR-DC operation and indicates through pdcch-MonitoringCA a capability to monitor PDCCH candidates for $N_{cells}^{cap-r16} \geq 2$ downlink cells and the UE is configured with $N_{cells}^{DL} > 2$ downlink cells or $N_{cells}^{UL} > 2$ uplink cells, or (ii) is configured with NR-DC operation and for a cell group with $N_{cells}^{DL}$ cells downlink cells or $N_{cells}^{UL}$ uplink cells, then the UE expects to have respectively received at most $16 \cdot N_{cells}^{cap-r16}$ PDCCHs. This is for (i) DCI formats with CRC scrambled by a C-RNTI, or a CS-RNTI, or a MCS-C-RNTI scheduling $16 \cdot N_{cells}^{cap-r16}$ PDSCH receptions for which the UE has not received any corresponding PDSCH symbol over all $N_{cells}^{DL}$ cells downlink cells or (ii) DCI formats with CRC scrambled by a C-RNTI, or a CS-RNTI, or a MCS-C-RNTI scheduling $16 \cdot N_{cells}^{cap-r16}$ PUSCH transmissions for which the UE has not transmitted any corresponding PUSCH symbol over all $N_{cells}^{UL}$ uplink cells.

In certain embodiments, if a UE is provided monitoringCapabilityConfig=r16monitoringcapability for at least one serving cell and is not provided monitoringCapabilityConfig=r16monitoringcapability for at least one serving cell, and(i) is not configured for NR-DC operation, and indicates a capability to monitor PDCCH candidates for $N_{cells,r15}^{cap-r16} \geq 1$ downlink cells, and $N_{cells,r16}^{cap-r16} \geq 1$ downlink cells, and the UE is configured with $N_{cells}^{DL} > 1$ downlink cell or $N_{cells}^{UL} > 1$ uplink cell, or (ii) is configured with NR-DC operation and for a cell group with $N_{cells}^{DL}$ downlink cells or $N_{cells}^{UL}$ cells uplink cells, then the UE expects to have respectively received the following. The UE can expect to respectively receive (i) at most $16 \cdot N_{cells,r15}^{cap-r16}$ PDCCHs for DCI formats with CRC scrambled by a C-RNTI, or a CS-RNTI, or a MCS-C-RNTI scheduling $16 \cdot N_{cells,r15}^{cap-r16}$ PDSCH receptions for which the UE has not received any corresponding PDSCH symbol over all serving cells that are not provided monitoring CapabilityConfig=r16monitoringcapability, (ii) at most $16 \cdot N_{cells,r15}^{cap-r16}$ PDCCHs for DCI formats with CRC scrambled by a C-RNTI, or a CS-RNTI, or a MCS-C-RNTI scheduling $16 \cdot N_{cells,r15}^{cap-r16}$ PUSCH transmissions for which the UE has not transmitted any corresponding PUSCH symbol over all serving cells that are not provided monitoringCapabilityConfig=r16monitoringcapability, (iii) at most $16 \cdot N_{cells,r16}^{cap-r16}$ PDCCHs for DCI formats with CRC scrambled by a C-RNTI, or a CS-RNTI, or a MCS-C-RNTI scheduling $16 \cdot N_{cells,r16}^{cap-r16}$ PDSCH receptions for which the UE has not received any corresponding PDSCH symbol over all serving cells that are provided monitoringCapabilityConfig=r16monitoringcapability, (iv) at most $16 \cdot N_{cells,r16}^{cap-r16}$ PDCCHs for DCI formats with CRC scrambled by a C-RNTI, or a CS-RNTI, or a MCS-C-RNTI scheduling $16 \cdot N_{cells,r16}^{cap-r16}$ PUSCH transmissions for which the UE has not transmitted any corresponding PUSCH symbol over all serving cells that are provided monitoring CapabilityConfig=r16monitoringcapability.

In certain embodiments, a UE (such as the UE 116) decodes only DCI formats 0_0/1_0 associated with the first PDCCH candidate, if the UE (i) is configured to monitor a first PDCCH candidate for a DCI format 0_0 and a DCI format 1_0 from a CSS set and a second PDCCH candidate for a DCI format 0_0 and a DCI format 1_0 from a USS set in a CORESET with index zero on an active DL BWP, (ii) the DCI formats 0_0/1_0 associated with the first PDCCH candidate and the DCI formats 0_0/1_0 associated with the second PDCCH candidate have same size, (iii) the UE receives the first PDCCH candidate and the second PDCCH candidate over a same set of CCEs, (iv) the first PDCCH candidate and the second PDCCH candidate have identical scrambling, and (v) the DCI formats 0_0/1_0 for the first PDCCH candidate and the DCI formats 0_0/1_0 for the second PDCCH candidate have CRC scrambled by either C-RNTI, or MCS-C-RNTI, or CS-RNTI.

In certain embodiments, if a UE (such as the UE 116) detects a DCI format with inconsistent information, the UE discards all the information in the DCI format.

A UE configured with a bandwidth part indicator in a DCI format determines, in case of an active DL BWP or of an active UL BWP change, that the information in the DCI format is applicable to the new active DL BWP or UL BWP, respectively, as described in clause 12.

For unpaired spectrum operation, if a UE is not configured for PUSCH/PUCCH transmission on serving cell $c_2$, the UE does not expect to monitor PDCCH on serving cell $c_1$ if the PDCCH overlaps in time with SRS transmission (including any interruption due to uplink or downlink RF retuning time [10, TS 38.133]) on serving cell $c_2$ and if the UE is not capable of simultaneous reception and transmission on serving cell $c_1$ and serving cell $c_2$.

If a UE (such as the UE 116) is provided resourceBlocks and symbolsInResourceBlock in RateMatchPattern, or if the UE is additionally provided periodicityAndPattern in RateMatchPattern, the UE can determine a set of RBs in symbols of a slot that are not available for PDSCH reception as described in REF4. If a PDCCH candidate in a slot is mapped to one or more REs that overlap with REs of any RB in the set of RBs in symbols of the slot, the UE does not expect to monitor the PDCCH candidate.

In certain embodiments, a UE (such as the UE 116) does not expect to be configured with dci-FormatsSL and dci-FormatsExt in a same USS.

In the downlink, the gNB (such as the BS 102) can dynamically allocate resources to UEs via the C-RNTI on PDCCH(s). A UE monitors the PDCCH(s) in order to find possible assignments when its downlink reception is enabled (activity governed by DRX when configured). When CA is configured, the same C-RNTI applies to all serving cells.

The gNB may pre-empt an ongoing PDSCH transmission to one UE with a latency-critical transmission to another UE. The gNB can configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE.

In addition, with SPS, the gNB can allocate downlink resources for the initial HARQ transmissions to UEs: RRC defines the periodicity of the configured downlink assignments while PDCCH addressed to CS-RNTI can either signal and activate the configured downlink assignment, or deactivate it; i.e., a PDCCH addressed to CS-RNTI indicates that the downlink assignment can be implicitly reused according to the periodicity defined by RRC, until deactivated. When required, retransmissions are explicitly scheduled on PDCCH(s).

The dynamically allocated downlink reception overrides the configured downlink assignment in the same serving cell if they overlap in time. Otherwise, a downlink reception according to the configured downlink assignment is assumed, if activated.

The UE may be configured with up to eight active configured downlink assignments for a given BWP of a serving cell. When more than one is configured(i) the network decides which of these configured downlink assignments are active at a time (including all of them); and (ii) each configured downlink assignment is activated separately using a DCI command and deactivation of configured downlink assignments is done using a DCI command, which can either deactivate a single configured downlink assignment or multiple configured downlink assignments jointly.

PUSCH may be scheduled with DCI on PDCCH, or a semi-static configured grant may be provided over RRC, where two types of operation are supported(i) the first PUSCH is triggered with a DCI, with subsequent PUSCH transmissions following the RRC configuration and scheduling received on the DCI, or (ii) the PUSCH is triggered by data arrival to the UE's transmit buffer and the PUSCH transmissions follow the RRC configuration.

In the uplink, the gNB can dynamically allocate resources to UEs via the C-RNTI on PDCCH(s). A UE monitors the PDCCH(s) in order to find possible grants for uplink transmission when its downlink reception is enabled (activity governed by DRX when configured). When CA is configured, the same C-RNTI applies to all serving cells.

The gNB may cancel a PUSCH transmission, or a repetition of a PUSCH transmission, or an SRS transmission of a UE for another UE with a latency-critical transmission. The gNB can configure UEs to monitor cancelled transmission indications using CI-RNTI on a PDCCH. If a UE receives the cancelled transmission indication, the UE shall cancel the PUSCH transmission from the earliest symbol overlapped with the resource or the SRS transmission overlapped with the resource indicated by cancellation.

In addition, with Configured Grants, the gNB can allocate uplink resources for the initial HARQ transmissions and HARQ retransmissions to UEs. Two types of configured uplink grants are defined. A first type, denoted as Type 1, RRC directly provides the configured uplink grant (including the periodicity). A second type, denoted as Type 2, RRC defines the periodicity of the configured uplink grant while PDCCH addressed to CS-RNTI can either signal and activate the configured uplink grant, or deactivate it i.e., a PDCCH addressed to CS-RNTI indicates that the uplink grant can be implicitly reused according to the periodicity defined by RRC, until deactivated.

If the UE is not configured with enhanced intra-UE overlapping resources prioritization, the dynamically allocated uplink transmission overrides the configured uplink grant in the same serving cell if they overlap in time. Otherwise, an uplink transmission according to the configured uplink grant is assumed, if activated.

If the UE is configured with enhanced intra-UE overlapping resources prioritization, in case a configured uplink grant transmission overlaps in time with dynamically allocated uplink transmission or with another configured uplink grant transmission in the same serving cell, the UE prioritizes the transmission based on the comparison between the highest priority of the logical channels that have data to be transmitted and which are multiplexed or can be multiplexed in MAC packet data units (PDUs) associated with the overlapping resources. Similarly, in case a configured uplink grant transmissions or a dynamically allocated uplink transmission overlaps in time with a scheduling request transmission, the UE prioritizes the transmission based on the comparison between the priority of the logical channel which triggered the scheduling request and the highest priority of the logical channels that have data to be transmitted and which are multiplexed or can be multiplexed in MAC PDU associated with the overlapping resource. In case the MAC PDU associated with a deprioritized transmission has already been generated, the UE keeps it stored to allow the gNB to schedule a retransmission. The UE may also be configured by the gNB to transmit the stored MAC PDU as a new transmission using a subsequent resource of the same configured uplink grant configuration when an explicit retransmission grant is not provided by the gNB.

Retransmissions other than repetitions are explicitly allocated via PDCCH(s) or via configuration of a retransmission timer.

The UE may be configured with up to 12 active configured uplink grants for a given BWP of a serving cell. When more than one is configured, the network decides which of these configured uplink grants are active at a time (including all of them). Each configured uplink grant can either be of Type 1 or Type 2. For Type 2, activation and deactivation of configured uplink grants are independent among the serving cells. When more than one Type 2 configured grant is configured, each configured grant is activated separately using a DCI command and deactivation of Type 2 configured grants is done using a DCI command, which can either deactivate a single configured grant configuration or multiple configured grant configurations jointly.

When SUL is configured, the network should ensure that an active configured uplink grant on SUL does not overlap in time with another active configured uplink grant on the other UL configuration.

For both dynamic grant and configured grant, for a transport block, two or more repetitions can be in one slot, or across slot boundary in consecutive available slots with each repetition in one slot. For both dynamic grant and configured grant Type 2, the number of repetitions can be also dynamically indicated in the L1 signalling. The dynamically indicated number of repetitions shall override the RRC configured number of repetitions, if both are present.

As described above, in Multiple Transmit/Receive Point (multi-TRP) operation, a serving cell can schedule UE from two TRPs, providing better PDSCH coverage, reliability and/or data rates.

As described above, there are two different operation modes for multi-TRP: single-DCI and multi-DCI. For both modes, control of uplink and downlink operation is done by both physical layer and MAC. In single-DCI mode, UE is scheduled by the same DCI for both TRPs and in multi-DCI mode, UE is scheduled by independent DCIs from each TRP.

The downlink/uplink physical-layer processing of transport channels includes the following steps: (i) Transport block CRC attachment; (ii) Code block segmentation and code block CRC attachment; (iii) Channel coding: LDPC coding; (iv) Physical-layer hybrid-ARQ processing; (v) Rate matching; (vi) Scrambling; (vii) Modulation: $\pi/2$ BPSK (only for uplink with transform precoding), QPSK, 16QAM, 64QAM and 256QAM; (viii) Layer mapping; (ix) (for uplink only) Transform precoding (enabled/disabled by configuration), and pre-coding; (x) Mapping to assigned resources and antenna ports.

The UE may assume that at least one symbol with demodulation reference signal is present on each layer in which PDSCH is transmitted to a UE, and up to 3 additional DM-RS can be configured by higher layers. Phase Tracking RS may be transmitted on additional symbols to aid receiver phase tracking.

The UE transmits at least one symbol with demodulation reference signal on each layer on each frequency hop in which the PUSCH is transmitted, and up to 3 additional DM-RS can be configured by higher layers. Phase Tracking RS may be transmitted on additional symbols to aid receiver phase tracking.

When the UE is scheduled to receive PDSCH by a DCI, the Time domain resource assignment field value m of the DCI provides a row index m+1 to an allocation table. The indexed row defines the slot offset $K_0$, the start and length indicator (SLIV), or directly the start symbol S and the allocation length L, and the PDSCH mapping type to be assumed in the PDSCH reception.

Given the parameter values of the indexed row, the slot allocated for the PDSCH is $K_s$. $K_s$ is described in Equation (6) if UE is configured with ca-SlotOffset for at least one of the scheduled and scheduling cell, otherwise $K_s$ is described in Equation (7). The expression n is the slot with the scheduling DCI, and $K_0$ is based on the numerology of PDSCH, and $\mu_{PDSCH}$ and $\mu_{PDCCH}$ are the subcarrier spacing configurations for PDSCH and PDCCH, respectively. Additionally, Given the parameter values of the indexed row, $N_{slot, offset, PDCCH}^{CA}$ and $\mu_{offset, PDCCH}$ are the $N_{slot, offset}^{CA}$ and the $\mu_{offset}$, respectively, which are determined by higher-layer configured ca-SlotOffset, for the cell receiving the PDCCH respectively. $N_{slot,\ offset,\ PDSCH}^{CA}$ and $\mu_{offset,\ PDSCH}$ are the $N_{slot,\ offset}^{CA}$ and the $\mu_{offset}$, respectively, which are determined by higher-layer configured ca-SlotOffset for the cell receiving the PDSCH.

$$K_S = \left\lfloor n \cdot \frac{2^{\mu_{PDSCH}}}{2^{\mu_{PDCCH}}} \right\rfloor + K_0 + \left\lfloor \left( \frac{N_{slot,offsetPDCCH}^{CA}}{2^{\mu_{offset,PDCCH}}} - \frac{N_{slot,offset,PDSCH}^{CA}}{2^{\mu_{offset,PDSCH}}} \right) \cdot 2^{\mu_{PDSCH}} \right\rfloor \quad (6)$$

$$K_S = \left\lfloor n \cdot \frac{2^{\mu_{PDSCH}}}{2^{\mu_{PDCCH}}} \right\rfloor + K_0 \quad (7)$$

When the UE is scheduled to transmit a transport block and no CSI report, or the UE is scheduled to transmit a transport block and a CSI report(s) on PUSCH by a DCI, the 'Time domain resource assignment' field value m of the DCI provides a row index m+1 to an allocated table. The indexed row defines the slot offset $K_2$, the start and length indicator SLIV, or directly the start symbol S and the allocation length L, the PUSCH mapping type, and the number of repetitions (if numberOfRepetitions is present in the resource allocation table) to be applied in the PUSCH transmission.

When the UE is scheduled to transmit a PUSCH with no transport block and with a CSI report(s) by a 'CSI request' field on a DCI, the 'Time domain resource assignment' field value m of the DCI provides a row index m+1 to an allocated table. The indexed row defines the start and length indicator SLIV, or directly the start symbol S and the allocation length L, and the PUSCH mapping type to be applied in the PUSCH transmission and the $K_2$ value is determined as $$K_2 = \max_j Y_j(m+1), \text{ where } Y_j(m+1)$$

is the (m+1)th entry of $Y_j$ and $Y_j$, j=0, . . . , $N_{Rep}$−1 are the corresponding list entries of the higher layer parameter (i) reportSlotOffsetListDCI-0-2, if PUSCH is scheduled by DCI format 0_2 and reportSlotOffsetListDCI-0-2 is configured; (ii) reportSlotOffsetListDCI-0-1, if PUSCH is scheduled by DCI format 0_1 and reportSlotOffsetListDCI-0-1 is configured; (iii) reportSlotOffsetList, otherwise; in CSI-ReportConfig for the $N_{Rep}$ triggered CSI Reporting Settings. It is noted that the slot $K_s$ where the UE shall transmit the PUSCH is determined by $K_2$ as $K_s$. $K_s$ is described in Equation (8) if UE is configured with ca-SlotOffset for at least one of the scheduled and scheduling cell, otherwise $K_s$ is described in Equation (9). Additionally, where n is the slot with the scheduling DCI, $K_2$ is based on the numerology of PUSCH, and $\mu_{PUSCH}$ and $\mu_{PDCCH}$ are the subcarrier spacing configurations for PUSCH and PDCCH, respectively. Additionally, $N_{slot,\ offset,\ PDCCH}^{CA}$ and $\mu_{offset,PDCCH}$ are the $N_{slot,\ offset}^{CA}$ and the $\mu_{offset}$, respectively, which are determined by higher-layer configured ca-SlotOffset for the cell receiving the PDCCH, $N_{slot,\ offset,\ PUSCH}^{CA}$ and $\mu_{offset,PUSCH}$ are the $N_{slot,\ offset}^{CA}$ and the $\mu_{offset}$, respectively, which are determined by higher-layer configured ca-SlotOffset for the cell transmitting the PUSCH.

$$Ks = \left\lfloor n \cdot \frac{2^{\mu_{PUSCH}}}{2^{\mu_{PDCCH}}} \right\rfloor + K_2 + \left\lfloor \left( \frac{N_{slot,offset,PDCCH}^{CA}}{2^{\mu_{offset,PDCCH}}} - \frac{N_{slot,offset,PUSCH}^{CA}}{2^{\mu_{offset,PUSCH}}} \right) \cdot 2^{\mu_{PUSCH}} \right\rfloor \quad (8)$$

-continued $$Ks = \left\lfloor n \cdot \frac{2^{\mu_{PUSCH}}}{2^{\mu_{PDCCH}}} \right\rfloor + K_2 \quad (9)$$

The information element ca-SlotOffset provides slot offset between the primary cell (PCell/PSCell) and the SCell in unaligned frame boundary with slot alignment and partial SFN alignment inter-band CA. Based on this field, the UE determines the time offset of the SCell. The granularity of this field is determined by the reference SCS for the slot offset (i.e., the maximum of PCell/PSCell lowest SCS among all the configured SCSs in DL/UL SCS-SpecificCarrierList in ServingCellConfigCommon or ServingCellConfigCommonSIB and this serving cell's lowest SCS among all the configured SCSs in DL/UL SCS-SpecificCarrierList in ServingCellConfigCommon or ServingCellConfigCommonSIB). The Network configures at most single non-zero offset duration in ms (independent on SCS) among CCs in the unaligned CA configuration. If the field is absent, the UE applies the value of 0. The slot offset value can only be changed with SCell release and add. Herein, scs-SpecificCarrierList provides a set of carriers for different subcarrier spacings (numerologies), which is defined in relation to Point A. The network configures a scs-SpecificCarrier at least for each numerology (SCS) that is used e.g., in a BWP.

For carrier aggregation of cells with unaligned frame boundaries, the slot offset $N_{slot,\ offset}^{CA}$ between a PCell/PScell and an SCell is determined by higher-layer parameter ca-SlotOffset for the SCell. The quantity $\mu_{offset}$ is defined as the maximum of the lowest subcarrier spacing configuration among the subcarrier spacings given by the higher-layer parameters scs-SpecificCarrierList configured for PCell/PSCell and the SCell, respectively. The slot offset $N_{slot,\ offset}^{CA}$ fulfills (i) when the lowest subcarrier spacing configuration among the subcarrier spacings configured for the cell is µ=2 for both cells or µ=3 for both cells, the start of slot 0 for the cell whose point A has a lower frequency coincides with the start of slot $qN_{slot,\ offset}^{CA}$ mod $N_{slot}^{frame,\mu_{offset}}$ for the other cell where q=−1 if point A of the PCell/PSCell has a frequency lower slot than the frequency of point A for the SCell, otherwise q=1; (ii) otherwise, the start of slot 0 for the cell with the lower subcarrier spacing of the lowest subcarrier spacing given by the higher-layer parameters scs-SpecificCarrierList configured for the two cells, or the Pcell/PSCell if both cells have the same lowest subcarrier spacing given by the higher-layer parameters scs-SpecificCarrierList configured for the two cells, coincides with the start of slot $qN_{slot,\ offset}^{CA}$ mod $N_{slot}^{frame,\mu_{offset}}$ for the other cell where q=−1 if the lowest subcarreier spacing configuration given by scs-SpecificCarrierList of the PCell/PSCell is smaller than or equal to the lowest subcarrier spacing given by scs-SpecificCarrierList for the SCell, otherwise q=1.

HARQ operation is supported for DL reception. Asynchronous Incremental Redundancy HARQ is supported. The gNB provides the UE with the HARQ-ACK feedback timing either dynamically in the DCI or semi-statically in an RRC configuration. Retransmission of HARQ-ACK feedback is supported for operation with shared spectrum channel access by using enhanced dynamic codebook and/or one-shot triggering of HARQ-ACK transmission for all configured CCs and HARQ processes in the PUCCH group. The UE may be configured to receive code block group-based transmissions where retransmissions may be scheduled to carry a sub-set of all the code blocks of a TB.

HARQ operation is supported for UL transmission. Asynchronous Incremental Redundancy HARQ is supported. The gNB schedules each uplink transmission and retransmission using the uplink grant on DCI. For operation with shared spectrum channel access, UE can also retransmit on configured grants. The UE may be configured to transmit code block group-based transmissions where retransmissions may be scheduled to carry a sub-set of all the code blocks of a transport block.

Up to two HARQ-ACK codebooks corresponding to a priority (high/low) can be constructed simultaneously. For each HARQ-ACK codebook, more than one PUCCH for HARQ-ACK transmission within a slot is supported. Each PUCCH is limited within one sub-slot, and the sub-slot pattern is configured per HARQ-ACK codebook.

The HARQ functionality ensures delivery between peer entities at Layer 1. A single HARQ process supports one TB when the physical layer is not configured for downlink/uplink spatial multiplexing, and when the physical layer is configured for downlink/uplink spatial multiplexing, a single HARQ process supports one or multiple TBs.

In case of CA, the multi-carrier nature of the physical layer is only exposed to the MAC layer for which one HARQ entity is required per serving cell. In both uplink and downlink, there is one independent HARQ entity per serving cell and one transport block is generated per assignment/grant per serving cell in the absence of spatial multiplexing. Each transport block and its potential HARQ retransmissions are mapped to a single serving cell.

Physical uplink control channel (PUCCH) carries the Uplink Control Information (UCI) from the UE to the gNB. UCI includes at least HARQ-ACK information, scheduling request (SR), and CSI.

UCI can be transmitted on a PUCCH or multiplexed in a PUSCH. UCI multiplexing in PUSCH is supported when UCI and PUSCH transmissions coincide in time, either due to transmission of a UL-SCH transport block or due to triggering of A-CSI transmission without UL-SCH transport block: (i) UCI carrying HARQ-ACK feedback with 1 or 2 bits is multiplexed by puncturing PUSCH; (ii) in all other cases UCI is multiplexed by rate matching PUSCH.

For configured grants operation with shared spectrum channel access, a configured grant uplink control information (CG-UCI) is transmitted in PUSCH scheduled by configured uplink grant. For operation with shared spectrum channel access, multiplexing of CG-UCI and PUCCH carrying HARQ-ACK feedback can be configured by the gNB. If not configured, when PUCCH overlaps with PUSCH scheduled by a configured grant within a PUCCH group and PUCCH carries HARQ ACK feedback, PUSCH scheduled by configured grant is skipped.

It is noted that throughout the present disclosure, embodiments are described in terms of multiple PDSCHs or multiple PUSCHs that are jointly scheduled on multiple serving cells, such as a subset/set of cells from among one or more sets of co-scheduled cells.

The embodiments are generic and can apply to various other scenarios such as when a UE is jointly scheduled to receive/transmit multiple PDSCHs/PUSCHs: (i) from/to multiple TRPs or other communication entities, such as multiple distributed units (DUs) or multiple remote radio heads (RRHs) and so on, for example, in a distributed MIMO operation, wherein TRPs/DUs/RRHs can be associated with one or more cells; (ii) in multiple time units, such as multiple slots or multiple transmission time intervals (TTIs); (iii) on multiple BWPs associated with one or more cells/carriers/TRPs, including multiple BWPs of a single serving cell/carrier for a UE with a capability of reception/transmission on multiple active BWPs; (iv) on one or more TRPs/cells, wherein the UE can receive/transmit more than one PDSCH/PUSCH on each co-scheduled TRP/cell; (v) for multiple transport blocks (TBs), or for multiple codewords (CWs) corresponding to single TB or multiple TBs; or (vi) for multiple semi-persistently scheduled PDSCHs (SPS PDSCHs) or for multiple configured grant PUSCHs (CG PUSCHs) that are jointly activated on one or multiple TRPs/cells.

Accordingly, any reference to "co-scheduled cells" can be replaced with/by "co-scheduled TRPs/DUs/RRHs," or "co-scheduled slots/TTIs," or "co-scheduled BWPs", or "co-scheduled PDSCHs/PUSCHs", or "co-scheduled TBs/CWs", or "co-scheduled SPS-PDSCHs/CG-PUSCHs", and so on. Similar for other related terms, such as "multi-cell scheduling." and so on.

Various embodiments consider reception of multiple PDSCHs or transmission of multiple PUSCHs on respective cells, including carriers of a same cell such as on an UL carrier (also referred to as, a normal UL (NUL) carrier) or a supplemental UL (SUL) carrier. The embodiments also apply to cases where scheduling is for a mixture of PDSCHs and PUSCHs. For example, the UE can receive first PDSCHs on respective first cells and can transmit second PUSCHs on respective second cells, wherein the first PDSCHs and the second PUSCHs are jointly scheduled.

Various embodiments of the present disclosure, describe multi-cell scheduling operations.

In certain embodiments, a UE (such as the UE 116) can be provided a number of sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described herein. Additionally, the UE can be indicated via a DCI format in a PDCCH or via a MAC CE in a PDSCH a subset of a set of co-scheduled cells, wherein cells of the subset can change across different PDCCH monitoring occasions, for example, as indicated by a corresponding DCI format.

In one example, multi-cell scheduling can also include operations related to DL/UL transmissions such as reporting HARQ-ACK information, beam/CSI measurement or reporting, transmission, or reception of UL/DL reference signals, and so on.

In one example, the UE can be configured by higher layers, such as by a UE-specific RRC configuration, a number of sets of co-scheduled cells. For example, the UE can be configured a first set of cells, such as {cell #0, cell #1, cell #4, cell #7} and a second set of cells such as {cell #2, cell #3, cell #5, cell #6}. The multiple sets of co-scheduled cells can be scheduled from a same scheduling cell or from different scheduling cells.

In one example, a set of co-scheduled cells can include a primary cell (PCell/PSCell) and one or more SCells. In another example, a set of co-scheduled cells can include only SCells. In one example, a scheduling cell can belong to a set of co-scheduled cells. In another example, the UE does not expect that a scheduling cell belongs to a set of co-scheduled cells.

In one example, per specifications of the system operation, a set of co-scheduled cells is defined as a set that includes all scheduled cells having a same scheduling cell, and additional higher layer configuration is not required for indication of the set of co-scheduled cells. Accordingly, a DCI format for multi-cell scheduling, or other complementary methods, can jointly schedule any number of scheduled cells that have a same scheduling cell.

In another example, a set of co-scheduled cells can have two or more scheduling cells. For example, a UE can receive a DCI format for scheduling multiple co-scheduled cells on a first scheduling cell in a first PDCCH monitoring occasion, or on a second scheduling cell in a second PDCCH monitoring occasion. The DCI format can be associated with any search space set or can be restricted to be associated only with USS sets. For example, the DCI format can be associated with multicast scheduling and have CRC scrambled by a group RNTI (G-RNTI) and PDCCH candidates monitored according to CSS sets, or can be associated with unicast scheduling and have CRC scrambled by a C-RNTI and PDCCH candidates monitored according to USS sets. Such PDCCH monitoring from two scheduling cells can be simultaneous, for example in a same span of symbol or in a same slot, or can be non-overlapping, such as in different slots (per higher layer configuration, or per indication in a PDCCH or via a MAC CE). The UE may or may not expect that both the first scheduling cell and the second scheduling cell can schedule, through DCI formats in PDCCH receptions in a same time interval such as a span or a slot, transmissions, or receptions on a same cell. The UE can also monitor PDCCH for detection of a DCI format providing scheduling only on one cell from the set of co-scheduled cells (single-cell scheduling DCI format).

A UE (such as the UE 116) can report one or more of: a maximum number of sets of co-scheduled cells, or a maximum number of cells within a set of co-scheduled cells, or a maximum total number of co-scheduled cells across different sets, or a maximum number of co-scheduled cells per PDCCH monitoring occasion, as capability to the gNB. In one example, that capability can depend on an operating frequency band or on a frequency range such as above or below 6 GHZ.

Multi-cell scheduling can be an optional UE feature with capability signaling that can additionally be separate for PDSCH receptions and for PUSCH transmissions. For example, a UE can report a capability for a maximum number of {2, 4, 8, 16} co-scheduled cells for the DL and a maximum of {2, 4} co-scheduled cells for the UL.

A UE can also be configured a number of cells that do not belong to any of set of co-scheduled cells. For example, the UE can be configured a cell #8 that does not belong to either the first set or the second set of co-scheduled cells in the previous example.

In one example, restrictions can apply for co-scheduled cells and a UE can expect that co-scheduled cells in a corresponding set: (i) have a same numerology (SCS configuration and CP); (ii) have a same numerology for respective active DL/UL BWPs; (iii) have a same duplex configuration, for example, all cells have frequency division duplexing (FDD) configuration or all cells have time division duplexing (TDD) configuration and, in case of a TDD configuration, also have a same UL-DL configuration; or (iv) are within a same frequency band (intra-band CA).

A serving cell can belong only to a single set of co-scheduled cells so that the sets of co-scheduled cells do not include any common cell, or can belong to multiple sets of co-scheduled cells to enable larger scheduling flexibility to a serving gNB. For example, a serving cell can belong to a first set of co-scheduled cells and to a second set of co-scheduled cells, when cells in the first and second sets of co-scheduled cells have a common feature such as a common numerology, duplex configuration, operating frequency band/range, and so on. Also, a serving cell can belong to both a first set of co-scheduled cells and to a second set of co-scheduled cells, when the serving cell has a first common feature with cells in the first set of co-scheduled cells and a second common feature with cells in the second set of co-scheduled cells, wherein the first common feature can be different from the second common feature.

In a first approach, a UE expects to be provided multi-cell scheduling for all cells in a set of co-scheduled cells. For example, for a first set of co-scheduled cells including cells {cell #0, cell #1, cell #4, cell #7}, a DCI format schedules PDSCH receptions or PUSCH transmissions on all four cells in the first set of co-scheduled cells {cell #0, cell #1, cell #4, cell #7}.

In a second approach, the UE can be provided multi-cell scheduling for a subset of a set of co-scheduled cells. For example, a DCI format can schedule PDSCH receptions or PUSCH transmissions on only two cells, such as {cell #0, cell #4}, from the first set of cells.

In a first option for the second approach, the subset of cells can be indicated by a MAC CE. Such a MAC CE command can include one or more of: an indication for activation or deactivation/release of a subset of cells; an indication for a number of sets of co-scheduled cells; or an indication for a number of subsets of co-scheduled cells from a corresponding number of sets of co-scheduled cells.

For example, a MAC CE activates a first subset of a set of co-scheduled cells and subsequent DCI format(s) for multi-cell scheduling apply to the first subset of cells activated by the MAC CE. The UE can receive another MAC CE command that deactivates the first subset of co-scheduled cells, or activates a second subset of co-scheduled cells, wherein the second subset can be a subset of the same set of co-scheduled cells or a subset of a different set of co-scheduled cells. If a UE receives a MAC CE that deactivates the first subset of co-scheduled cells, but does not activate a second subset of co-scheduled cells, in one alternative, the UE does not expect to receive a DCI format for multi-cell scheduling, and the UE may not monitor PDCCH according to respective search space sets, until the UE receives a new MAC CE that activates a second subset of co-scheduled cells. In another alternative, the UE can receive DCI format(s) for multi-cell scheduling even before receiving a new MAC CE that activates a second subset of co-scheduled cells, but the UE expects to be provided an indication for a subset of co-scheduled cells by the DCI format(s), or by using complementary methods, such as those described herein, for multi-cell scheduling.

In a second option for the second approach, the subset of the set of co-scheduled cells can be provided by a DCI format in a PDCCH/PDSCH. The subset of cells can change between PDCCH monitoring occasions (MOs) for PDSCH/PUSCH scheduling as indicated by a corresponding DCI format. For example, a first DCI format in a first PDCCH MO indicates scheduling on a first subset of cells, while a second DCI format in a second PDCCH MO indicates scheduling on a second subset of cells.

In a first example, a DCI format for multi-cell scheduling provides an index for a subset of cells that are co-scheduled such as a CIF value that corresponds to a subset of one or more cells from a set of co-scheduled cells. For example, UE-specific RRC signaling can indicate first/second/third/fourth indexes and corresponding first/second/third/fourth subsets that include one or more cells from a set of co-scheduled cells, wherein a subset can also include all cells from the set of co-scheduled cells. Then, a CIF field of 2 bits in a DCI format can provide a value that indicates the subset of scheduled cells. In one example, to distinguish an indication for a set of cells compared to an indication for an individual cell, an indicator value for a set of co-scheduled cells may not be referred to as a carrier indicator field (CIF) value, rather named as carrier-set indicator field or cell-set indicator field value, or other similar terms.

In a second example, a DCI format can include a 1-bit flag field to indicate whether the DCI format is for single-cell scheduling or for multi-cell scheduling in order for a UE to accordingly interpret fields of the DCI format that may also include the CIF field. Then, for single-cell scheduling, the CIF field can be interpreted as in case of single-cell cross-carrier scheduling while for multi-cell scheduling the CIF field can be interpreted as indicating a subset from the set of co-scheduled cells.

In a third example, a DCI format for multi-cell scheduling provides a number of co-scheduled cells, and the indexes of the co-scheduled cells are provided by additional methods, such as by an additional DCI format or by higher layer signaling as described herein.

In a fourth example, a CIF field in a DCI format for multi-cell scheduling can be a bitmap mapping to the individual cells or subsets of cells from the set of co-scheduled cells. When the DCI format is applicable to all cells in the set of co-scheduled cells, the DCI format may not include a CIF.

In a third option for the second approach, a UE can implicitly determine indexes for co-scheduled cells without need for explicit gNB indication. For example, the UE can determine indexes for co-scheduled cells based on a PDCCH monitoring parameter, such as: (i) a CORESET index; (ii) a search space set index, or a carrier indicator parameter n_CI corresponding to the search space set index; or (ii) a set of CCEs in the search space set or a first/last CCE in the search space set. It is noted that the UE received a PDCCH providing the DCI format for multi-cell scheduling.

According to the third option, the UE can be configured a mapping among values for PDCCH monitoring parameters, such as search space sets, and a number of co-scheduled cells or indexes of the co-scheduled cells. In one example, first and second values for parameter n_CI in a search space set can respectively indicate first and second subsets of co-scheduled cells. According to this example, the parameter n_CI can correspond to a single cell or can correspond to a group of cells, such as a subset/set of co-scheduled cells.

Receptions or transmissions on a respective subset of cells that are jointly scheduled by a single DCI format, or by using complementary methods such as those described herein, can refer to PDSCHs or PUSCHs that may or may not overlap in time. For example, the UE can be indicated to receive PDSCHs or to transmit PUSCHs on respective co-scheduled cells wherein all receptions/transmissions are in a same slot or at least one reception/transmission is in a different slot than the remaining ones.

A UE that is configured for multi-cell scheduling can be provided a first set of cell-common parameters whose values apply for scheduling on all co-scheduled cells, and a second set of cell-specific parameters whose values apply for scheduling on each corresponding co-scheduled cell. The UE can determine cell-common and cell-specific scheduling information parameters based on the specifications of the system operation, or based on higher layer configuration. For some cell-specific scheduling information parameters, the UE can be provided differential values compared to a reference value wherein the reference value can correspond, for example, to a first scheduled cell from a set of scheduled cells.

For a UE that is configured a number of sets of co-scheduled cells, a DCI format for multi-cell scheduling can provide complete or partial information for cell-common or cell-specific scheduling parameters, for multiple PDSCH receptions or multiple PUSCH transmissions on respective multiple co-scheduled cells. When the DCI format for multi-cell scheduling provides partial information for a scheduling parameter, the UE can determine remaining information from UE-specific RRC signaling or by other complementary methods.

Various embodiments of the present disclosure describe mechanisms for multi-cell scheduling.

For a UE that is configured a set of co-scheduled cells, a DCI format for multi-cell scheduling can provide full or partial information for values of cell-common and cell-specific fields for scheduling PDSCH receptions or PUSCH transmissions on respective two or more cells from the set of co-scheduled cells. When the DCI format provides partial information, the UE can determine remaining information from RRC signaling or by using other complementary methods.

In a first approach, referred to as concatenated DCI format for multi-cell scheduling, a DCI format for multi-cell scheduling can provide separate values of fields for each of the multiple co-scheduled cells. A first value corresponds to a first cell, a second value corresponds to a second cell, and so on. Therefore, DCI format fields for the multiple cells are concatenated, thereby referring to such DCI format as a concatenated DCI format for multi-cell scheduling. This approach can be beneficial, for example, for co-scheduling cells that have different channel characteristics or configurations, such as for inter-band CA operation, or for co-scheduling a PDSCH reception and a PUSCH transmission.

In a second approach, referred to as multi-cell scheduling via multi-cell mapping, a UE can be provided information for multi-cell scheduling of multiple PDSCHs/PDCCHs on multiple respective cells using a multi-cell mapping, wherein a field in a DCI format can be interpreted to provide multiple values for a corresponding scheduling parameter for the multiple co-scheduled cells. Such interpretation can be based on a configured one-to-many mapping/table or based on multiple configured offset values for respective cells that are applied to a reference value indicated by the DCI format. For example, the field can be a modulation and coding scheme (MCS) field wherein a value indicated in the DCI format can be for a PDSCH reception on a first cell and a value for a PDSCH reception on a second cell can be determined from the first value and a configured offset value. This approach can be beneficial, for example, for co-scheduling cells that have several similar physical channel characteristics or configurations, such as for intra-band CA operation.

In a third approach, referred to as single-cell DCI pointing to a PDSCH with multi-cell scheduling, a UE can be provided information for multi-cell scheduling using a single-cell scheduling DCI format, namely a DCI format that schedules a first PDSCH on a first cell, wherein the first PDSCH includes scheduling information for reception of second PDSCH(s) or transmission of second PUSCH(s) on a subset from one or more sets of co-scheduled cells. This approach can be beneficial, for example, for co-scheduling several (such as 4-8) cells that have different channel characteristics or configurations, such as for inter-band CA operation.

In a first option for the third approach, the first PDSCH includes a MAC CE that provides scheduling information for the number of PDSCH(s) or PUSCH(s). Accordingly, the MAC CE can include a number of modified DCIs (M-DCIs), wherein each M-DCI includes full or partial scheduling information for a PDSCH/PUSCH from the number of PDSCH(s)/PUSCH(s).

In a second option for the third approach, multi-cell scheduling information is multiplexed as M-DCI in a PDSCH. The UE receives a first PDSCH that is scheduled by a single-cell scheduling DCI format, and the UE receives additional scheduling information for one or more PDSCH(s)/PUSCH(s) on one or more respective co-scheduled cell(s). The UE allocates the coded modulation symbols for M-DCIs to time/frequency resources within the first PDSCH, for example in a frequency-first, time-second manner, except for reserved resources corresponding to reference signals or other cell-level broadcast transmissions. The UE can start receiving the M-DCIs in a first symbol of the first PDSCH, or in a first symbol after first symbols with DM-RS REs, in the first PDSCH. The M-DCIs can be jointly coded and include a single CRC.

In the second option, physical layer processing of M-DCI(s) that are included in the first PDSCH can be same as that for a DCI in a PDCCH, such as for the DCI scheduling the first PDSCH, or can be same as that for data information/transport block in the first PDSCH. Herein, physical layer processing refers to, for example, modulation, coding, scrambling, and so on. In addition, the UE can determine a number of coded modulation symbols corresponding to multi-scheduling information, such as M-DCIs, that are multiplexed in a first PDSCH scheduled by a single-cell scheduling DCI format, based on a scaling factor $\beta_{offset}^{PDSCH} = \beta_{offset}^{M-DCI}$ applied to a total (coded) payload size for the M-DCIs. Such scaling factor determines an effective channel coding rate of M-DCIs multiplexed on the first PDSCH, for flexible link adaptation and improved reliability of the M-DCIs according to physical channel conditions.

In a fourth approach, referred to as multi-stage PDCCHs/DCIs for multi-cell scheduling, a UE can be provided information for multi-cell scheduling of multiple PDSCHs/PDCCHs on multiple respective cells using a multi-stage DCI method, such as a 2-stage DCI wherein a first-stage DCI format includes a set of cell-common fields, and a second-stage DCI format includes cell-specific fields. The UE receives the first-stage DCI format in a first PDCCH and the second-stage DCI format in a second PDCCH. This approach can be beneficial, for example, for co-scheduling several cells that have several common physical characteristics, such as a time-domain resource allocation or a frequency-domain resource allocation, without incurring latency and without having a DCI format size that is too large (that would result if the first-stage and second-stage DCI formats were combined into a single DCI format) for receiving cell-specific parameters when the second PDCCH is received in a same slot as the first PDCCH. The first-stage DCI format can also indicate a location for a PDCCH providing the second-stage DCI format, such as a PDCCH candidate for a corresponding CCE aggregation level, so that the UE can interpret the contents of the second-stage DCI format or reduce a number of PDCCH receptions. A UE can determine an association among a number of linked multi-stage PDCCHs/DCIs, such as two PDCCHs/DCIs, that provide multi-cell scheduling information based on parameters of the linked DCI formats, such as size(s) of the DCI format(s), or RNTI(s) associated with the DCI format(s), or by an explicit indication in some field(s) in the DCI format(s), or based on PDCCH monitoring parameters, such as CORESET, search space, CCEs, or monitoring occasions in which the UE receives the first and the second linked PDCCHs.

The following embodiments of the present disclosure, denoted as E-2, describe distinguishing multi-cell scheduling from single-cell scheduling. This is described in the following examples and embodiments, such as those of FIG. 7.

Figure 7:
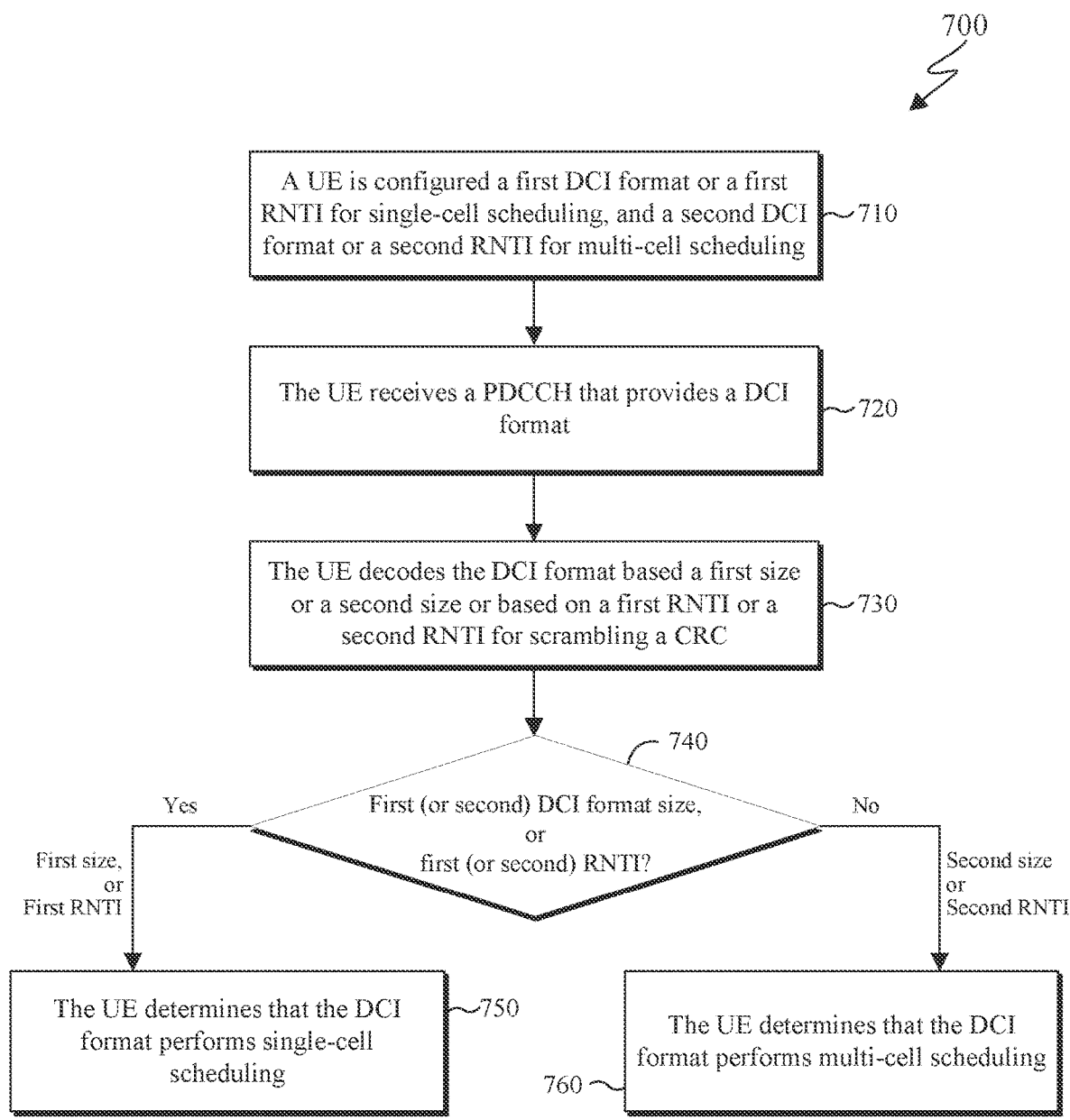
FIG. 7 illustrates an example method for distinguishing a multi-cell scheduling DCI format from a single-cell scheduling DCI format according to embodiments of the present disclosure.

FIG. 7 illustrates an example method 700 for distinguishing a multi-cell scheduling DCI format from a single-cell scheduling DCI format according to embodiments of the present disclosure. The steps of the method 700 of FIG. 7 can be performed by any of the UEs 111-116 of FIG. 1, such as the UE 116 of FIG. 3. The method 700 is for illustration only and other embodiments can be used without departing from the scope of the present disclosure.

In certain embodiments, when a UE (such as the UE 116) is configured a set of co-scheduled cells including a first cell, the UE can receive a PDCCH with a DCI format that schedules a PDSCH reception or PUSCH transmission only on the first cell (single-cell scheduling DCI format). The UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format, or by a dedicated CORESET and associated search space sets.

In a first example, a first DCI format size for multi-cell scheduling can be different from a second DCI format size for single-cell scheduling. The first DCI format size can be such that it can include a field identifying a set of co-scheduled cells and a number of fields, such as cell-common scheduling parameters, enabling a UE to decode remaining scheduling information, or a PDCCH candidate that provides a second-stage DCI format.

In a second example, a same DCI format size is used for multi-cell scheduling and for single-cell scheduling, for example in order to avoid increasing a number of DCI format sizes that the UE needs to decode in order to support multi-cell scheduling with a single DCI format. Accordingly, various approaches can be considered to identify whether a DCI format performs single-cell scheduling or multi-cell scheduling as described in the following.

A PDSCH reception or a PUSCH transmission on any cell from a set of co-scheduled cells can be scheduled by a DCI format that does not schedule any other PDSCH reception or PUSCH transmission on any other cell from the set of co-scheduled cells, such as for example by a DCI format not having a multi-cell scheduling capability, or when there is no traffic associated with the other cells. For example, for a UE that is configured cross-carrier scheduling for a set of co-scheduled cells by a scheduling cell, the UE can receive on the scheduling cell a first PDCCH that includes a first DCI format for scheduling a single cell from the number of co-scheduled cells and a second PDCCH that includes a second DCI format for scheduling all cells in the set of co-scheduled cells.

Herein, a DCI format for multi-cell scheduling can refer to, for example, one or more of: (i) a concatenated DCI format for multi-cell scheduling; (ii) a DCI format based on multi-cell mapping; (iii) a first DCI format in a first PDCCH or a second DCI format or an M-DCI or a collection of M-DCIs included in a first PDSCH that is scheduled by the first DCI; or (iv) a first DCI format in a first PDCCH or a second DCI format in a second PDCCH, wherein the first DCI/PDCCH and the second DCI/PDCCH are linked in a two-stage DCI operation. It is noted that all aforementioned terms and procedures are described herein.

In a first approach, the UE can distinguish multi-cell scheduling from single-cell scheduling based on one or more dedicated DCI formats or DCI format sizes for multi-cell scheduling, which are not used for single-cell scheduling. For example, the UE can be configured a DCI format 0_4 for transmission of multiple PUSCHs or a DCI format 1_4 for reception of multiple PDSCHs on a set of co-scheduled cells. A dedicated size of a DCI format for multi-cell scheduling can also depend on a number of co-scheduled cells or a set of cell-common or cell-specific scheduling parameters for multi-cell scheduling. A dedicated DCI format size for transmission of multiple PUSCHs can be different from a dedicated DCI format size for reception of multiple PDSCHs on a set of co-scheduled cells.

In one example, when a UE is configured dedicated DCI formats or DCI format sizes for multi-cell scheduling, the UE is expected to support a larger number of DCI format sizes than when the UE operates only with single-cell scheduling. For example, a UE supporting multi-cell scheduling (by a single DCI format) can be expected to support, or can indicate as a capability, one or two additional DCI format sizes compared to a UE not supporting multi-cell scheduling by a single DCI format. The UE counts a number of sizes for DCI formats per serving cell based on a number of configured PDCCH candidates in respective search space sets for the corresponding active DL BWP.

To avoid requiring a larger number of DCI format sizes for a UE to support multi-cell scheduling and avoid fragmentation of a number of PDCCH candidates that a UE can monitor over an increased number of DCI format sizes, it is beneficial to provide additional means for distinguishing multi-cell scheduling from single-cell scheduling by means other than DCI format size. A DCI format for multi-cell scheduling can have a same size as a DCI format for single cell scheduling.

In a second approach, a UE can distinguish multi-cell scheduling based on a new/dedicated RNTI, such as a M-RNTI, for scrambling a CRC of a DCI format for multi-cell scheduling. For example, such an RNTI can be configured by UE-specific RRC signaling.

In a third approach, a UE can distinguish multi-cell scheduling based on an explicit field or indication in a DCI format for multi-cell scheduling. For example, a DCI format can include a 1-bit flag, with a value '1' corresponding to multi-cell scheduling, and a value '0' corresponding to single-cell scheduling. In one example, a UE can distinguish multi-cell scheduling based on a validation procedure for a single-cell scheduling DCI format. For example, when values for one or more DCI fields in a single-cell scheduling DCI format is set to default/predetermined values, the UE determines that the DCI format is used for multi-cell scheduling. In example, one or more DCI fields corresponding to cell-specific scheduling parameters, such as HARQ process number (HPN), redundancy version (RV), SRS resource indicator (SRI), TCI state, APs, time domain resource allocation (TDRA), frequency domain resource allocation (FDRA), or MCS, can be set to all-zeros or all-ones values, for the case of multi-cell scheduling.

In a fourth approach, a UE can distinguish multi-cell scheduling based on a CORESET associated with a search space set that is configured for receiving PDCCH that provides a DCI format for multi-cell scheduling. For example, the UE can be configured with a dedicated CORESET for multi-cell scheduling, so that search space sets for multi-cell scheduling do not overlap with search space sets that are not used for multi-cell scheduling.

In one example, a combination of the above options can be used. For example, for multi-cell scheduling based on a first stage DCI format and a second stage DCI format, the UE determines a DCI format (in a first PDCCH) that is scrambled by a new/dedicated RNTI, such as an M-RNTI, and also satisfies the aforementioned validation procedure, to be a first-stage DCI format and a second-stage DCI format can be included in a PDSCH scheduled by the first stage DCI format or in another PDCCH, as described herein.

The method 700, as illustrated in FIG. 7, describes an example procedure for distinguishing a multi-cell scheduling DCI format from a single-cell scheduling DCI format.

In step 710, a UE (such as the UE 116) is configured a first DCI format or a first RNTI for single-cell scheduling, and a second DCI format or a second RNTI for multi-cell scheduling. In step 720, the UE receives a PDCCH that provides a DCI format. In step 730, the UE decodes the DCI format based a first size or a second size or based on a first RNTI or a second RNTI for scrambling a CRC. In step 740, the UE determines whether the decoded DCI format has the first size or the second size, or has CRC scrambled by the first RNTI or the second RNTI. When the DCI format has the first size or has CRC scrambled by the first RNTI (as determined in step 740), the UE in step 750 determines that the DCI format performs single-cell scheduling. Alternatively, When the DCI format has the second size or CRC scrambled by the second RNTI (as determined in step 740), the UE in step 760 determines that the DCI format performs multi-cell scheduling.

Although FIG. 7 illustrates the method 700 various changes may be made to FIG. 7. For example, while the method 700 is shown as a series of steps, various steps could overlap, occur in parallel, occur in a different order, or occur multiple times. In another example, steps may be omitted or replaced by other steps. For example, steps of the method 700 can be executed in a different order.

Various embodiments of the present disclosure describe search space set design for multi-cell scheduling. This is described in the following examples and embodiments, such as those of FIG. 8.

Figure 8:
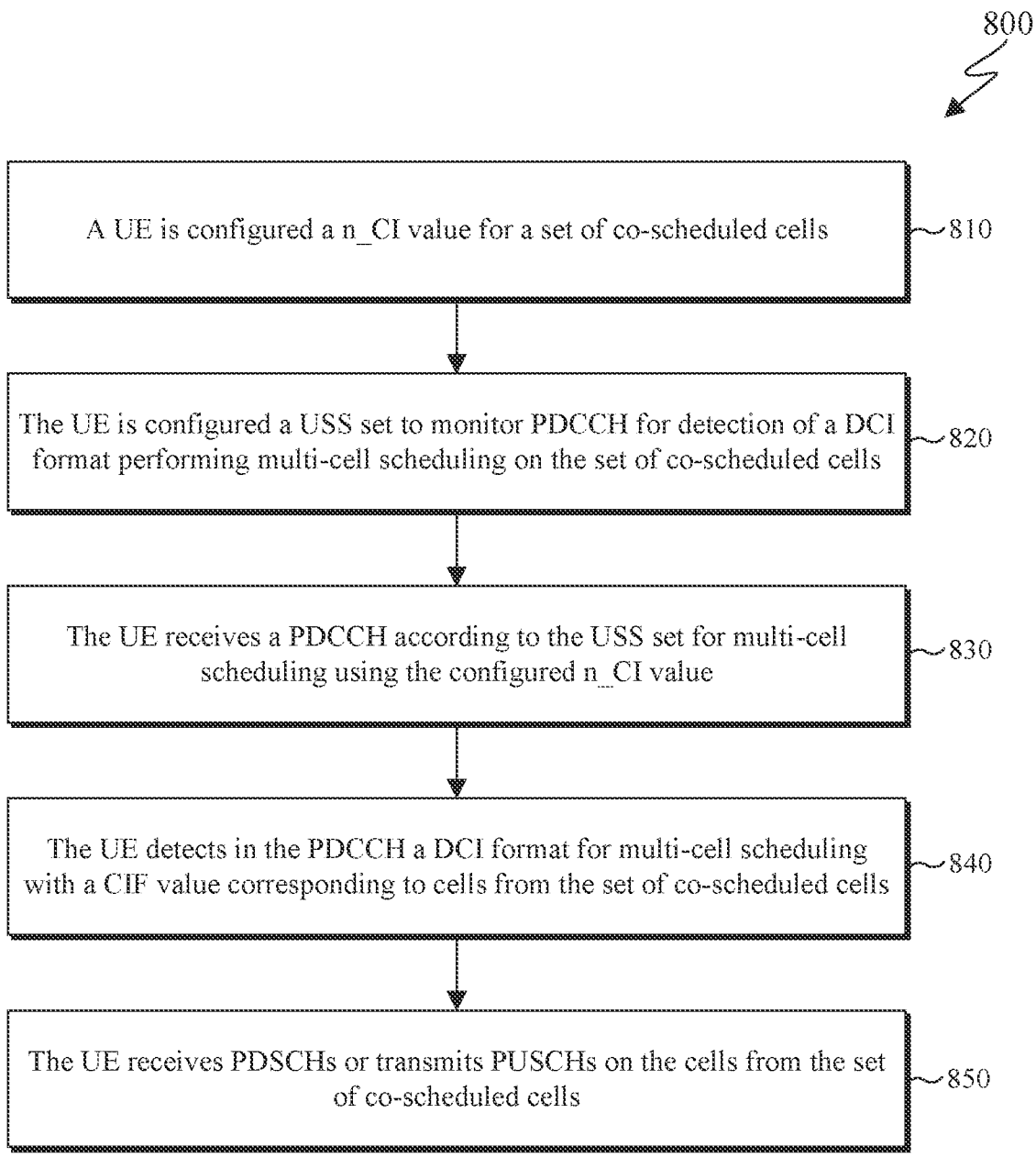
FIG. 8 illustrates an example method for monitoring PDCCH in a search space set for multi-cell scheduling according to embodiments of the present disclosure.

FIG. 8 illustrates an example method 800 for monitoring PDCCH in a search space set for multi-cell scheduling according to embodiments of the present disclosure. The steps of the method 800 of FIG. 8 can be performed by any of the UEs 111-116 of FIG. 1, such as the UE 116 of FIG. 3. The method 800 is for illustration only and other embodiments can be used without departing from the scope of the present disclosure.

In certain embodiments, when a UE (such as the UE 116) is configured multi-cell scheduling for a set of co-scheduled cells by a scheduling cell, the UE can determine an association among search space sets for multi-cell scheduling and subsets of the set of co-scheduled cells based on a modified interpretation for a value of a CIF field, n_CI, in a DCI format performing multi-cell scheduling.

In a first example, a UE can be configured search space sets to monitor only DCI formats for multi-cell scheduling (MC-DCI formats). Each of such search space sets can have a respective identifier, such as an n_CI value associated with a CIF field in a DCI format performing multi-cell scheduling.

In a second example, a UE is configured search space sets used for monitoring PDCCH providing DCI formats that can perform both single-cell and multi-cell scheduling.

An example of an information element SearchSpaceMultiCell, is described in Syntax (4), below. Here, a UE can be configured to monitor only a DCI format for multi-cell scheduling. Herein, DCI formats 0_4 and 1_4 are considered to be DCI formats for uplink multi-cell scheduling and downlink multi-cell scheduling, respectively.

```
Syntax                                                                              (4)
--ASN1START
--TAG-SEARCHSPACE-START
SearchSpaceMultiCell-r18 ::=        SEQUENCE {
    searchSpaceId                   SearchSpaceId,
    controlResourceSetId            ControlResourceSetId
OPTIONAL,   -- Cond SetupOnly searchSpaceId
    coScheduledCells                SEQUENCE (SIZE (1..maxNrofCells)) OF INTEGER (0..7),
OPTIONAL,   -- Need R
    cif-InSchedulingCell            INTEGER (8..15),
OPTIONAL,   -- Need R
    monitoringSlotPeriodicityAndOffset  CHOICE {
        sl1                         NULL,
        sl2                         INTEGER (0..1),
        sl4                         INTEGER (0..3),
        sl5                         INTEGER (0..4),
        sl8                         INTEGER (0..7),
        sl10                        INTEGER (0..9),
        sl16                        INTEGER (0..15),
        sl20                        INTEGER (0..19),
        sl40                        INTEGER (0..39),
        sl80                        INTEGER (0..79),
        sl160                       INTEGER (0..159),
        sl320                       INTEGER (0..319),
        sl640                       INTEGER (0..639),
        sl1280                      INTEGER (0..1279),
        sl2560                      INTEGER (0..2559),
    }
OPTIONAL,   -- Cond Setup
    duration                        INTEGER (2..2559),
OPTIONAL,   -- Need R
    monitoringSymbolsWithinSlot     BIT STRING (SIZE (14))
OPTIONAL,   -- Cond Setup
    nrofCandidates                  SEQUENCE {
        aggregationLevel1           ENUMERATED {n0, n1, n2, n3, n4, n5, n6, n8},
        aggregationLevel2           ENUMERATED {n0, n1, n2, n3, n4, n5, n6, n8},
        aggregationLevel4           ENUMERATED {n0, n1, n2, n3, n4, n5, n6, n8},
        aggregationLevel8           ENUMERATED {n0, n1, n2, n3, n4, n5, n6, n8},
        aggregationLevel16          ENUMERATED {n0, n1, n2, n3, n4, n5, n6, n8},
    }
OPTIONAL,   -- Cond Setup
    searchSpaceType-r18             SEQUENCE {
        ue-Specific-r18             SEQUENCE {
            dci-Formats-MC-r18      ENUMERATED {formats0-4-And-1-4, formats0-4, formats1-4}
OPTIONAL    -- Need R
        }
    }
OPTIONAL    -- Cond Setup2
}
```

An example for an update to a SearchSpace information element is described in Syntax (5). Here, the UE can be configured to monitor DCI formats for both multi-cell scheduling and single-cell scheduling is provided by "SearchSpace information element."

```
Syntax                                                                              (5)
-- ASN1START
-- TAG-SEARCHSPACE-START
SearchSpace ::=                     SEQUENCE {
    searchSpaceId                   SearchSpaceId,
    controlResourceSetId            ControlResourceSetId
OPTIONAL,   -- Cond SetupOnly
    monitoringSlotPeriodicityAndOffset  CHOICE {
        sl1                         NULL,
        sl2                         INTEGER (0..1),
        sl4                         INTEGER (0..3),
        sl5                         INTEGER (0..4),
        sl8                         INTEGER (0..7),
        sl10                        INTEGER (0..9),
        sl16                        INTEGER (0..15),
```

```
    sl20                         INTEGER (0..19),
    sl40                         INTEGER (0..39),
    sl80                         INTEGER (0..79),
    sl160                        INTEGER (0..159),
    sl320                        INTEGER (0..319),
    sl640                        INTEGER (0..639),
    sl1280                       INTEGER (0..1279),
    sl2560                       INTEGER (0..2559)
  }
OPTIONAL,   -- Cond Setup
    duration                     INTEGER (2..2559)
OPTIONAL,   -- Need R
    monitoringSymbolsWithinSlot  BIT STRING (SIZE (14))
OPTIONAL,   -- Cond Setup
    nrofCandidates               SEQUENCE {
       aggregationLevel1             ENUMERATED {n0, n1, n2, n3, n4, n5, n6, n8},
       aggregationLevel2             ENUMERATED {n0, n1, n2, n3, n4, n5, n6, n8},
       aggregationLevel4             ENUMERATED {n0, n1, n2, n3, n4, n5, n6, n8},
       aggregationLevel8             ENUMERATED {n0, n1, n2, n3, n4, n5, n6, n8},
       aggregationLevel16            ENUMERATED {n0, n1, n2, n3, n4, n5, n6, n8},
    }
OPTIONAL,   -- Cond Setup
    searchSpaceType              CHOICE {
        common                       SEQUENCE {
          dci-Format0-0-AndFormat1-0     SEQUENCE {
            ...
          }
OPTIONAL,   -- Need R
          dci-Format2-0                SEQUENCE {
             nrofCandidates-SFI           SEQUENCE {
                aggregationLevel1            ENUMERATED {n1, n2}
OPTIONAL,   -- Need R
                aggregationLevel2            ENUMERATED {n1, n2}
OPTIONAL,   -- Need R
                aggregationLevel4            ENUMERATED {n1, n2}
OPTIONAL,   -- Need R
                aggregationLevel8            ENUMERATED {n1, n2}
OPTIONAL,   -- Need R
                aggregationLevel16           ENUMERATED {n1, n2}
OPTIONAL,   -- Need R
             },
             ...
          }
OPTIONAL,   -- Need R
          dci-Format2-1                SEQUENCE {
            ...
          }
OPTIONAL,   -- Need R
          dci-Format2-2                SEQUENCE {
            ...
          }
OPTIONAL,   -- Need R
          dci-Format2-3                SEQUENCE {
             dummy1                       ENUMERATED {sl1, sl2, sl3, sl4, sl5, sl8, sl10, sl16, sl20}
OPTIONAL,   -- Cond Setup
             dummy2                       ENUMERATED {n1, n2},
             ...
          }
OPTIONAL,   -- Need R
        },
        ue-Specific                  SEQUENCE {
           dci-Formats                  ENUMERATED {formats0-0-And-1-0, formats0-1,
And-1-1-},
OPTIONAL    -- Need R
           ...,
           [[
           dci-Formats-MT-r16           ENUMERATED {formats2-5}
OPTIONAL,   -- Need R
           dci-Formats-SL-r16           ENUMERATED {formats0-0-And-1-0, formats0-1-And-
1-1, formats3-0, formats3-1,
                                         formats3-0-And-3-1}
OPTIONAL,   -- Need R
           dci-Formats-Ext-r16          ENUMERATED {formats0-2-And-1-2, formats0-1-And-
1-1, formats0-2, formats1-2,
```

-continued

```
OPTIONAL    -- Need R
    dci-Formats-MC-r18        ENUMERATED {formats0-4-And-1-4, formats0-4,
formats1-4}
OPTIONAL,   -- Need R
    ]]
  }
 }
OPTIONAL    -- Cond Setup2
}
```

In one example, a search space set for a set of co-scheduled cells can be a USS set defined by an n_CI parameter that is generalized to apply to the configured set of co-scheduled cells, instead of a single scheduled cell. For example, a n_CI or CIF=0 can refer to self-carrier scheduling, an n_CI or CIF in a set {1, 2, . . . , 7} can refer to cross-carrier scheduling of a single scheduled cell, and an n_CI or CIF in a set {8, 9, . . . , 15} can refer to cross-carrier scheduling of one from eight subsets of co-scheduled cells from a set of co-scheduled cells. A search space for determining CCE locations for PDCCH candidates can be provided as described in Equation (10). In Equation (10), all parameters are defined as in the case of single-cell scheduling, and a value for the n_CI parameter is provided by RRC configuration, as described above. In addition, the initial value $Y_{p,-1} = n_{RNTI} \neq 0$ can be based on C-RNTI or based on an RNTI, such as an M-RNTI, for multi-cell scheduling.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i \quad (10)$$

In one example, if the UE is configured to have only one set of co-scheduled cells associated with a scheduling cell, such as when the set of co-scheduled cells includes all scheduled cells corresponding to the scheduling cell, then a single value for n_CI can be used, such as n_CI=8. Such value can be fixed in the specifications for system operations.

In another example, if the UE can be configured to have multiple sets of co-scheduled cells associated with a scheduling cell, there can be various options for mapping among sets of co-scheduled cells associated with a scheduling cell and values of n_CI.

In a first option, the UE receives higher layer signaling, such as dedicated RRC configuration, which provides values of n_CI for a set of co-scheduled cells.

In a second option, the UE determines a value of n_CI for a set of co-scheduled cells based on values of n_CI for each scheduled cell included in the set of co-scheduled cells. In one example, a value of n_CI for a set of co-scheduled cells can be based on summation of n_CI values corresponding to the cells included in the set of co-scheduled cells. In another example, a value of n_CI for a set of co-scheduled cells can be defined as described in Equation (11) or Equation (12).

$$n_{CI}(\text{set}) = 8 + ((\Sigma_{i \in \text{set}} n_{CI}(\text{cell } \#i)) \mod 8) \quad (11)$$

$$\text{CIF}(\text{set}) = 8 + ((\Sigma_{i \in \text{set}} \text{CIF}(\text{cell } \#i)) \mod 8) \quad (12)$$

In a third option, the UE determines a value of n_CI for a set of co-scheduled cells based on a value of n_CI for a reference scheduled cell in the set of co-scheduled cells, when a same cell is not a reference cell for more than one set of co-scheduled cells. For example, a reference scheduled cell in a set of co-scheduled cells can be a cell with: (i) a smallest or largest n_CI value; or (ii) a smallest or largest cell index (cell ID or ServCellIndex) value; or (iii) the scheduling cell, namely n_CI=0, at least for the case where the scheduling cell is included in the set of co-scheduled cells.

According to the third option, the UE determines a same search space and corresponding PDCCH candidates for multi-cell scheduling with an n_CI value based on a reference scheduled cell from the set and for single-cell scheduling when only the reference scheduled cell is scheduled by the scheduling cell. In such case, the UE can use other means, such as those described herein to distinguish multi-cell scheduling from single-cell scheduling.

In one example, a search space set for multi-cell scheduling on a set of co-scheduled cells can be associated with multiple n_CI values, such as a first n_CI value corresponding to a first cell from the set of co-scheduled cells when the UE monitors a first linked search space set configured on the first cell, and a second n_CI value corresponding to a second cell from the set of co-scheduled cells when the UE monitors a second linked search space set configured on the second cell.

A search space set can be associated with a CORESET configured for single-cell scheduling or a CORESET configured for multi-cell scheduling.

When multiple sets of co-scheduled cells are associated with a same scheduling cell, the UE monitors PDCCH for each set of co-scheduled cells separately, wherein each set can have a different n_CI value. For example, for a set of co-scheduled cells that includes {cell #0, cell #1, cell #2, and cell #3}, a $n_{CI}$ value of '00' can be associated with scheduling for cell #0 and cell #1, a $n_{CI}$ value of '01' can be associated with scheduling for cell #0 and cell #2, a $n_{CI}$ value of '10' can be associated with scheduling for cell #0 and cell #3, and a $n_{CI}$ value of '00' can be associated with scheduling for cell #0, cell #1, cell #2, and cell #3. A DCI format can schedule only a subset of cells from the set of co-scheduled cells. For example, a DCI format can co-schedule 2 cells from a set of 4 co-scheduled cells. A CIF value in the DCI format refers to the subset of cells that are actually scheduled and does not refer to the set of co-scheduled cells. Therefore, the CIF value in the DCI format can be, in general, different from the n_CI value used for monitoring the search space set for multi-cell scheduling corresponding to the set of co-scheduled cells. In the special case that a DCI format is scheduling on all cells from the set of co-scheduled cells, a CIF value provided in the DCI format can be same as an n_CI value used for monitoring the search space set.

In one example, a UE can monitor PDCCH according to a common search space (CSS) set for multi-cell scheduling. The UE can be configured to monitor PDCCH for detection of a unicast DCI format such as a DCI format 0_0 or 1_0 repurposed for multi-cell scheduling. Such unicast DCI format can be a first-stage DCI format for a two-stage scheduling mechanism with a second-stage DCI multiplexed in a PDSCH that is scheduled by the first-stage DCI, or in another PDCCH, as described herein. In another example, the UE does not expect to be configured to monitor PDCCH according to a CSS set for multi-cell scheduling.

The method 800, as illustrated in FIG. 8 describes a procedure for monitoring PDCCH in a search space set for multi-cell scheduling.

In step 810, a UE (such as the UE 116) is configured a n_CI value for a set of co-scheduled cells. In step 820, the UE is configured a USS set to monitor PDCCH for detection of a DCI format performing multi-cell scheduling on the set of co-scheduled cells. In step 830, the UE receives a PDCCH according to the USS set for multi-cell scheduling using the configured n_CI value. In step 840, the UE detects in the PDCCH a DCI format for multi-cell scheduling with a CIF value corresponding to cells from the set of co-scheduled cells. In step 850, the UE receives PDSCHs or transmits PUSCHs on cells from the set of co-scheduled cells.

Although FIG. 8 illustrates the method 800 various changes may be made to FIG. 8. For example, while the method 800 is shown as a series of steps, various steps could overlap, occur in parallel, occur in a different order, or occur multiple times. In another example, steps may be omitted or replaced by other steps. For example, steps of the method 800 can be executed in a different order.

Various embodiments of the present disclosure describe search space linking for multi-cell scheduling. This is described in the following examples and embodiments, such as those of FIG. 9.

Figure 9:
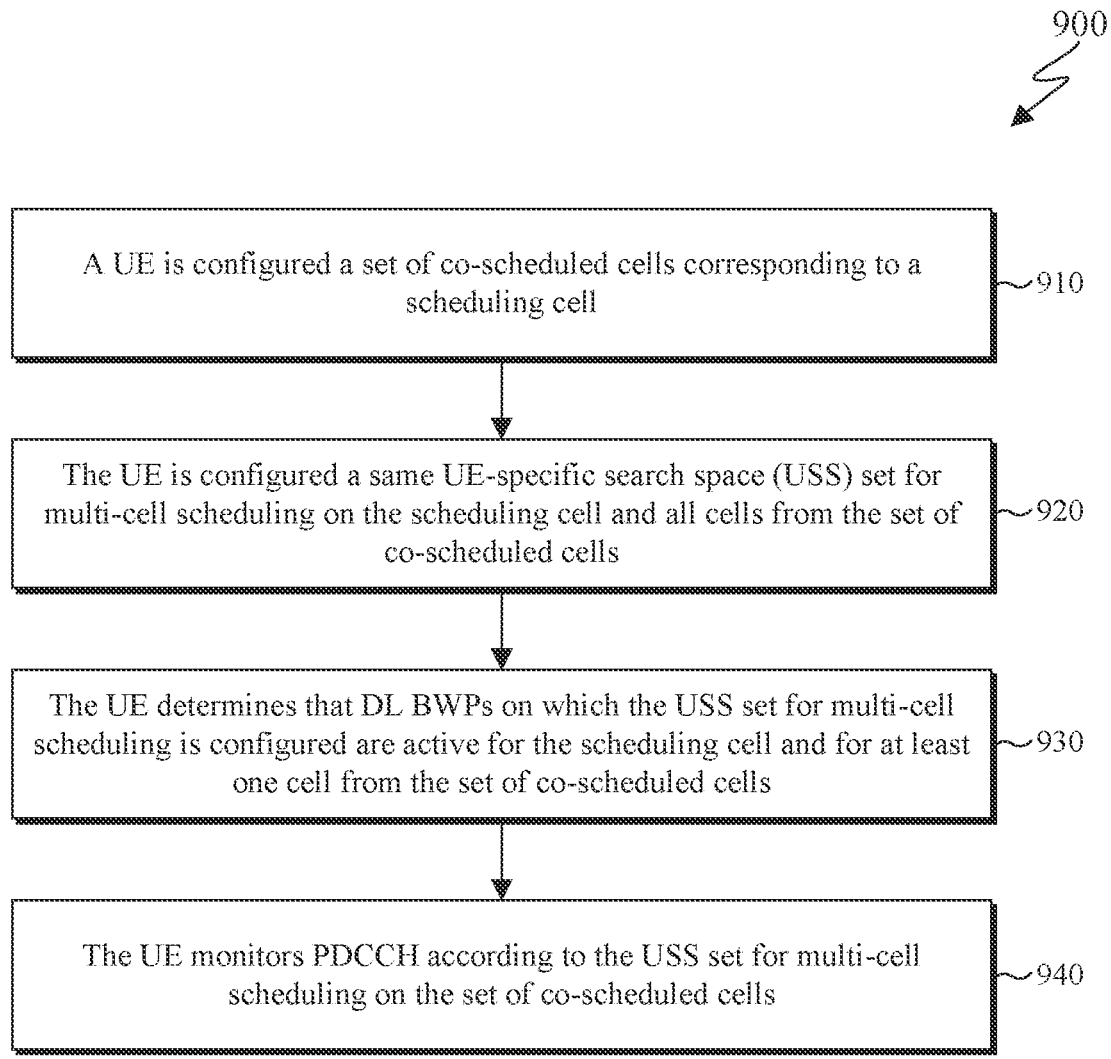
FIG. 9 illustrates an example method for search space linking for multi-cell scheduling according to embodiments of the present disclosure.

FIG. 9 illustrates an example method 900 for search space linking for multi-cell scheduling according to embodiments of the present disclosure. The steps of the method 900 of FIG. 9 can be performed by any of the UEs 111-116 of FIG. 1, such as the UE 116 of FIG. 3. The method 900 is for illustration only and other embodiments can be used without departing from the scope of the present disclosure.

Several approaches are considered for search space set configuration and linking to sets of co-scheduled cells.

For single-cell scheduling, a UE is configured a first search space set on a scheduling cell and a second search space set on a scheduled cell, wherein the first and second search space sets are linked by having a same search space index and the second search space set includes none of the optional fields, except for nrofCandidates (regardless of their presence conditions in the SearchSpace IE). In addition, the UE applies the search space set for the scheduled cell only if the DL BWPs in which the linked search space sets are configured in the scheduling cell and the scheduled cell are both active.

In one example, for the optional fields in a linked search space set in the scheduled cell, the UE uses same values corresponding to the fields as provided in a linked search space set in the scheduling cell. In another example, the UE can be provided separate values for some of the optional fields in a linked search space set in the scheduled cell that are different from values for corresponding fields in the linked search space set in the scheduling cell. For example, a PDCCH monitoring periodicity, offset, or duration can be different on the scheduled cell than on the scheduling cell.

For multi-cell scheduling, in an exemplary realization, a same search space set for multi-cell scheduling can be provided on all cells from the set of co-scheduled cells. It is also possible that a search space set for multi-cell scheduling is provided only on the scheduling cell and is not provided on any of the (other) co-scheduled cells.

In a first approach, a UE can be configured a first search space set on a corresponding scheduling cell and a number of N linked search space sets on all N cells in a set of co-scheduled cells, with a search space set configured on each of the N cells. In addition, the UE applies a linked search space set for a scheduled cell from the set of co-scheduled cells only if the DL BWPs in which the linked search space sets are configured in the scheduling cell and in the scheduled cell are both active.

In another example, the UE applies the linked search space sets for the set of co-scheduled cells only if the DL BWPs in which the linked search space sets are configured in the scheduling cell and in at least one cell from the set of co-scheduled cells are active. In this example, the UE can operate with a same n_CI value for the first search space set and all N linked search space sets, or can operate with different n_CI values for the first search space set and all N linked search space sets, based on the at least one cell with active DL BWP. For example, the linked search space sets for multi-cell scheduling on a set of co-scheduled cells can be associated with a first n_CI value corresponding to a first cell from the set of co-scheduled cells when the UE monitors a linked search space set configured on an active DL BWP of the first cell, and associated with a second n_CI value corresponding to a second cell from the set of co-scheduled cells when the UE monitors a linked search space set configured on an active DL BWP of the second cell.

In yet another example, the UE applies the linked search space sets for the set of co-scheduled cells only if the DL BWPs in which the linked search space sets are configured in the scheduling cell and in all N cells from the set of co-scheduled cells are all active. In this example, the UE is expected to operate with a same n_CI value for the first search space set and all N linked search space sets.

In a special case where the scheduling cell is among the set of N co-scheduled cells, an additional search space set on the scheduling cell is not needed, as the UE is already configured with the first search space set (with full search space configuration) on the scheduling cell. Then, only (N−1) search space sets need to be configured on the remaining cells from the set of co-scheduled cells.

In one example, when a search space set is for multi-cell scheduling, a UE expects to be configured a same number of PDCCH candidates by a parameter nrofCandidates on each of the N linked search spaces sets for the set of co-scheduled cells. In another example, when a search space can be used for both single-cell scheduling and multi-cell scheduling, the UE can be configured different numbers of PDCCH candidates by corresponding parameters nrofCandidates on each of the N linked search spaces sets for the set of co-scheduled cells.

In a second approach, the UE can be configured a first search space set on a scheduling cell and a second linked search space set only on a reference scheduled cell from a set of co-scheduled cells. The UE does not expect to be configured linked search space sets on other cells from the set of co-scheduled cells. Herein, a reference cell from the set of co-scheduled cells can refer to any of the examples described herein.

According to the second approach, the UE applies the linked search space sets for a scheduled cell only if the DL BWPs in which the linked search space sets are configured in the scheduling cell and the reference cell are both active.

In a variation of the second approach, the reference scheduled cell cam be any cell from a set of co-scheduled cells. Such variation can be applicable, for example, when a UE is configured a search space set to monitor PDCCH for detection of DCI formats for both single-cell scheduling and multi-cell scheduling. Then, a search space set configuration and linking can follow the existing rules for search space sets for single cell scheduling only.

In one example, the UE can be configured(i) with a first search space set on a first cell from a set of co-scheduled cells, wherein the UE monitors PDCCH for detection of DCI formats for both single-cell scheduling on the first cell and multi-cell scheduling on the set of co-scheduled cells, and (ii) with a second search space set on a second cell from the set of co-scheduled cells, wherein the UE monitors PDCCH for detection of DCI formats for both single-cell scheduling on the second cell and multi-cell scheduling on the set of co-scheduled cells.

In a third approach, search space set linking is not used for multi-cell scheduling and multi-cell scheduling is treated as self-cell scheduling. A UE can be configured only a first search space set on a corresponding scheduling cell and the UE does not expect any other linked search space sets on any of the cells from the set of co-scheduled cells. Accordingly, there is no constraint on a DL BWP for any of the cells from the set of co-scheduled cells and only a DL BWP of the scheduling cell on which the first search space set is configured needs to be active.

The method 900, as illustrated in FIG. 9, describes an example procedure for search space linking for multi-cell scheduling.

In step 910, a UE (such as the UE 116) is configured a set of co-scheduled cells having a same scheduling cell. In step 920, the UE is configured a same USS set for multi-cell scheduling on the scheduling cell and on all cells from the set of co-scheduled cells. In step 930 the UE determines that DL BWPs on which the USS set for multi-cell scheduling is configured are active for the scheduling cell and for at least one cell from the set of co-scheduled cells. In step 940, the UE monitors PDCCH according to the USS set for multi-cell scheduling on the set of co-scheduled cells.

Although FIG. 9 illustrates the method 900 various changes may be made to FIG. 9. For example, while the method 900 is shown as a series of steps, various steps could overlap, occur in parallel, occur in a different order, or occur multiple times. In another example, steps may be omitted or replaced by other steps. For example, steps of the method 900 can be executed in a different order.

Various embodiments of the present disclosure describe BD/CCE allocation for multi-cell scheduling. This is described in the following examples and embodiments, such as those of FIGS. 10 and 11.

Figure 10:
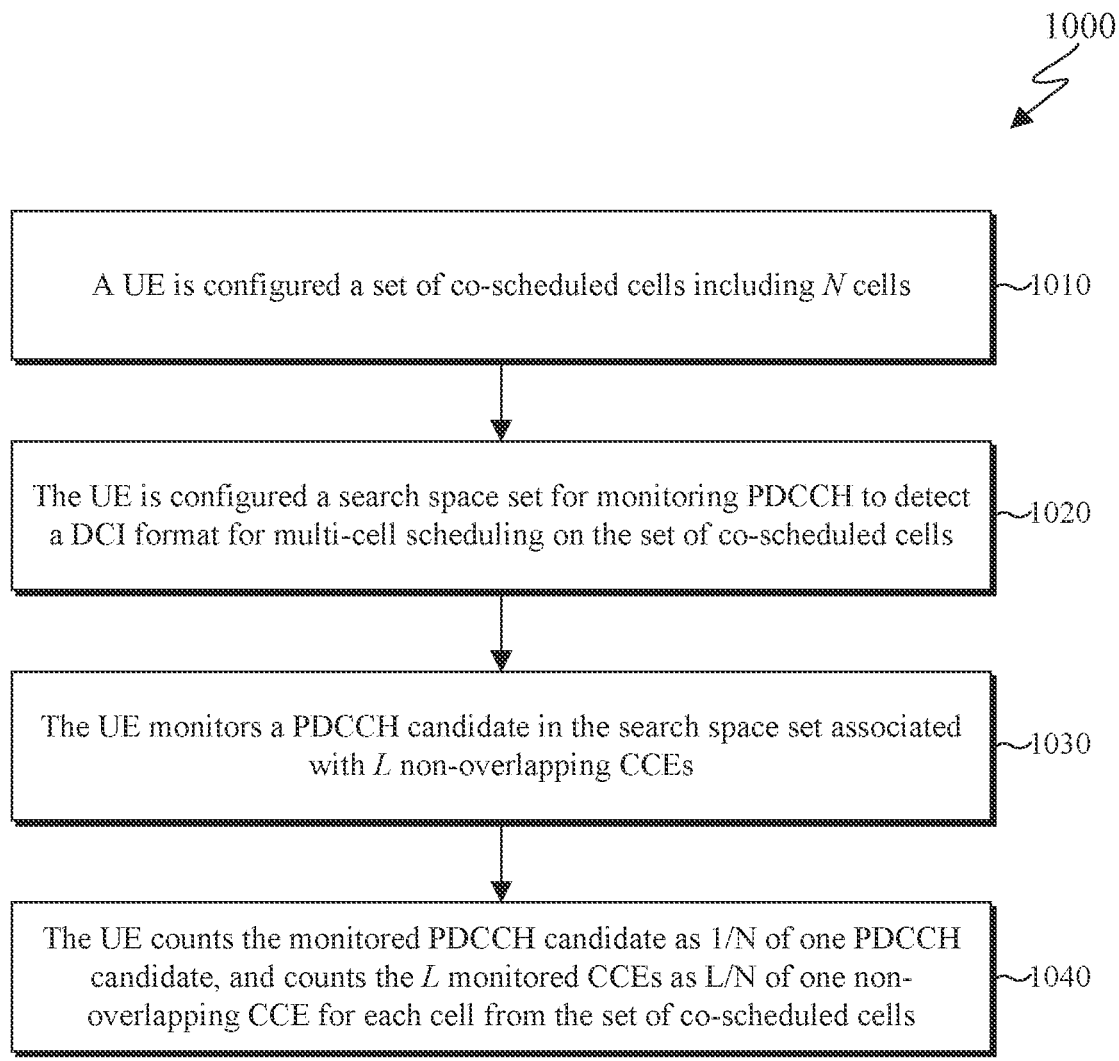
FIGS. 10 and 11 illustrate example methods for counting PDCCH candidates for multi-cell scheduling operation according to embodiments of the present disclosure.
Figure 11:
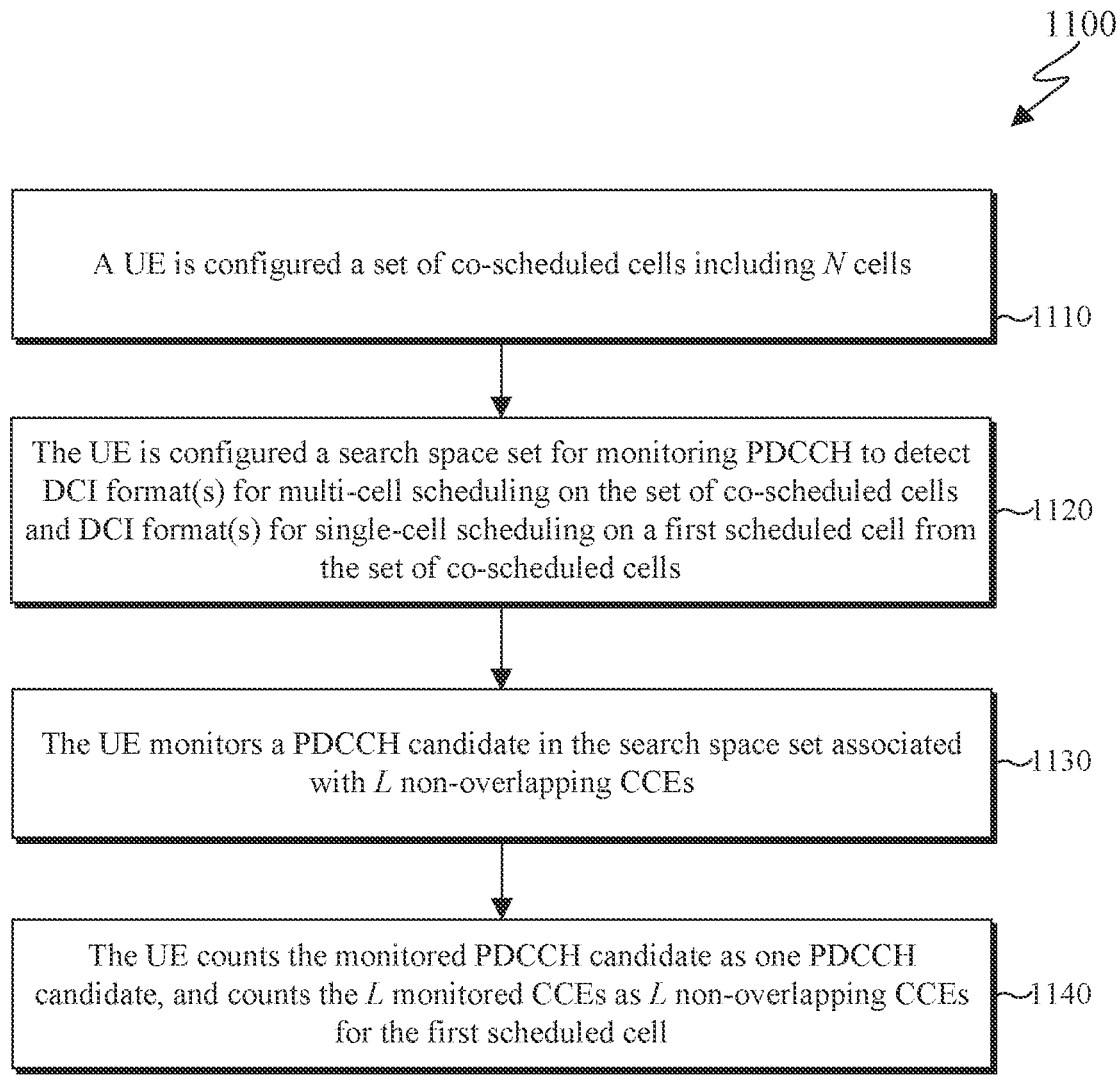

FIGS. 10 and 11 illustrate example methods 1000 and 1100, respectively, for counting PDCCH candidates for multi-cell scheduling operation according to embodiments of the present disclosure. The steps of the method 1000 of FIG. 10 and the method 1100 of FIG. 11 can be performed by any of the UEs 111-116 of FIG. 1, such as the UE 116 of FIG. 3. The method 1000 and the method 1100 are for illustration only and other embodiments can be used without departing from the scope of the present disclosure.

In certain embodiments, a UE (such as the UE 116) configured for multi-cell scheduling for a set of co-scheduled cells monitors a same total number of PDCCH candidates and non-overlapping CCEs for a corresponding scheduling cell as when the UE is configured for single-cell scheduling, but the UE counts a number of PDCCH candidates and non-overlapping CCEs per scheduled cell from the set of co-scheduled cells differently based on whether the search space set is used for multi-cell scheduling only or also for single-cell scheduling. The UE applies modified methods such as fractional counting for PDCCH candidates and non-overlapping CCEs in case of multi-cell scheduling only, but applies existing methods for counting PDCCH candidates and non-overlapping CCEs such as those described in TS 38.213 v16.5.0 in case of a search space set configured for both single-cell scheduling and multi-cell scheduling.

In a first case, when the UE monitors PDCCH candidates on a search space set used only for multi-cell scheduling, the UE counts each PDCCH candidates as a fraction towards a maximum number of PDCCH candidates that the UE can monitor in a slot or a span for each scheduled cell from the set of co-scheduled cells. For example, for a set of co-scheduled cells that includes 4 cells, the UE counts a PDCCH candidate for 4-cell scheduling as ¼ of a PDCCH candidate for each scheduled cell from the set of 4 cells. That allocation applies regardless of whether or not a DCI format is detected for a PDCCH candidate or regardless of whether a detected DCI format co-schedules the entire set, such as all 4 cells, or only a subset of the configured cells, such as only 2 cells from the 4 cells. Herein, the slot or span is with respect to SCS configuration of the active DL BWP of the scheduling cell.

In a second case, when the UE monitors PDCCH candidates on a search space set associated with a first scheduled cell from the configured set of co-scheduled cells, and also monitors PDCCH candidates for detection of DCI formats for single-cell scheduling associated with the first scheduled cell, UE does not consider multi-cell scheduling for allocation of PDCCH candidates. Therefore, the UE counts all PDCCH candidates associated with the search space set only towards the PDCCH monitoring allocation for the first scheduled cell.

As described earlier, a search space set used for multi-cell scheduling can be: (i) a search space set that is associated only with DCI formats for multi-cell scheduling, or (ii) a search space set that is associated with both DCI formats for multi-cell scheduling and DCI formats for single-cell scheduling, or (iii) a search space set that is associated only with DCI formats for single-cell scheduling, wherein the DCI formats can be used for or can result in multi-cell scheduling.

A DCI format for single-cell scheduling can be used not only for scheduling a single cell but also for scheduling a set of co-scheduled cells, for example, by using a different RNTI or by using multi-cell mapping, or by providing the multi-cell scheduling information in a PDSCH that is scheduled by the DCI format or in another PDCCH, as described herein.

The following describes per-scheduling-cell BD/CCE allocation

For counting a number of PDCCH candidates and non-overlapping CCEs for a corresponding scheduling cell, there is no impact to UE behavior due to multi-cell scheduling support. For example, multi-cell scheduling is a scheme for how to consume and allocate a PDCCH monitoring capability of a UE, unlike a multi-TRP operation that may require increasing a number of PDCCH candidates and non-overlapping CCEs monitored by a UE on a scheduling cell. Therefore, there is no change to counting of scheduled cells and determination of $M_{PDCCH}^{total,slot,\mu}$ or $C_{PDCCH}^{total,slot,\mu}$ limits (or corresponding limits for PDCCH monitoring per span, instead of per slot).

In another option, when a scheduled cell is configured, in addition to single-cell scheduling via self-carrier or cross-carrier scheduling, as a member of a set of co-scheduled cells, the scheduled cells can be counted more number of times, for the purpose of determination of $M_{PDCCH}^{total,slot,\mu}$ or $C_{PDCCH}^{total,slot,\mu}$ limits, such as: (i) one additional count; or (ii) one additional count for each set of co-scheduled cells that includes the scheduled cell; or (iii) one additional count for each search space set associated with a set of co-scheduled cells that includes the scheduled cell; or (iv) one additional fractional count, for example $$\frac{1}{K},$$

for each set of co-scheduled cells with K cells that includes the scheduled cell; or (v) one additional fractional count, for example $$\frac{1}{K},$$

for each search space set associated with a set of co-scheduled cells with K cells that includes the scheduled cell.

It is noted that, a UE can be configured multiple separate search space sets for multi-cell scheduling on a same set of co-scheduled cells, such as a first search space set associated with a first CORESET for example for eMBB, and a second search space set associated with a second CORESET for example for URLLC.

In one example, the UE applies a configurable scaling factor for counting a scheduled cell from a set of co-scheduled cells, in addition to or instead of the counting methods described above.

The UE applies such additional/modified counts to parameters $N_{cells,0}^{DL,\mu}$ or $N_{cells,1}^{DL,\mu}$ when the UE determines PDCCH candidates, as described in Equation (13) or non-overlapped CCEs per slot on the active DL BWP(s) of scheduling cell(s) from the $N_{cells,0}^{DL,\mu}+N_{cells,1}^{DL,\mu}$ downlink cells, as described in Equation (14).

$$M_{PDCCH}^{total,slot,\mu} = \quad (13)$$
$$\left\lfloor N_{cells}^{cap} \cdot M_{PDCCH}^{max,slot,\mu} \cdot \left(N_{cells,0}^{DL,\mu} + \gamma \cdot N_{cells,1}^{DL,\mu}\right) / \sum_{j=0}^{3} \left(N_{cells,0}^{DL,j} + \gamma \cdot N_{cells,1}^{DL,j}\right) \right\rfloor$$

$$C_{PDCCH}^{total,slot,\mu} = \quad (14)$$
$$\left\lfloor N_{cells}^{cap} \cdot C_{PDCCH}^{max,slot,\mu} \cdot \left(N_{cells,0}^{DL,\mu} + \gamma \cdot N_{cells,1}^{DL,\mu}\right) / \sum_{j=0}^{3} \left(N_{cells,0}^{DL,j} + \gamma \cdot N_{cells,1}^{DL,j}\right) \right\rfloor$$

Counting a number of PDCCH candidates and non-overlapping CCEs per scheduled cell, in case of multi-cell scheduling can depend on a scenario for multi-cell scheduling operation, as considered next in Case A and Case B.

The following describe Per-scheduled-cell BD/CCE allocation—Case A: a search space set for multi-cell scheduling only When a search space set is associated only with DCI formats for multi-cell scheduling for a set of co-scheduled cells (in the following, this is referred to as a multi-cell scheduling search space set), in a first approach the UE counts each PDCCH candidate or non-overlapping CCE associated with the search space set as a fraction of one PDCCH candidate or one non-overlapping CCE for each cell from the set of co-scheduled cells. Such approach can provide an accurate representation of a UE capability for PDCCH monitoring because it considers that the UE is monitoring fewer PDCCH candidates, compared to single-cell scheduling, for scheduling a same number of cells. A sum of the fractions across all cells in the set of co-scheduled cells can equal one or can be different than one, such as greater than one.

For example, a UE can be configured separate scaling factors that the UE applies to count a PDCCH candidate or non-overlapping CCE for each cell from the set of co-scheduled cells. Alternatively, the UE can be configured a scaling factor to count PDCCH candidates or non-overlapping CCEs for all cells in the set of co-scheduled cells.

In another example, a UE determines scaling factors for counting PDCCH candidates or non-overlapping CCEs based on a number of cells in the set of co-scheduled cells. For a set of co-scheduled cells including 4 cells, the UE counts each PDCCH candidate or each non-overlapping CCE for a corresponding search space set as ¼ PDCCH candidate or ¼ non-overlapping CCE for each of the 4 co-scheduled cells.

In yet another example, when a UE monitors a search space set for multi-cell scheduling on a set of K co-scheduled cells, and the search space set includes N PDCCH candidates, the UE counts the monitored PDCCH candidates associated with the search space in a slot/span set as $$\frac{N}{K}$$

PDCCH candidates towards a maximum number of PDCCH candidates that the UE can monitor per slot/span for each of K co-scheduled cells.

In a second approach, a UE counts each PDCCH candidate or non-overlapping CCE for a search space set associated with multi-cell scheduling as one PDCCH candidate or one non-overlapping CCE for each cell from the set of co-scheduled cells.

According to the second approach, when a UE monitors a search space set for multi-cell scheduling on a set of K co-scheduled cells, and the search space set includes N PDCCH candidates, the UE counts the monitored PDCCH candidates associated with the search space in a slot/span set as N PDCCH candidates towards a maximum number of PDCCH candidates that the UE can monitor per slot/span for each of K co-scheduled cells.

In the first and second approaches, the UE counts the number of PDCCH candidates and non-overlapping CCEs based on a configured set of co-scheduled cells, regardless of how many cell(s) from the set of co-scheduled cells are co-scheduled by a DCI format for multi-cell scheduling. Therefore, for a set with 4 co-scheduled cells, the UE applies the fractional allocation of ¼ PDCCH candidate or ¼ non-overlapping CCE, according to the first approach, or the full allocation of 1 PDCCH candidate or 1 non-overlapping CCE, according to the second approach, per cell from the 4 configured co-scheduled cells even when the UE determines that a multi-cell scheduling DCI format schedules only 2 cells from the configured set of 4 co-scheduled cells.

The method 1000, as illustrated in FIG. 10, describes an example procedure for counting PDCCH candidates for multi-cell scheduling operation according to the disclosure, when a search space set is associated with multi-cell scheduling DCI formats.

In step 1010, a UE (such as the UE 116) is configured a set of co-scheduled cells that includes N cells. In step 1020, the UE is configured a search space set for monitoring PDCCHs for detection of a DCI format for multi-cell scheduling on the set of co-scheduled cells. In step 1030, the UE monitors a PDCCH candidate in the search space associated with L non-overlapping CCEs. In step 1040 the UE counts the monitored PDCCH candidate as $$\frac{1}{N}$$

of one PDCCH candidate, and counts the Z monitored CCEs as $$\frac{L}{N}$$

of one non-overlapping CCE for each cell from the set of co-scheduled cells.

The flowing describes per-scheduled-cell BD/CCE allocation—Case B: a search space set for both single-cell scheduling and multi-cell scheduling When a search space set is configured for monitoring PDCCHs for detections of both multi-cell scheduling DCI format(s) and single-cell scheduling DCI format(s), then the UE counts each PDCCH candidate or non-overlapping CCE associated with the search space set as one PDCCH candidate or one non-overlapping CCE for only one scheduled cell that corresponds to the single-cell scheduling DCI format(s).

When a search space set is configured for monitoring PDCCH for only single-cell scheduling DCI format(s) and the single-cell scheduling DCI format(s) can also be used for multi-cell scheduling, such as: (i) by using a different RNTI, or (ii) by repurposing some of the DCI fields such as by using a multi-cell mapping, or (iii) by scheduling a PDSCH that includes the multi-cell scheduling information, or (iv) by pointing to a second-stage DCI format in a second PDCCH (such as by indication of a PDCCH candidate index for the second-stage DCI format). Then the UE counts PDCCH candidates and non-overlapping CCEs same as when the search space set is only for single-cell scheduling.

The method 1100, as illustrated in FIG. 11, describes an example procedure for counting PDCCH candidates for multi-cell scheduling operation according to the disclosure, when a search space set is configured for both single-cell scheduling and multi-cell scheduling DCI formats.

In step 1110, a UE (such as the UE 116) is configured a set of co-scheduled cells including N cells. In step 1120, the UE is configured a search space set for monitoring PDCCH to detect DCI format(s) for multi-cell scheduling on the set of co-scheduled cells and DCI format(s) for single-cell scheduling on a first scheduled cell from the set of co-scheduled cells. In step 1130, the UE monitors a PDCCH candidate in the search space set associated with L non-overlapping CCEs. In step 1140, the UE counts the monitored PDCCH candidate as one PDCCH candidate, and counts the L monitored CCEs as Z non-overlapping CCEs for the first scheduled cell.

In certain embodiments, a UE (such as the UE 116) counts the PDCCH candidates and non-overlapping CCEs for multi-cell scheduling based on slots/spans and an associated subcarrier spacing (SCS)/numerology of a scheduling cell, regardless of values of SCS of cells in the set of co-scheduled cells.

Although FIG. 10 illustrates the method 1000 and FIG. 11 illustrates the method 1100 various changes may be made to FIGS. 10 and 11. For example, while the methods 1000 and 1100 are shown as a series of steps, various steps could overlap, occur in parallel, occur in a different order, or occur multiple times. In another example, steps may be omitted or replaced by other steps. For example, steps of the method 1000 and the steps of the method 1100 can be executed in a different order.

Various embodiments of the present disclosure describe search space overbooking and dropping for multi-cell scheduling. This is described in the following examples and embodiments, such as those of FIGS. 12 and 13.

Figure 12:
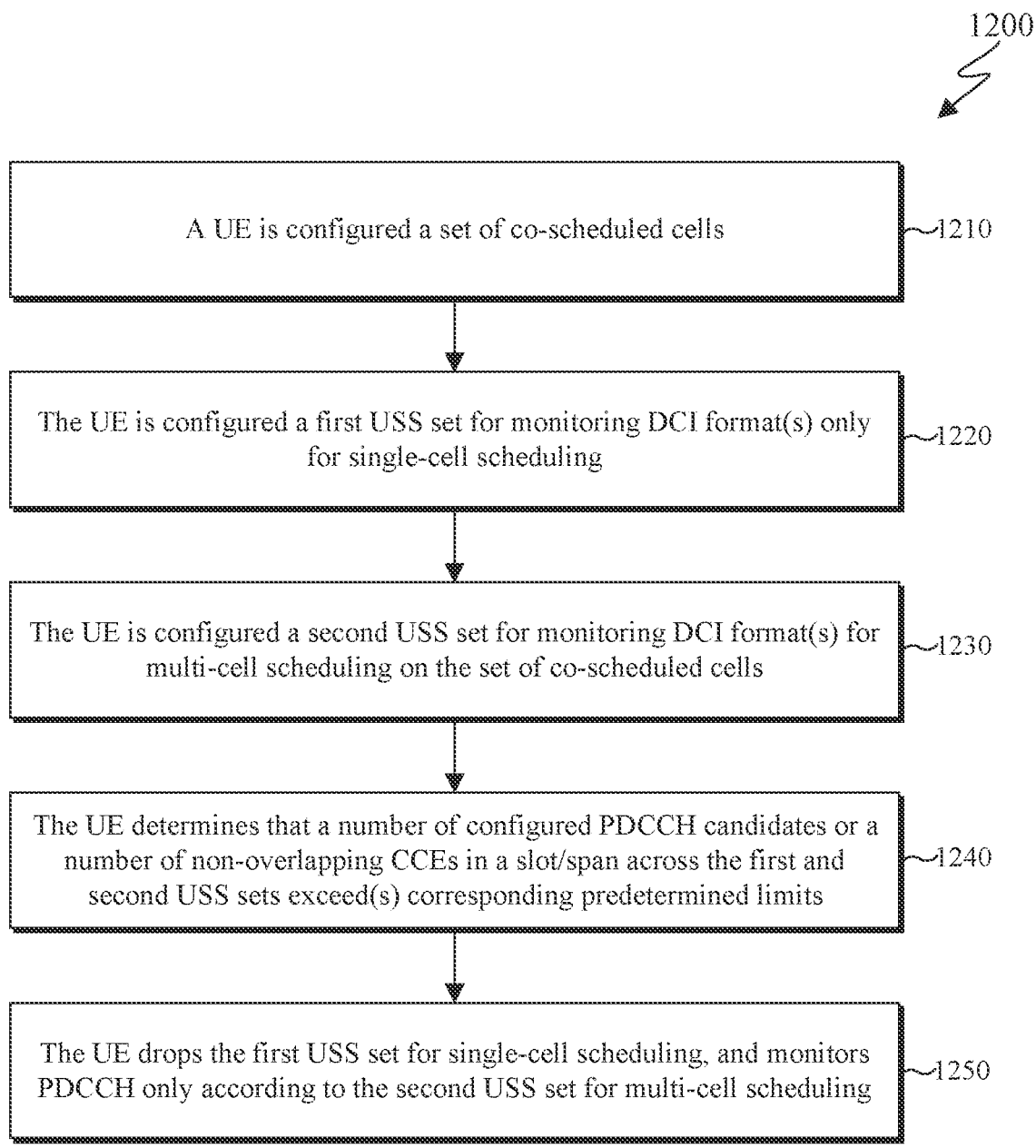
FIGS. 12 and 13 illustrates example methods for search space set overbooking and dropping for multi-cell scheduling operation according to embodiments of the present disclosure.
Figure 13:
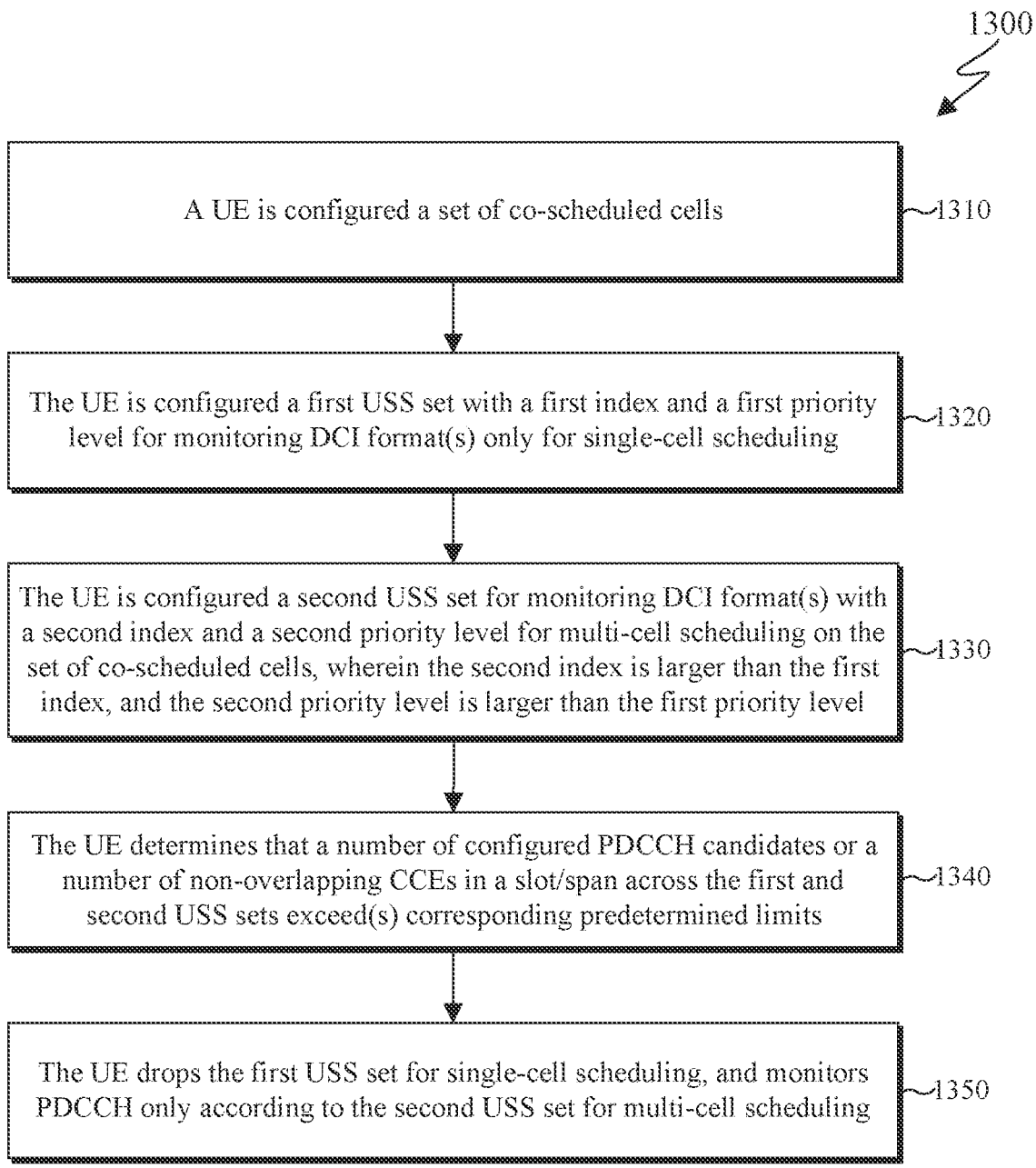

FIGS. 12 and 13 illustrates example methods 1200 and 1300, respectively, for search space set overbooking and dropping for multi-cell scheduling operation according to embodiments of the present disclosure. The steps of the method 1200 of FIG. 12 and the method 1300 of FIG. 13 can be performed by any of the UEs 111-116 of FIG. 1, such as the UE 116 of FIG. 3. The method 1200 and the method 1300 are for illustration only and other embodiments can be used without departing from the scope of the present disclosure.

In certain embodiments, a UE (such as the UE 116) can assign a higher priority to the first search space set and drop other (single-cell scheduling) USS sets before dropping the first search space set when (i) a primary cell (PCell) is a scheduling cell for a set of co-schedule cells, and (ii) the UE is configured a first search space set on the PCell that can be used for monitoring a multi-cell scheduling DCI format for the set of co-scheduled cells, and (iii) the UE determines a search space set overbooking event on the PCell.

In one example, the set of co-scheduled cells includes the PCell.

Such operation can be beneficial, for example, when the first search space set for multi-cell scheduling is configured in a later point in time after some single-cell scheduling search space sets corresponding to some cells from the set of co-scheduled cells are already configured, and therefore the gNB may assign a larger search space set index to the first search space set for multi-cell scheduling than indexes of those search space sets for single-cell scheduling instead of reconfiguring the indexes for all search space sets. In such scenarios, the UE can assign higher priority to the first search space set for multi-cell scheduling, for example by implicit determination or by using a higher layer configured parameter, to override the smaller indexes that are configured by the gNB for the search space sets for single-cell scheduling.

In a first approach, the UE determines the higher priority for the first search space set implicitly without any gNB signaling or higher layer configuration. For example, the UE can assign a higher priority to the first search space set (multi-cell scheduling search space set) compared to any single-cell scheduling search space set, regardless of search space set indexes.

In a second approach, the UE receives higher layer configuration for a priority level parameter associated with search space sets configured on the PCell. For example, a value '0' for the priority level parameter indicates low priority, and a value '1' for the priority level parameter indicates high priority. In one example, the priority level parameter can take on parameters from a set {0, 1, 2, . . . N−1}, wherein N is configured by higher layers or predetermined in the specifications of the system operation, and a search space set with higher priority is configured a larger value for the priority level parameter. In one example, the UE can be provided a large value, such as '1', for the priority level parameter for a search space set for multi-cell scheduling. In another example, the UE can be provided a large value, such as '1', for the priority level parameter even for a search space set for single-cell scheduling, for example for URLLC operation.

According to the second approach, the UE assigns higher priority first in descending order of the priority level parameter, and then/next/second in ascending order of search space set index. For example, the UE assigns the highest priority to a search space set with largest value of the priority level parameter and with smallest search space set index.

For example, when the UE is configured a value '1' for the priority level parameter for the first search space set, the UE can assign a higher priority to the first search space set (multi-cell scheduling search space set) compared to any search space sets, including any single-cell scheduling search space sets, with a value 'O' for the priority level parameter even when the search space sets have smaller search space set indexes compared to an index of the first search space set. However, the first search space set (the multi-cell scheduling search space set) can have a lower priority compared to another multi-cell scheduling or single-cell scheduling search space set with a same value '1' for the priority level parameter and with a smaller search space index.

In one example, the multi-cell scheduling search space set refers to a search space set that is configured for monitoring only the multi-cell scheduling DCI format. In another example, the multi-cell scheduling search space set refers to a search space set that is configured for monitoring both the multi-cell scheduling DCI format and a single-cell scheduling DCI format.

A UE determines a search space set overbooking event based on whether or not a number of configured PDCCH candidates or non-overlapping CCEs in a slot/span exceed a predetermined limit, such as a maximum or total number of PDCCH candidates or non-overlapping CCEs that the UE is capable of monitoring per slot/span of the scheduling cell. Herein, a configured number of PDCCH candidates or non-overlapping CCEs in a slot/span is summation of corresponding number of all common search space (CSS) sets and USS sets, including for single-cell scheduling and for multi-cell scheduling, in the slot/span. Herein, the UE determines a configured number of PDCCH candidates or non-overlapping CCEs in the slot/span corresponding to multi-cell scheduling search space sets based on the different options described herein.

The method 1200, as illustrated in FIG. 12, describes an example procedure for search space set overbooking and dropping for multi-cell scheduling operation according to the disclosure.

In step 1210, a UE (such as the UE 116) is configured a set of co-scheduled cells. In step 1220, the UE is configured a first USS set for monitoring DCI format(s) only for single-cell scheduling. In step 1230, the UE is configured a second USS set for monitoring DCI format(s) only for multi-cell scheduling on the set of co-scheduled cells. After accounting for PDCCH candidates or non-overlapping CCEs allocated to CSS sets on a corresponding scheduling cell, the UE in step 1240 determines that a number of PDCCH candidates or a number of non-overlapping CCEs in a slot/span across the first and second USS sets exceeds corresponding predetermined limits. For example, the corresponding predetermined limits can be difference of a maximum number of PDCCH candidates or a maximum number of non-overlapping CCEs, respectively, that the UE is capable of from a number of PDCCH candidates or a number of non-overlapping CCEs that the UE allocated to the CSS sets on the scheduling cells. In step 1250, the UE drops the first USS set for single-cell scheduling and monitors PDCCH only according to the second USS set for multi-cell scheduling.

The method 1300, as illustrated in FIG. 13, describes an example procedure for search space set overbooking and dropping for multi-cell scheduling operation according to the disclosure, when a search space set is additionally configured with a priority level parameter.

In step 1310, a UE (such as the UE 116) is configured a set of co-scheduled cells. In step 1320, the UE is configured a first USS set with a first index and a first priority level for monitoring DCI format(s) only for single-cell scheduling. In step 1330, the UE is configured a second USS set for monitoring DCI format(s) with a second index and a second priority level for multi-cell scheduling on the set of co-scheduled cells, wherein the second index is larger than the first index, and the second priority level is larger than the first priority level. After accounting for PDCCH candidates or non-overlapping CCEs allocated to CSS sets on a corresponding scheduling cell, the UE in step 1340 determines that a number of configured PDCCH candidates or a number of non-overlapping CCEs in a slot/span across the first and second USS sets exceed(s) corresponding predetermined limits. For example, the corresponding predetermined limits can be difference of a maximum number of PDCCH candidates or a maximum number of non-overlapping CCEs, respectively, that the UE is capable of from a number of PDCCH candidates or a number of non-overlapping CCEs that the UE allocated to the CSS sets on the scheduling cells. In step 1350, the UE drops the first USS set for single-cell scheduling, and monitors PDCCH only according to the second USS set for multi-cell scheduling.

Although FIG. 12 illustrates the method 1200 and FIG. 13 illustrates the method 1300 various changes may be made to FIGS. 12 and 13. For example, while the methods 1200 and 1300 are shown as a series of steps, various steps could overlap, occur in parallel, occur in a different order, or occur multiple times. In another example, steps may be omitted or replaced by other steps. For example, steps of the method 1200 and the steps of the method 1300 can be executed in a different order.

Various embodiments of the present disclosure describe DSS operation for multi-cell scheduling.

In certain embodiments, for a UE (such as the UE 116) that is configured multi-cell scheduling for a set of co-scheduled cells, when the UE is configured to monitor PDCCH, for scheduling the set of co-scheduled cells, on a first scheduling cell and on a second scheduling cell, the UE counts/allocates PDCCH candidates and non-overlapping CCEs for multi-cell scheduling based on approaches described herein. The allocation is such that, for each cell from the set of co-scheduled cells, the UE maintains an allocation of PDCCH candidates and non-overlapping CCEs across the first and second scheduling cells similar to a corresponding allocation for single-cell scheduling. The first scheduling cell can be the PCell, and the second scheduling cell can be a special scheduling SCell, referred to as an sSCell. In one example, the set of co-scheduled cells includes the PCell. In another example, the set of co-scheduled cells additionally includes the sSCell. Therefore, both multi-cell scheduling and DSS operation can impact PDCCH monitoring for the UE, wherein the impact of multi-cell scheduling is addressed separately from the impact of DSS operation.

In one example, when first search space sets on the first scheduling cell for scheduling a set of co-scheduled cells and second search space sets on the second scheduling cell for scheduling the set of co-scheduled cells are configured such that first search space sets do not overlap in time with second search space sets, the UE determines limits on the number of PDCCH candidates and non-overlapping CCEs based on existing rules, such as those in NR Rel-15/16.

When first search space sets on the first scheduling cell for scheduling a set of co-scheduled cells and second search space sets on the second scheduling cell for scheduling the set of co-scheduled cells are configured such that first search space sets can overlap in time with second search space sets, there can be different approaches for how the UE determines limits on the number of PDCCH candidates and non-overlapping CCEs.

In a first approach, for each cell from the set of co-scheduled cells, a sum of numbers of PDCCH candidates across the first and second scheduling cells and a sum of numbers of non-overlapping CCEs across the first and second scheduling cells are within predetermined respective limits for PDCCH candidates and non-overlapping CCEs. Herein, the predetermined respective limits can refer to a maximum number of PDCCH candidates and a maximum number of non-overlapping CCEs, respectively, that a UE is capable of monitoring for each scheduled cell in a reference slot/span. The reference slot can be with respect to a smallest/largest SCS, or can be a slot of the first/second scheduling cell, for example, the PCell. Similar, the limits (maximum numbers) can be with respect to a reference SCS such as a smallest/largest SCS, or with respect to SCS of the first/second scheduling cell, for example, $\min(M_{PDCCH}^{max,slot,\mu}, M_{PDCCH}^{total,slot,\mu})$ PDCCH candidates or $\min(C_{PDCCH}^{max,slot,\mu}, C_{PDCCH}^{total,slot,\mu})$ non-overlapping CCEs, where μ is a smallest SCS. In another example, the limits (maximum numbers) can be with respect to both SCSs corresponding to the two scheduling cells, for example, $\alpha \cdot \min(M_{PDCCH}^{max,slot,\mu 1}, M_{PDCCH}^{total,slot,\mu 1}) + \beta \cdot \min(M_{PDCCH}^{max,slot,\mu 2}, M_{PDCCH}^{total,slot,\mu 2})$ PDCCH candidates or $\alpha \cdot \min(C_{PDCCH}^{max,slot,\mu 1}, C_{PDCCH}^{total,slot,\mu 1}) + \beta \cdot \min(C_{PDCCH}^{max,slot,\mu 2}, C_{PDCCH}^{total,slot,\mu 2})$ non-overlapping CCEs, where μ1 and μ2 are the SCS of the first and second scheduling cells, respectively, and the scaling factors $0 \leq \alpha \leq 1$ and $0 \leq \beta \leq 1$ can be provided by higher layers.

In a second approach, for each cell from the set of co-scheduled cells, a first number of PDCCH candidates and a first number of non-overlapping CCEs corresponding to the first scheduling cell is within a first scaling factor of first predetermined limits corresponding to PDCCH candidates and non-overlapping CCEs, respectively. In addition, a second number of PDCCH candidates and a second number of non-overlapping CCEs corresponding to the second scheduling cell is within a second scaling factor of second predetermined limits corresponding to PDCCH candidates and non-overlapping CCEs, respectively. For example, a sum of the first and second scaling factors can be equal to one. In another example, the first predetermined limits correspond to the first scheduling cell and the second predetermined limits correspond to the second scheduling cell, for example, $\alpha \cdot \min(M_{PDCCH}^{max,slot,\mu 1}, M_{PDCCH}^{total,slot,\mu 1})$ PDCCH candidates or $\alpha \cdot \min(C_{PDCCH}^{max,slot,\mu 1}, C_{PDCCH}^{total,slot,\mu 1})$ non-overlapping CCEs on P(S)Cell, and $\beta \cdot \min(M_{PDCCH}^{max,slot,\mu 2}, M_{PDCCH}^{total,slot,\mu 2})$ PDCCH candidates or $\beta \cdot \min(C_{PDCCH}^{max,slot,\mu 2}, C_{PDCCH}^{total,slot,\mu 2})$ non-overlapping CCEs on sSCell. In another example, the first predetermined limits and the second predetermined limits are same and, for example, correspond to the first scheduling cell, such as the PCell. For example, $\alpha \cdot \min(M_{PDCCH}^{max,slot,\mu 1}, M_{PDCCH}^{total,slot,\mu 1})$ PDCCH candiates or $\alpha \cdot \min(C_{PDCCH}^{max,slot,\mu 1}, M_{PDCCH}^{total,slot,\mu 1})$ non-overlapping CCEs on P(S)Cell, and $(1-\alpha) \cdot \min(M_{PDCCH}^{max,slot,\mu 1}, M_{PDCCH}^{total,slot,\mu 1})$ PDCCH candidates or $(1-\alpha) \cdot \min(C_{PDCCH}^{max,slot,\mu 1}, c_{PDCCH}^{total,slot,\mu 1})$ non-overlapping CCEs on sSCell, where μ1 and μ2 are the SCS of the PCell and sSCell, respectively, and the scaling factors $0 \leq \alpha \leq 1$ and $0 \leq \beta \leq 1$ can be provided by higher layers.

In both the first and the second approach, the UE counts a number of PDCCH candidates and non-overlapping CCEs in a reference slot according to search space sets that overlap the reference slot. For search space sets that are associated with only DCI formats for single-cell scheduling, the UE counts the PDCCH candidates and non-overlapping CCEs per existing rules, such as those in NR Rel-15/16/17. For search space sets that are associated with DCI formats for multi-cell scheduling and with or without DCI formats for single-cell scheduling, the UE counts the PDCCH candidates and non-overlapping CCEs, for example, per rules described herein. For example, when a search space set is associated with DCI formats for both multi-cell scheduling and single-cell scheduling, the UE counts the PDCCH candidates and non-overlapping CCEs only towards the limits for a single scheduled cells that corresponds to the DCI formats for single-cell scheduling. In another example, when a search space set is associated with DCI formats for only multi-cell scheduling on a set of K co-scheduled cells, the UE counts the PDCCH candidates and non-overlapping CCEs with a fractional allocation 1/K allocation towards the limits for each cell from the set of K co-scheduled cells.

In one realization, for a cell from the set of co-scheduled cells, such as the PCell, when a number of PDCCH candidates or non-overlapping CCEs across the first and second scheduling cells exceeds a corresponding predetermined limit, referred to as a search space set overbooking event, the UE drops search space sets with lowest priority. The search space sets can be on both scheduling cells or on only one of the two scheduling cells such as on the first scheduling cell that can also be the PCell. When search space set dropping occurs on both cells and for a search space set with a same index on both scheduling cells, a priority for search space set dropping can additionally depend on the scheduling cell index, in ascending or descending order, or can depend on a priority level parameter provided by higher layers, or can be predetermined such as PCell (or the sSCell) having lower priority. When the search space set dropping occurs on only one scheduling cell, that scheduling can be indicated to the UE by higher layers or be determined in the specifications of the system operation, such as the PCell (or the sSCell).

A search space set with lowest priority can be a search space set with a largest search space set index or can also depend on single-cell scheduling vs. multi-cell scheduling aspects as described herein. For example, a search space set for multi-cell scheduling can have a higher priority compared to a search space set for single-cell scheduling for resolving an overbooking event.

In one example scenario, a UE can be configured(i) a first scheduled cell such as a PCell that can be scheduled by two scheduling cells, such as the PCell and an sSCell, and (ii) a set of co-scheduled cells that is scheduled by the sSCell, such that the set of co-scheduled cells includes the first scheduled cell (PCell).

Accordingly, the UE can be configured(i) CSS sets on the PCell, and (ii) first USS sets on the PCell for self-carrier scheduling the PCell, and (iii) second USS sets on the sSCell for cross-carrier scheduling the PCell using single-cell DCI format(s), and (iv) third USS sets on the sSCell for multi-cell scheduling on the set of co-scheduled cells that includes the PCell.

When CSS set and the first USS sets do not overlap in a/any (reference) slot with any of the second and third USS sets, the UE allocates the PDCCH candidates and the non-overlapping CCEs separately for the PCell and the sSCell per existing PDCCH monitoring rules, such as those in NR Rel-15/16.

When CSS set and the first USS sets (can) overlap in a (reference) slot with some USS set(s) from the second or third USS sets, the UE determines limits on a number of PDCCH candidates or non-overlapping CCEs that the UE is capable of monitoring for the first scheduled cell in the (reference) slot: (i) jointly across the two scheduling cells (PCell and sSCell), or (ii) separately for each of the two scheduling cells (a first limit for PCell and a second limit for sSCell).

The UE can determine such limits similar to expression provided above for the case that the two scheduling cells apply to all cells in the set of co-scheduled cells.

The UE counts a number of PDCCH candidates and non-overlapping CCEs for the first scheduled cells (PCell) in the (reference) slot as follows: (i) one count for each PDCCH candidate and corresponding non-overlapping CCEs for a CSS set from the CSS sets that overlaps the (reference) slot, and (ii) one count for each PDCCH candidate and corresponding non-overlapping CCEs for a USS set from the first USS sets that overlaps the (reference) slot, and (iii) one count for each PDCCH candidate and corresponding non-overlapping CCEs for a USS set from the second USS sets that overlaps the (reference) slot, and (iv) a fractional 1/K count for each PDCCH candidate and corresponding non-overlapping CCEs for a USS set from the third USS sets that overlaps the (reference) slot, where K is a number of cells in the set of co-scheduled cells.

In certain embodiments, a method for PDCCH monitoring for multi-cell scheduling can include receiving information of a search space set for monitoring candidate PDCCH receptions corresponding to a set of co-scheduled cells. The method can also include receiving an n_CI value corresponding to the search space set, and a CIF value corresponding to a subset of the of co-scheduled cells. The method can further include receiving a candidate PDCCH reception according to the search space set for the set of co-scheduled cells based on the n_CI value. Additionally, the method can include decoding a DCI format in the PDCCH. It is noted that the DCI format can include the CIF value. The method can also include receiving PDSCHs or PUSCHs on the subset of the of co-scheduled cells corresponding to the CIF value.

In certain embodiments, the method can also include receiving (i) information, on a first DL BWP of a first cell, for a search space set for scheduling from the first cell on a set of co-scheduled cells comprising [the first cell and] a second cell and a third cell, and (ii) information, on a second DL BWP of the second cell and on a third DL BWP of the third cell, for the search space set. The method can further include determining that the first DL BWP and at least one of the second DL BWP or the third DL BWP are active. Additionally, the method can include receiving/monitoring a PDCCH in the search space set on the first DL BWP and the at least one active DL BWP. IT is noted that the PDCCH includes a DCI format for scheduling on cells from the set of co-scheduled cells.

In certain embodiments, the method can also include receiving (i) information of a set of K co-scheduled cells, (ii) information of a search space set for monitoring candidate PDCCH receptions, and (iii) a candidate PDCCH reception according to the search space set. It is noted that the candidate PDCCH reception is associated with L non-overlapping CCEs. The method can further include determining (i) that the search space set is associated with DCI format(s) for scheduling on the set of K co-scheduled cells only, and (ii) allocation of//K candidate PDCCH reception(s) and L/K non-overlapping CCE(s) towards a maximum number of candidate PDCCH receptions and a maximum number of non-overlapping CCEs, respectively, for each cell from the set of K co-scheduled cells.

In certain embodiments, the method can also include receiving (i) information of a set of K co-scheduled cells, (ii) information of a search space set for monitoring candidate PDCCH receptions, and (iii) a candidate PDCCH reception according to the search space set. It is noted that the candidate PDCCH reception is associated with L non-overlapping CCEs. The method can further include determining DCI format(s) associated with the search space set. In response to determination that that the search space set is associated with DCI format(s) for multi-cell scheduling only, the method can include determining an allocation of I/K candidate PDCCH reception(s) and L/K non-overlapping CCE(s) towards a maximum number of candidate PDCCH receptions and a maximum number of non-overlapping CCEs, respectively, for each cell from the set of K co-scheduled cells. In response to determination that that the search space set is associated with DCI format(s) for both multi-cell scheduling and single-cell scheduling on a first cell from the set of K co-scheduled cells, the method can include determining an allocation of one candidate PDCCH reception and L non-overlapping CCE(s) towards a maximum number of candidate PDCCH receptions and a maximum number of non-overlapping CCEs, respectively, for the first scheduled cell.

In certain embodiments, the method can also include receiving (i) receiving information of a set of co-scheduled cells and (ii) receiving first information for a first USS set for monitoring candidate PDCCH receptions corresponding to a first scheduled cell. It is noted that the set of co-scheduled cells are scheduled by a PCell, the first scheduled cell is scheduled by the PCell, and first information includes a first USS set index, and a first priority level. The method can also include receiving second information for a second USS set for monitoring candidate PDCCH receptions corresponding to the set of co-scheduled cells. It is noted that the second information includes a second USS set index, and a second priority level, and the second USS set index is larger than the first USS set index. The method can further include receiving (i) a first number of candidates PDCCH receptions over a first number of non-overlapping CCEs in a slot of the PCell based on the first USS set, and (ii) a second number of candidates PDCCH receptions over a second number of non-overlapping CCEs in the slot of the PCell based on the second USS set. Additionally, the method can include determining (i) a sum of the first number of candidates PDCCH receptions and the second number of candidates PDCCH receptions exceeds a predetermined number of PDCCH receptions, or (ii) a sum of the first number of non-overlapping CCEs and the second number of non-overlapping CCEs exceeds a predetermined number of non-overlapping CCEs. The method can also include determining the second priority level is larger than the first priority level. The method can further include cancelling candidate PDCCH receptions corresponding only to the first USS set.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE) in a wireless communication system for reception of physical downlink control channels (PDCCHs), the method comprising:
   receiving:
      first information configuring a set of cells, associated with multi-cell scheduling, that includes more than one cell,
      second information configuring, on a scheduling cell for the set of cells, a first UE-specific search space set that is associated with a first downlink control information (DCI) format for the multi-cell scheduling, and
      third information configuring a first indicator value n_CI corresponding to the set of cells;
   determining:
      an association between the first UE-specific search space set and the set of cells, and
      first control channel elements (CCEs), for receptions of first PDCCH candidates to detect the first DCI format, based on the first UE-specific search space set and the first indicator value n_CI, wherein the first DCI format schedules first physical uplink shared channels (PUSCHs) on first cells from the set of cells, or first physical downlink shared channels (PDSCHs) on first cells from the set of cells;
   receiving the first PDCCH candidates over the first CCEs; and
   transmitting the first PUSCHs on the first cells or receiving the first PDSCHs on the first cells.

2. The method of claim 1, further comprising:
   receiving fourth information for a second UE-specific search space set on a cell from the set of cells, wherein:
      the association between the first search space set and the set of cells is based on a linkage of the second search space set with the first search space set, and
      the linkage of the second search space set with the first search space set is based on a same search space set index for both the first search space set and the second search space set.

3. The method of claim 2, wherein:
   a first PDCCH candidate from the first PDCCH candidates is received over L non-overlapping CCEs from the first CCEs, and
   the reception of the first PDCCH candidate in a slot is counted as:
      one PDCCH candidate for the cell towards a maximum number of PDCCH candidates for the cell in the slot, and
      L non-overlapping CCEs for the cell towards a maximum number of non-overlapping CCEs for the cell in the slot.

4. The method of claim 2, further comprising:
   receiving fifth information configuring, on the cell, a third UE-specific search space set that is associated with a second DCI format for scheduling only on the cell;
   receiving sixth information for a second carrier indicator field value n_CI for the cell, wherein:
      the first indicator value n_CI corresponding to the set of cells is separate from the second carrier indicator field value n_CI for the cell;
   determining second CCEs, for receptions of second PDCCH candidates to detect the second DCI format, based on the third search space set and the second carrier indicator field value n_CI; and
   receiving the second PDCCH candidates over the second CCEs, wherein:
      the second DCI format has a different size than the first DCI format when the second CCEs are not separate from the first CCEs.

5. The method of Claim 1, wherein:
   the first UE-specific search space set has a first search space set identity, and
   determining the association between the first search space set and the set of cells comprises determining that:
      the scheduling cell is included in the set of cells, and
      the first UE-specific search space set is the only UE-specific search space set with the first search space set identity among UE-specific search space sets on cells in the set of cells.

6. The method of claim 5, further comprising:
   a first PDCCH candidate from the first PDCCH candidates is received over L non-overlapping CCEs from the first CCEs, and
   the reception of the first PDCCH candidate in a slot is counted as:
      one PDCCH candidate for the scheduling cell towards a maximum number of PDCCH candidates for the scheduling cell in the slot, and
      L non-overlapping CCEs for the scheduling cell towards a maximum number of non-overlapping CCEs for the scheduling cell in the slot.

7. The method of claim 1, further comprising:
   receiving fourth information configuring a number of combinations of cells for multi-cell scheduling wherein a combination of cells includes a number of cells from the set of cells;
   receiving an indication in the first DCI format that indicates a first combination of cells, from the number of combinations of cells; and
   identifying the first cells to be the first combination of cells.

8. A user equipment (UE) in a wireless communication system, 28. the UE comprising:
   a transceiver configured to receive:
      first information configuring a set of cells, associated with multi-cell scheduling, that includes more than one cell, second information configuring, on a scheduling cell for the set of cells, a first UE-specific search space set that is associated with a first downlink control information (DCI) format for the multi-cell scheduling, and third information configuring a first indicator value n_CI corresponding to the set of cells;

a processor operably coupled with the transceiver, the processor configured to determine:

an association between the first UE-specific search space set and the set of cells, and first control channel elements (CCEs), for receptions of first physical downlink control channel (PDCCH) candidates to detect the first DCI format, based on the first UE-specific search space set and the indicator value n_CI, wherein the first DCI format schedules first physical uplink shared channels (PUSCHs) on first cells from the set of cells, or first physical downlink shared channels (PDSCHs) on first cells from the set of cells; and wherein the transceiver is further configured to:

receive the first PDCCH candidates over the first CCEs, and transmit the first PUSCHs on the first cells or receiving the first PDSCHs on the first cells.

9. The UE of claim 8, wherein:
the transceiver is further configured to receive fourth information for a second UE-specific search space set on a cell from the set of cells,
the association between the first search space set and the set of cells is based on a linkage of the second search space set with the first search space set, and
the linkage of the second search space set with the first search space set is based on a same search space set index for both the first search space set and the second search space set.

10. The UE of claim 9, wherein:
the transceiver is further configured to receive fifth information, on the cell, for a third UE-specific search space set that is associated with a second DCI format for scheduling only on the cell,
the transceiver is further configured to receive sixth information for a second carrier indicator field value n_CI for the cell,
the first indicator value n_CI corresponding to the set of cells is separate from the second carrier indicator field value n_CI for the cell,
the processor is further configured to determine second CCEs, for receptions of second PDCCH candidates to detect the second DCI format, based on the third search space set and the second carrier indicator field value n_CI,
the transceiver is further configured to receive the second PDCCH candidates over the second CCEs, and
the second DCI format has a different size than the first DCI format when the second CCEs are not separate from the first CCEs.

11. The UE of claim 9, wherein:
the transceiver is further configured to receive fifth information configuring for scheduling on a primary cell (PCell) from the PCell and from a secondary cell (SCell), and
the transceiver is further configured to receive sixth information for a third UE-specific search space set on the PCell
the third UE-specific search space set is associated with a second DCI format for scheduling only on the PCell,
the PCell is included in the set of cells,
the scheduling cell for the set of cells is the SCell, and
the cell is not the PCell.

12. The UE of claim 8, wherein:
the first UE-specific search space set has a first search space set identity, and
the processor is configured to determine the association between the first search space set and the set of cells by determining that:
the scheduling cell is included in the set of cells, and
the first UE-specific search space set is the only UE-specific search space set with the first search space set identity among UE-specific search space sets on cells in the set of cells.

13. The UE of claim 9, wherein:
a first PDCCH candidate from the first PDCCH candidates is received over L non-overlapping CCEs from the first CCEs, and
the reception of the first PDCCH candidate in a slot is counted as:
one PDCCH candidate for the cell towards a maximum number of PDCCH candidates for the cell in the slot, and
L non-overlapping CCEs for the cell towards a maximum number of non-overlapping CCEs for the cell in the slot.

14. The UE of claim 12, wherein:
a first PDCCH candidate from the first PDCCH candidates is received over L non-overlapping CCEs from the first CCEs, and
the reception of the first PDCCH candidate in a slot is counted as:
one PDCCH candidate for the scheduling cell towards a maximum number of PDCCH candidates for the scheduling cell in the slot, and
L non-overlapping CCEs for the scheduling cell towards a maximum number of non-overlapping CCEs for the scheduling cell in the slot.

15. The UE of claim 12, wherein:
the transceiver is further configured to receive fourth information configuring for scheduling on a primary cell (PCell) from the PCell and from a secondary cell (SCell), and
the transceiver is further configured to receive fifth information for a third UE-specific search space set on the PCell, wherein:
the third UE-specific search space set is associated with a second DCI format for scheduling only on the PCell,
the PCell is included in the set of cells, and
the scheduling cell for the set of cells is the SCell.

16. The UE of claim 8, wherein:
the transceiver is configured to:
receive fourth information configuring a number of combinations of cells for multi-cell scheduling, wherein a combination of cells includes a number of cells from the set of cells, and
receive an indication in the first DCI format that indicates a first combination of cells, from the number of combinations of cells; and
the processor is configured to identify the first cells to be the first combination of cells.

17. The UE of claim 8, wherein:
the transceiver is further configured to receive fourth information configuring, on the scheduling cell for the set of cells, a second UE-specific search space set that is associated with a second DCI format for the multi-cell scheduling, the first DCI format is associated only with scheduling PUSCHs on the set of cells, the second DCI format is associated only with scheduling PDSCHs on the set of cells, and the first search space set is separate from the second search space set.

18. A base station (BS) in a wireless communication system, the BS comprising:

a transceiver configured to transmit:

first information configuring a set of cells, associated with multi-cell scheduling, that includes more than one cell, second information configuring, on a scheduling cell for the set of cells, a first UE-specific search space set that is associated with a first downlink control information (DCI) format for the multi-cell scheduling, and third information configuring a first indicator value n_CI corresponding to the set of cells;

a processor operably coupled with the transceiver, the processor configured to determine:

an association between the first UE-specific search space set and the set of cells, and first control channel elements (CCEs), for transmissions of first physical downlink control channel (PDCCH) candidates to detect the first UE-specific search space set and the first indicator value n_CI, wherein the first DCI format schedules first physical uplink shared channels (PUSCHs) on first cells from the set of cells, or first physical downlink shared channels (PDSCHs) on first cells from the set of cells; and wherein the transceiver is further configured to:

transmit the first PDCCH candidates over the first CCEs; and receive the first PUSCHs on the first cells or receiving the first PDSCHs on the first cells.

19. The BS of claim 18, wherein:

the transceiver is further configured to transmit fourth information for a second UE-specific search space set on a cell from the set of cells, the association between the first search space set and the set of cells is based on a linkage of the second search space set with the first search space set, and the linkage of the second search space set with the first search space set is based on a same search space set index for both the first search space set and the second search space set.

20. The BS of claim 19, wherein:

the transceiver is further configured to transmit fourth information configuring, on the scheduling cell for the set of cells, a second UE-specific search space set that is associated with a second DCI format for multi-cell scheduling, the first DCI format is associated only with scheduling PUSCHs on the set of cells, the second DCI format is associated only with scheduling PDSCHs on the set of cells, and the first search space set is separate from the second search space set.

21. The BS of claim 20, wherein:

the transceiver is further configured to transmit fifth information, on the cell, for a third UE-specific search space set that is associated with a second DCI format for scheduling only on the cell, the transceiver is configured to transmit sixth information for a second carrier indicator field value n_CI for the cell, wherein:

the first indicator value n_CI corresponding to the set of cells is separate from the second carrier indicator field value n_CI for the cell, the processor is further configured to determine that: a scheduling cell is included in the set of cells, and the first search space set is an only search space set with the first search space set identity among search space sets on cells in the set of cells second CCEs, for receptions of second PDCCH candidates to detect the second DCI format, based on the third search space set and the second carrier indicator field value n_CI, and the transceiver is configured to transmit the second PDCCH candidates over the second CCEs, wherein:

the second DCI format has a different size than the first DCI format when the second CCEs are not separate from the first CCEs.

22. The BS of claim 18, wherein:

the first UE-specific search space set has a first search space set identity, and the processor is configured to determine the association between the first search space set and the set of cells by determining that:

the scheduling cell is included in the set of cells, and the first UE-specific search space set is the only UE-specific search space set with the first search space set identity among UE-specific search space sets on cells in the set of cells.

23. The BS of claim 18, wherein:

the transceiver is further configured to:

transmit fourth information configuring a number of cmobination of cells for multi-cell scheduling, wherein a combination of cells includes a number of cells from the set of cells, and transmit an indication in the first DCI format that indicates a first combination of cells, from the number of combinations of cells; and the processor is configured to identify the first cells to be the first combination of cells.

* * * * *